(12) United States Patent
Bartley et al.

(10) Patent No.: US 10,453,058 B2
(45) Date of Patent: Oct. 22, 2019

(54) E-SIGNATURE

(71) Applicant: HEARTLAND PAYMENT SYSTEMS, INC., Princeton, NJ (US)

(72) Inventors: Joshua A. Bartley, Jeffersonville, IN (US); Maxwell J. Battcher, Louisville, KY (US)

(*) Notice: Subject to any disclaimer, the term of this patent is extended or adjusted under 35 U.S.C. 154(b) by 44 days.

(21) Appl. No.: 14/573,067

(22) Filed: Dec. 17, 2014

(65) Prior Publication Data

US 2016/0179776 A1 Jun. 23, 2016

(51) Int. Cl.
| | |
|---|---|
| G06F 17/27 | (2006.01) |
| G06Q 20/40 | (2012.01) |
| G06F 17/24 | (2006.01) |
| G06Q 20/02 | (2012.01) |
| G06Q 20/08 | (2012.01) |
| G06Q 20/32 | (2012.01) |

(52) U.S. Cl.
CPC ........... G06Q 20/401 (2013.01); G06F 17/24 (2013.01); G06Q 20/027 (2013.01); G06Q 20/0855 (2013.01); G06Q 20/32 (2013.01)

(58) Field of Classification Search
CPC .... G06F 17/2288; G06F 17/24; G06F 17/241; G06F 21/6245; G06F 2216/15; G06Q 10/101; G06Q 20/401; G06Q 20/027; G06Q 20/0855; G06Q 20/32; G06Q 20/3821; H04L 9/3247; G06K 9/00154
See application file for complete search history.

(56) References Cited

U.S. PATENT DOCUMENTS

| | | |
|---|---|---|
| 4,510,619 A | 4/1985 | LeBrun et al. |
| 5,136,646 A | 8/1992 | Haber et al. |
| 5,136,647 A | 8/1992 | Haber et al. |
| 5,208,858 A | 5/1993 | Vollert et al. |
| 5,220,675 A | 6/1993 | Padawer et al. |
| 5,222,138 A | 6/1993 | Balabon et al. |
| 5,337,360 A | 8/1994 | Fischer |
| 5,390,247 A | 2/1995 | Fischer |
| 5,465,299 A | 11/1995 | Matsumoto et al. |
| 5,466,919 A | 11/1995 | Hovakimian |

(Continued)

OTHER PUBLICATIONS

Right Signature: The All in One Electronic Signature Solution, 2014, Available at https://rightsignature.com/features; see also http://www.e-signature.com/electronic-signature-software.

(Continued)

*Primary Examiner* — Wilson W Tsui
(74) *Attorney, Agent, or Firm* — Rueppell Consulting; Chris Rueppell

(57) ABSTRACT

The present disclosure is directed to electronic transaction management methods and systems that facilitate transactions between multiple parties by providing web-based transaction environments that enable all aspects of transaction establishment and performance, including document processing and execution for establishing binding agreements. The transaction management capabilities facilitate transaction performance through the use of multiple transaction environments, such as a real-time, simultaneous execution environment wherein its establishment and maintenance is determinable and within which the obtainment of multiple handwritten signatures to an executable transaction document can occur simultaneously and in real-time.

21 Claims, 9 Drawing Sheets

(56) References Cited

U.S. PATENT DOCUMENTS

| | | | |
|---|---|---|---|
| 5,530,757 A | 6/1996 | Krawczyk |
| 5,534,855 A | 7/1996 | Shockley et al. |
| 5,535,276 A | 7/1996 | Ganesan |
| 5,544,255 A | 8/1996 | Smithies et al. |
| 5,553,145 A | 9/1996 | Micali |
| 5,578,991 A | 11/1996 | Scholder |
| 5,587,560 A | 12/1996 | Crooks et al. |
| 5,606,609 A | 2/1997 | Houser et al. |
| 5,615,268 A | 3/1997 | Bisbee et al. |
| 5,647,017 A | 7/1997 | Smithies et al. |
| 5,659,616 A | 8/1997 | Sudia |
| 5,737,419 A | 4/1998 | Ganesan |
| 5,748,738 A | 5/1998 | Bisbee et al. |
| 5,781,629 A | 7/1998 | Haber et al. |
| 5,813,009 A | 9/1998 | Johnson et al. |
| 5,818,955 A | 10/1998 | Smithies et al. |
| 5,825,880 A | 10/1998 | Sudia et al. |
| 5,872,848 A | 2/1999 | Romney et al. |
| 5,892,824 A | 4/1999 | Beatson et al. |
| 5,898,156 A | 4/1999 | Wilfong |
| 5,926,552 A | 7/1999 | McKeon |
| 5,933,498 A | 8/1999 | Schneck et al. |
| 5,940,187 A | 8/1999 | Berke |
| 5,943,423 A | 8/1999 | Muftic |
| 5,949,876 A | 9/1999 | Ginter et al. |
| 5,963,649 A | 10/1999 | Sako |
| 5,966,445 A | 10/1999 | Park et al. |
| 5,970,143 A | 10/1999 | Schneier et al. |
| 5,982,506 A | 11/1999 | Kara |
| 6,009,177 A | 12/1999 | Sudia |
| 6,023,509 A | 2/2000 | Herbert et al. |
| 6,026,163 A | 2/2000 | Micali |
| 6,044,350 A | 3/2000 | Weiant et al. |
| 6,064,751 A | 5/2000 | Smithies et al. |
| 6,091,835 A | 7/2000 | Smithies et al. |
| 6,219,423 B1 | 4/2001 | Davis |
| 6,237,096 B1 | 5/2001 | Bisbee et al. |
| 6,240,444 B1 * | 5/2001 | Fin .................... G06F 17/30873 |
| | | | 707/E17.111 |
| 6,307,955 B1 | 10/2001 | Zank et al. |
| 6,321,339 B1 | 11/2001 | French et al. |
| 6,327,656 B2 | 12/2001 | Zabetian |
| 6,351,634 B1 | 2/2002 | Shin |
| 6,367,013 B1 | 4/2002 | Bisbee et al. |
| 6,381,344 B1 | 4/2002 | Smithies et al. |
| 6,401,206 B1 | 6/2002 | Khan et al. |
| 6,442,594 B1 | 8/2002 | Ouchi |
| 6,584,565 B1 | 6/2003 | Zamek |
| 6,594,633 B1 | 7/2003 | Broerman |
| 6,609,200 B2 | 8/2003 | Anderson et al. |
| 6,684,196 B1 | 1/2004 | Mini et al. |
| 6,687,390 B2 | 2/2004 | Avni et al. |
| 6,796,489 B2 | 9/2004 | Slater et al. |
| 6,882,859 B1 * | 4/2005 | Rao .................... G06F 3/023 |
| | | | 345/168 |
| 6,904,416 B2 | 6/2005 | Nassiri |
| 6,931,549 B1 | 8/2005 | Ananda |
| 6,938,157 B2 | 8/2005 | Kaplan |
| 6,961,902 B2 | 11/2005 | Anecki et al. |
| 6,973,462 B2 | 12/2005 | Dattero et al. |
| 7,020,645 B2 | 3/2006 | Bisbee et al. |
| 7,100,045 B2 | 8/2006 | Yamada et al. |
| 7,162,635 B2 | 1/2007 | Bisbee et al. |
| 7,237,114 B1 | 6/2007 | Rosenberg |
| 7,340,608 B2 | 3/2008 | Laurie et al. |
| 7,346,779 B2 | 3/2008 | Leeper |
| 7,502,934 B2 | 3/2009 | Dietl |
| 7,555,459 B2 | 6/2009 | Dhar et al. |
| 7,562,053 B2 | 7/2009 | Twining et al. |
| 7,581,105 B2 | 8/2009 | Dietl |
| 7,596,511 B2 | 9/2009 | Hall et al. |
| 7,657,531 B2 | 2/2010 | Bisbee et al. |
| 7,707,153 B1 | 4/2010 | Petito et al. |
| 7,743,248 B2 | 6/2010 | Bisbee et al. |
| 7,747,495 B2 | 6/2010 | Malaney et al. |
| 7,769,681 B2 | 8/2010 | Misraje et al. |
| 7,822,690 B2 | 10/2010 | Rakowicz et al. |
| 7,916,906 B2 * | 3/2011 | Hicks .................... G06F 21/32 |
| | | | 382/119 |
| 7,934,098 B1 | 4/2011 | Hahn et al. |
| 8,065,527 B2 | 11/2011 | Veluchamy et al. |
| 8,078,544 B2 | 12/2011 | Twining et al. |
| 8,078,878 B2 | 12/2011 | Dietl |
| 8,145,911 B2 | 3/2012 | Ross et al. |
| 8,204,807 B2 | 6/2012 | Triola |
| 8,271,393 B2 | 9/2012 | Twining et al. |
| 8,442,920 B1 | 5/2013 | Rakowicz et al. |
| 8,583,931 B2 | 11/2013 | Dietl |
| 8,588,483 B2 | 11/2013 | Hicks et al. |
| 8,650,038 B2 | 2/2014 | Peirson, Jr. et al. |
| 8,655,961 B2 | 2/2014 | McCabe et al. |
| 8,838,980 B2 | 9/2014 | Gonser et al. |
| 8,949,706 B2 | 2/2015 | McCabe et al. |
| 9,176,942 B1 * | 11/2015 | McLaughlin ............ G06F 17/24 |
| 2001/0034835 A1 | 10/2001 | Smith |
| 2001/0037287 A1 | 11/2001 | Broadbent et al. |
| 2002/0004800 A1 | 1/2002 | Kikuta et al. |
| 2002/0019937 A1 | 2/2002 | Edstrom et al. |
| 2002/0040431 A1 | 4/2002 | Kato et al. |
| 2002/0052835 A1 | 5/2002 | Toscano |
| 2002/0053021 A1 | 5/2002 | Rice et al. |
| 2002/0129256 A1 | 9/2002 | Parmalee et al. |
| 2002/0143711 A1 | 10/2002 | Nassiri |
| 2003/0033241 A1 * | 2/2003 | Harari .................... G06Q 40/025 |
| | | | 705/38 |
| 2003/0110227 A1 | 6/2003 | O'Hagan |
| 2003/0229611 A1 | 12/2003 | Hintenach |
| 2004/0049445 A1 | 3/2004 | Kishore |
| 2005/0055306 A1 * | 3/2005 | Miller .................... G06Q 40/04 |
| | | | 705/37 |
| 2005/0132201 A1 | 6/2005 | Pitman et al. |
| 2006/0161781 A1 | 7/2006 | Rice et al. |
| 2006/0184452 A1 | 8/2006 | Barnes et al. |
| 2006/0277123 A1 * | 12/2006 | Kennedy ................ G06Q 40/02 |
| | | | 705/35 |
| 2007/0079128 A1 | 4/2007 | Cheng et al. |
| 2007/0208661 A1 | 9/2007 | Moran |
| 2008/0028220 A1 | 1/2008 | Wyssen |
| 2008/0097777 A1 | 4/2008 | Rielo |
| 2008/0209516 A1 * | 8/2008 | Nassiri .................... G06F 21/32 |
| | | | 726/3 |
| 2009/0204521 A1 | 8/2009 | De Sena et al. |
| 2009/0292786 A1 | 11/2009 | McCabe et al. |
| 2012/0303962 A1 | 11/2012 | Ghani et al. |
| 2013/0024418 A1 * | 1/2013 | Sitrick .................. G06F 17/241 |
| | | | 707/608 |
| 2013/0050512 A1 | 2/2013 | Gonser et al. |
| 2013/0173482 A1 | 7/2013 | Twining et al. |
| 2015/0113282 A1 * | 4/2015 | Basil .................... H04L 63/0861 |
| | | | 713/176 |

OTHER PUBLICATIONS

Neil J. Rubenking, DocuSign Pro Review, PC Magazine, 2011, Available at http://www.pcmag.com/article2/0,2817,2393565,00.asp; See also http://www.docusign.com/.

\* cited by examiner

E-SIGNATURE

BACKGROUND

The present invention relates to electronic transaction management as provided through the use of computer systems. Electronic transaction performance capabilities, for establishing relationships between parties, have been enabled over systems composed of communicatively networked computing devices. These systems have employed various tools, techniques, mechanisms and capabilities in order to allow parties to accomplish transactions for various purposes.

Unfortunately, many current transaction management systems are unable, in the context of mobile devices, to provide a universal platform enabling the interaction and performance of all required functions for accomplishing transactions. This may contribute to limiting the expansion of electronic transactions and/or signature services. As such, current systems may only provide a static environment, wherein only certain specified, networked computing devices in pre-determined locations can be used. It may also be the case that not all devices, such as mobile devices, are enabled to or can perform tasks related to the management of transaction environments and/or tasks related to electronic files and/or documents like conversion and translation, display and presentation, creation and/or generation, signature obtainment and management, document management and security.

Failure to provide a universal transaction management platform may be exemplified by many of today's transaction management systems that continue to fail to integrate their performance across various platforms and/or require the use of specific software applications for various networked computing devices. For instance, the systems may not provide a universal electronic signature obtainment capability and require each device, including mobile devices, be loaded with and use their own such application to deliver the needed executory acts. This use of independent applications can impose significantly increased document management/ processing requirements on a device and/or a system. For example, a device upon receiving a document, such as from an email, may be required to move it from a first instantiation, to the specific application for the manipulation of the document, and then return the document back to the device for further processing, such as email delivery. This also can significantly increase redundancy in transaction performance using such systems, wherein they may require the production and loading of such specific applications onto multiple devices or platforms, which can also limit the use of the systems to only those specific platforms or networked devices that have enough capability to actually manipulate files and perform the functions required to complete a transaction.

Many of the current systems do not provide a system controlled document execution environment(s) within which electronic signature and other acts of execution for a document can be obtained, including document execution by handwritten signature. Thus, while various electronic signature techniques, tools and/or mechanisms are employed by today's systems they can suffer from an inherent vulnerability based on their required implementation into a specific device, thereby generating a risk of inconsistency in transaction performance, and such various other drawbacks as are known and have been indicated above. For instance, it can be the case that for a document to be executed it must be sent to the device and then established by and within a specific electronic signature capability of the device for the performance of an act(s) of execution. Thus, the transaction management system is no longer in control of the document or its execution, and it is only after the completion of the act(s) of execution, while established solely on the mobile device, that the document is returned to the system.

It may also be the case that many of today's transaction management systems are incapable or have only limited capability of providing a level of implicit and/or explicit control over a transaction, any transaction documents, and the performance of required acts of execution for a document. In addition to what has been described above, the systems may allow an individual party to access and execute a document at any time under any conditions, which may, for example, promote inconsistency and questions regarding the document itself, the required parties for the document and the execution required at any given time. This may promote increased time spent by the parties in accomplishing a transaction and decrease satisfaction with the transaction. Further, no distinction may be made between transaction environments within which transaction documents may be established, thereby potentially enabling the performance of all document processing and all required acts to establish a completed, fully executed transaction document within a single transaction environment. Still further, there may be no communication by the system with parties to a transaction that may assist in the performance of the transaction. Thus, these systems may potentially contribute to the increased risk of severely impugning the integrity of any transaction it is handling and performance.

Therefore, there is a need for a transaction management system, enabled over networked computing devices, including mobile devices, that is not restricted to specific platforms and/or devices for the performance of a transaction and enables the performance of all aspects of a transaction over any device. It is therefore desired to provide methods and systems that address the herein identified and other weaknesses in the field of electronic transaction management implemented over computer systems.

BRIEF DESCRIPTION OF THE DRAWINGS

The objects and advantages of the invention will be understood by reading the following detailed description in conjunction with the drawings in which.

SUMMARY OF INVENTION

Figure 1:
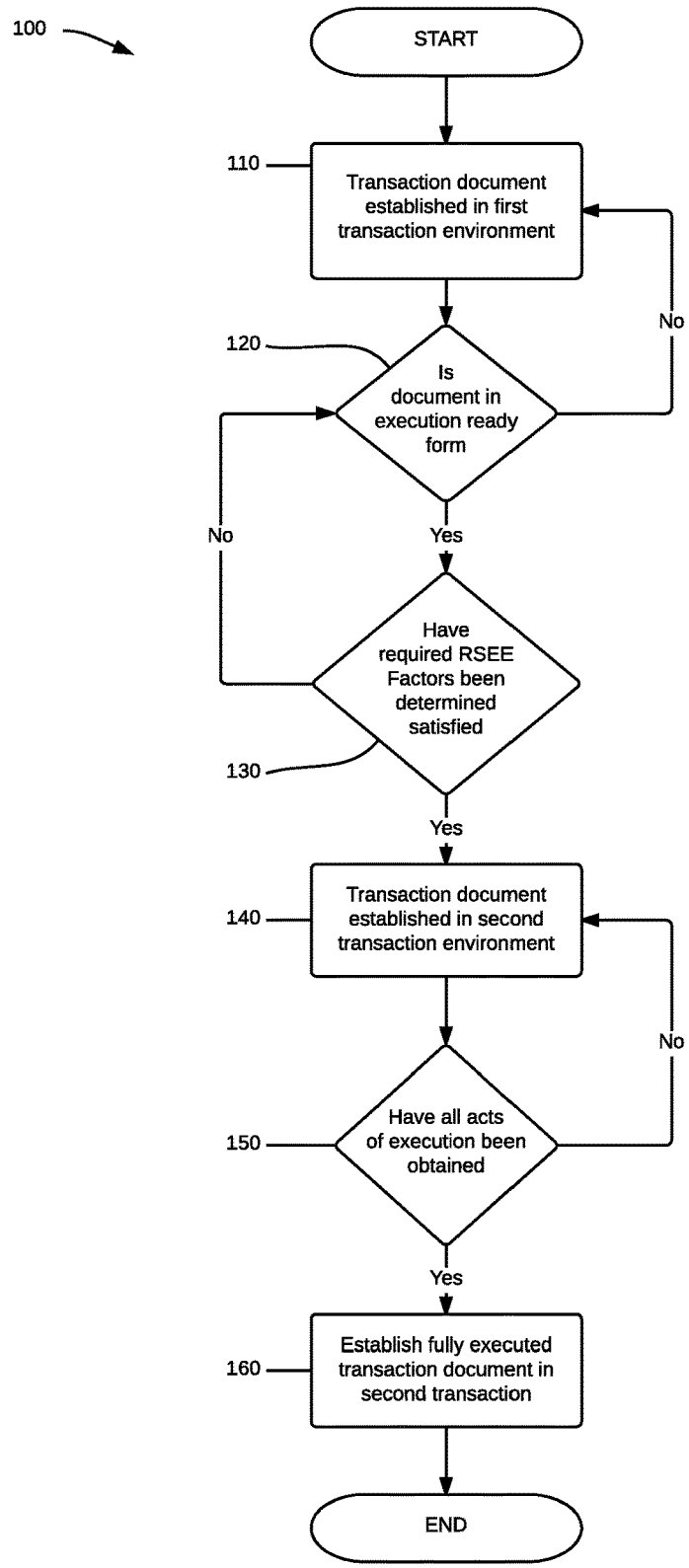
FIG. 1 is a block diagram representation of a method for facilitating a transaction between multiple parties in accordance with the current invention.

In certain exemplary aspects, the current invention provides methods and systems for the management of electronic transactions. The management of electronic transactions can include, without limitation, the enablement of all functional capabilities for accomplishing an electronic transaction as described herein and as may be contemplated by those skilled in the fields encompassed by the performance and accomplishment of electronic transactions. Through computer- and network-based methods and systems implementations, for mobile and other types of client computing devices, the current invention facilitates electronic transactions providing every aspect of transaction management, including enabling user interaction with and for a transaction via web-based transaction environments.

In additional exemplary aspects, the capabilities of the current invention can be provided as computer executable instructions, commands and/or steps that can be configured in one or more code segments, embodied within any form of or on a computer readable medium. Thus, without limitation, it can be understood that the capabilities, including any and all transaction management capabilities, described herein for any method or system can be embodied and established as a single, integrated computer program or software application. Alternatively, the capabilities can be embodied and established in a modular manner and implemented as distinct component features capable of execution in operational concert. Thus, distinct component features can be established and embodied individually or in any combination within one or more computer readable media. Whether as a single, integrated application or modular component features these computer executable instructions can be loaded, accessed and executed from an internal storage location(s) of a computing device and/or over communication interfaces with one or more storage locations of one or more computing devices, the computing devices being established in one or more physical locations.

In aspects of embodiments consistent with the current invention, methods are provided for facilitating a transaction between two or more parties. By way of example, such a method can include establishing a first transaction environment within which the parties to a transaction are enabled with various transaction performance capabilities. These capabilities including, without limitation, user interaction capabilities that enable the parties, either individually or in any combination, to interact with various transaction materials and perform various transaction management capabilities. The user interaction enabled within the first transaction environment allows for the generation of at least one electronic transaction document, wherein said at least one electronic transaction document shall comprise at least one executable transaction document. An executable transaction document being distinguished from other electronic transaction materials and/or documents in its transaction performance requirements. Transaction performance requiring the full and complete execution of the executable transaction document, wherein full and complete execution requires the performance of all required acts of execution from each of the identified signatory parties and obtainment of these acts within the executable transaction document. The first transaction environment enables an execution ready form of the executable transaction document to be arrived at, wherein no further changes to the document are allowed to be made.

The execution ready form of the executable transaction document is established within a second transaction environment. This second transaction environment is a real-time, simultaneous execution environment (referred to herein as an "RSEE"). It is within this second transaction environment that the performance and obtainment of required acts of execution can occur. The required acts of execution can include, without limitation, the capture and application of handwritten signatures from signatories to the execution ready form of the executable transaction document. Within this second transaction environment a determination is made regarding whether all required acts of execution have been performed by the signatories and obtained within the executable transaction document. Where it is determined that all acts of execution have been obtained within the document, the second transaction environment is closed. Closure of the second transaction environment, which can result in closure of the transaction, allows the completed document to be secured from any further modification, provided to all parties to the transaction and/or stored for later access and retrieval.

In aspects of embodiments consistent with the current invention, methods can be provided for allowing the execution of an electronic transaction document established within a hosted, web-based transaction environment by multiple, required signatories to the document. By way of example, such a method can include enabling at least partial performance of a transaction, within a first transaction environment that allows the establishment of at least one electronic transaction document for the transaction as an executable transaction document in execution ready form. The executable transaction document requiring the performance of acts of execution by multiple signatories and obtainment of these acts within the document. Upon a determination that the executable transaction document(s) is in execution ready form and the satisfaction of RSEE establishment requirements the executable transaction document can be established within an RSEE. The RSEE enables access to the executable transaction document by required signatories and the performance of various transaction capabilities, including, without limitation, the performance and obtainment of required acts of execution from the multiple signatories within the document.

In aspects of embodiments consistent with the current invention, methods can be provided for establishing an electronic, executable transaction document within a web-based RSEE for a transaction. By way of example, such a method can include establishing at least one electronic transaction document within a first transaction environment. Within this first transaction environment a determination is made whether the at least one electronic transaction document is in execution ready form. Where it is determined that the electronic transaction document is in execution ready form, an RSEE establishment package performs one or multiple verification processes to reach determinations on whether one or multiple RSEE factors are satisfied. The determinations made by the verification processes regarding the satisfaction of required RSEE factors are used to reach an RSEE establishment determination regarding whether to allow an executable transaction document to be established within an RSEE. An executable transaction document is established within an RSEE wherein all required RSEE factors are determined satisfied.

In aspects of embodiments consistent with the current invention, a system is provided of communicatively coupled (aka., networked) computing devices over which all aspects of transaction management, as disclosed herein, can be implemented. The computing devices can include a server and one or more processors (e.g., other computers) communicably coupled to the server. This system can implement the transaction management capabilities of the current invention over web-based transaction environments. An exemplary system of networked computing devices can include, in certain embodiments, at least one mobile computing device. The network system can enable the execution of all transaction management capabilities that, in general, allow for the management of transaction performance via multiple transaction environments; the generation/creation of electronic transaction documents, including executable transaction documents; the performance of required acts for establishing fully executed, complete transaction documents; and the secure storage of and access to all transaction materials.

In aspects of embodiments consistent with the current invention, computer executable instructions embodied on a computer readable media can be provided that facilitate the performance of an electronic transaction between multiple parties. By way of example, such an instruction set can include providing a first transaction environment wherein transaction materials can be established and manipulated to arrive at an execution ready form of an executable transaction document. In response to one or multiple satisfaction determinations related to identifiable transaction environment features or characteristics, operational parameters and/or transaction performance characteristics, the execution ready form of the executable transaction document is established in a second transaction environment (an RSEE) in which acts of execution may be performed and obtained within the document. Where all acts of execution are determined completed and the document is established within the second transaction environment as a fully executed transaction document, the transaction can be closed which results in the securing of the fully executed transaction document against further changes.

An emphasis of distinctive uniqueness for the current invention may be found in its management of a real-time, simultaneous execution transaction environment (referred to herein as the "RSEE" or "HESS RSEE"). The RSEE is a controlled electronic document execution environment and its establishment, maintenance or closure (expiration and/or termination) can be based upon determination of the satisfaction of certain transaction characteristics and/or operational requirements, herein referred to as "RSEE Factors". In addition, the current invention facilitates transaction performance via the use of mobile computing devices and where parties, including signatory parties, to the transaction are remotely located from one another. These and any other points of emphasis shall be understood as neither a limitation of or intent to exclude from the scope of the current invention any variations, applications or adaptations of the technologies employed herein.

This summary has been provided to introduce a selection of concepts in a simplified form that are further described below in the detailed description. This summary is not intended to provide an exhaustive identification of any or all key features or essential features of the claimed subject matter, nor is it intended to be used to limit the scope of the claimed subject matter. It should also be understood that, although specific implementations and implements are described herein, the described technology may be applied to other systems.

DETAILED DESCRIPTION

While the production and application of various embodiments of the present invention are discussed in detail below, it shall be understood that the present invention provides many applicable inventive concepts that may be embodied in a wide variety of specific configurations and contexts. The descriptive details herein provided for specific embodiments are not intended to limit the scope of the current invention, but merely illustrative of ways to make and use the invention. It should be emphasized that the terms "comprises" and "comprising", when used in this specification, are taken to specify the presence of stated features, steps or components; but the use of these terms does not preclude the presence or addition of one or more other features, integers, steps, components or groups thereof. In accordance with exemplary embodiments of the present invention, the following objects are achieved in systems and methods and by implementation of computer program(s) that enable all transaction management capabilities for an electronic transaction. Electronic transaction management capabilities being understood to encompass and include, without limitation, providing any and all capabilities related to accomplishing a transaction.

It is contemplated and as described herein, the capabilities of the current invention enable all aspects of transaction management. These capabilities can be variously configured, enabled and implemented. They can be provided as computer executable instructions/commands, methods, steps, and such other forms as contemplated by those skilled in the art. They can be loaded upon and executed over computing devices, such as an independent computing device and/or multiple computing devices communicatively coupled or networked to one another. Therefore, it shall be understood that all aspects of the current invention are determinable or customizable capabilities, features, and components. As such, their execution and performance may be enabled separately or in conjunction with one another, include fewer or additional requirements and the "order" of their execution can be altered without departing from the scope and spirit of the current invention. Therefore, it is understood that any management capabilities employed and utilized for accomplishing a transaction are determinable features and can affect transaction performance as enabled within one or more transaction environments provided by the current invention.

In general, the transaction environments provided by the current invention establish the transaction interface for an administrator, user, party, signatory and/or other identified person(s) to a transaction. These virtual or web-based transaction environments provided by the current invention can be understood as one or more hosted websites, web-screens, webpages and/or any other virtual locations that are made accessible over an established network, such as the Internet, or otherwise. These transaction environments are accessible, such as via a network, by any communicatively coupled computing device, including web-based or Internet enabled computing devices. Therefore, user interaction with a transaction, any transaction environments, the transaction management operational parameters, capabilities provided and/or enabled, and any associated transaction materials is enabled and allowed via these transaction environments. As will be described, the network established by and for the current invention contemplates communicative coupling with remote systems, which can include any various computing devices, other networks of connected computing devices and any computing platforms capable of executing computer implementable instructions and/or instruction sets. As enabled by an implementation of the HESS Software for managing a transaction, it is within these transaction environments that user performance of any and all functional capabilities is allowed, such as any act of execution whether by handwritten electronic signature or other electronically based document execution mechanism. Thusly, the configuration for the current invention as a set of computer executable instructions embodied within a computer readable medium is commonly referred to herein as the "HESS" or "HESS Software".

A transaction management system of the current invention is established wherein an implementation of the HESS Software occurs within a computing device, or in a modular manner over multiple computing devices, that is or are communicatively coupled with additional computing devices. Such a system, over which the transaction management capabilities of the current invention are established and enabled, is commonly referred to herein as the "HESS System". System implementations of the current invention can be established to provide a centralized transaction management capability or a distributed transaction management capability. For example, as a "centralized service" the transaction management capabilities can be loaded on a computing device, in communication with other computing devices, from which the management of all aspects of transaction performance can be enabled. Alternatively, as a "distributed service" one or more of the transaction management capabilities can be provided as distinct component features (modules). These modules can be loaded in two or more networked locations, accessible by other networked computing devices, and capable of working independently and/or in operational concert to enable the management of all aspects of transaction performance. In either architecture, user interaction with the functional capabilities provided by the HESS Software for transaction performance is enabled via the one or more transaction environments that can be established for a transaction. Therefore, any computing device(s) may allow user interaction with one or more transaction environments for a particular transaction via their communicative coupling (e.g., over the Internet) to a HESS Software implementation upon one or more networked computing devices.

Various transaction materials that can be handled by the current invention may include, without limitation, transaction data, information and/or electronic transaction documents. Electronic transaction documents are any documents generated, created and/or necessary to the performance and accomplishment of a transaction and are commonly referred to herein as "electronic transaction documents" or "transaction document(s)". Those transaction documents that require execution, such as by the performance of an act of execution or any other act that can provide an indication of assent, consent or agreement by a party to the transaction, can more specifically be referred to herein as "executable documents" or "executable transaction document(s)". Transaction data and information can include any data or information relevant for a particular transaction. Therefore, it can include any data or information that relates to or impacts upon the performance of a particular transaction and/or any associated transaction environments, such as the definition of operational parameters and/or determinations on the scope of capabilities that are or to be provided. It can also include any other data or information designated for a particular HESS implementation or that is defined, in any manner, via the establishment of a HESS System, that promotes or is necessary to the performance and accomplishment of a transaction being handled by the current invention.

By way of description for particular exemplary embodiments, it is within an RSEE that an executable transaction document can be established, acts of execution performed and obtained and a legally binding relationship between two or more parties can be established, such as by completion of a fully executed agreement. Within the RSEE the real-time, simultaneous obtainment (i.e., capture and application) of handwritten signatures from a plurality of required signatories to an executable transaction document can occur. In addition, many different act(s) of execution, document management and/or other transaction performance capabilities can be performed within an RSEE or any of the other transaction environments employed for a particular transaction as may be provided. Transaction performance can employ multiple, associated transaction environments, which can include one or more RSEEs, to allow users to accomplish a particular transaction.

The establishment of an RSEE by the current invention for a transaction or multiple transactions, may or may not require one or more determinations be made regarding one or more operational features of a transaction(s). These operational features are referred to herein as "RSEE Factors." Required RSEE Factors that can be subject to verification determinations can include, without limitation, the following: (i) whether an executable transaction document requires execution by a plurality of signatories; (ii) whether a plurality of the required signatory parties are concurrently accessing the electronic transaction document; (iii) whether a mobile computing device is being used by at least one of the plurality of signatory parties to access the electronic transaction document; and (iv) whether at least one concurrently accessing signatory party is physically remote from at least one other concurrently accessing signatory party.

Other RSEE Factors and satisfaction determinations may be required for embodiments of the current invention. The determinations made by the verification processes regarding the satisfaction of required RSEE factors are used to make various determinations, such as RSEE establishment determinations, RSEE maintenance determinations and/or RSEE closure determinations, which may determine whether to allow an executable transaction document to be established within an RSEE, maintained within an RSEE and/or whether to close an RSEE. An executable transaction document can be established or maintained within an RSEE when all required RSEE factors are determined satisfied. In addition, an RSEE can be closed upon one or more satisfaction determinations regarding various RSEE factors.

Functional capabilities configured for and provided by the current invention can be individually established or collectively configured and referred to herein as "engines". Various terms, such as functional features, performance aspects, component features, or other such terms can be used herein to indicate one or more functional capabilities being provided. An implementation of the HESS Software can establish all functional capabilities or allow selection and use of one, some, less than all or all capabilities. It is understood that an implementation of the HESS Software, including the functional capabilities configured therein, is determinable and shall not be restricted to any exemplary description provided herein.

For certain exemplary embodiments, the HESS Software can be configured with the following engines: (i) Website Management Engine; (ii) Document Management Engine; and (iii) RSEE Engine. These engines can be understood to include the executable commands that provide all of the functional capabilities that may be established for a HESS System. It is contemplated that a HESS Software configuration may vary and include no engines, a fewer number of engines or a greater number of engines for enabling the transaction management capabilities of a HESS System. These engines can be configured within a single implementation or be individually configured within distinct modules and variously implemented.

Various transaction management functional capabilities enabled and provided by the current invention can include, without limitation, the following: (i) establishment, maintenance and/or termination of web-based transaction environments; (ii) electronic document management, including without limitation document access, retrieval, creation, generation, manipulation, editing, amendment, modification, execution, conversion and storage; (iii) website(s) management; (iv) communications management; and (v) establishment, maintenance and/or termination of an RSEE transaction environment.

Still further the transaction management capabilities of the current invention can include the coordination and management of the electronic document execution process, which can include management of the timing of performance and obtainment of acts of execution, the management of multiple, associated documents requiring execution, multiple execution requirements, and execution management for a document across multiple locations; the creation, generation, association and/or coordinated management of multiple transaction documents, including multiple versions of such documents; verifying and managing of operational characteristics and/or transactional requirements; managing one or multiple websites and/or various web-pages and interfaces for presenting transaction materials and accomplishing transaction performance; generating and issuing of digital certificates; applying notarization techniques; applying various security features, access control, and/or encryption techniques; authenticating and packaging of an electronic document(s); and managing of the ownership and transfer of digital electronic documents. Still further, other additional features can include enabling the use of various electronic signature techniques and utilizing various electronic signature tools and/or mechanisms; utilizing various mechanisms, such as those that can be used for scanning hard electronic documents and converting them into digital electronic documents; mechanisms for receiving user information, including various user inputs, user handwritten signatures, and/or representations of user handwritten signatures. The storage capabilities provided can allow the storage and association of any materials, including data, information and/or documents, such as a fully executed electronic transaction document together with any relevant signature information, and any other relevant information to a transaction, such as audit information. Any other contemplated and computer implemented capability for managing the performance of an electronic transaction is contemplated for inclusion in the current invention. It is contemplated that any and all of these capabilities, whether configured independently or within one or more engines, can be performed individually and/or in operational concert with any or all other functional capabilities.

Exemplary, non-limiting embodiments of processes and methods provided by the current invention, which may be embodied as executable instructions on a computer readable media, can include various and multiple operational steps to be performed. The order of performance of any method(s), step(s), instruction(s), and/or aspect of the current invention can vary from any specific illustration provided herein without departing from the current invention. It can be understood that the processes and methods may be performed over a HESS System by logic executing HESS Software and communicatively connecting multiple, computing devices.

As shown in the flow diagram of FIG. 1, a method 100 of the current invention can facilitate a transaction between two or more parties by employing the use of web-based transaction environments, including at least one real-time, simultaneous execution environment (referred to herein as an "RSEE"), for transaction performance. In the current embodiment, the method includes the obtainment of a plurality of handwritten signatures to an executable electronic transaction document, thereby establishing a complete, fully executed transaction document.

Method 100, for facilitating a transaction, can include a first step 110 wherein an electronic transaction document is established in a first transaction environment. It is contemplated that the transaction document is for two or more parties to a transaction and at least one version of the document is maintained within the first transaction environment. As will be described, the establishment and maintenance of at least one version of this electronic transaction document can encompass multiple document versions and several process determinations. In a next step 120, it is determined whether the electronic transaction document is in execution ready form. This determination can be made while the transaction document is established in the first transaction environment. It is contemplated that this can be part of the establishment of the electronic transaction document without departing from the scope and spirit of the current invention. For the current exemplary embodiment, upon a determination in step 120 that the transaction document is in execution ready form, one or multiple required RSEE Factor satisfaction determinations (verifications) are made in step 130. Upon verification that all required RSEE Factors have been determined satisfied in step 130, the execution ready form of the electronic transaction document may be established in a second transaction environment in step 140. In particular embodiments, this second transaction environment may be understood as a real-time, simultaneous execution environment (the "RSEE") for a transaction. Within the second transaction environment, a next step 150 determines whether all required acts of execution have been obtained within the document. In particular embodiments, the required acts of execution can include the obtainment of handwritten signatures from at least two (a plurality) signatories to the document. Where, in step 150, it is determined that all required acts of execution have been obtained within the document then the second transaction environment can be closed in step 160, wherein the closure of the second transaction environment can result in the completion of the transaction.

In reference to step 110, a first transaction environment for a transaction between multiple parties allows for the establishment of an electronic transaction document. For instance, a document can be accessed, retrieved and/or generated from a pre-existing, exemplary document (templates) library. This document library can provide and allow the establishment of various types of transaction materials, including transaction documents. Within this first transaction environment an electronic transaction document can be created, either in part or in its entirety, by a single party to the transaction or by multiple parties to the transaction. Still further, the editing, amendment, modification and any other manipulation of any type of transaction materials, including an electronic document, can be performed within the first transaction environment.

Within the first transaction environment, the electronic transaction document is established as an executable transaction document. An electronic transaction document is established as an executable transaction document by the presence and/or inclusion of signature blocks within. Signature blocks are locations within a document that enable the obtainment, within the document, of required acts of execution for the document by and from required signatories to the document. Electronic transaction document manipulation, including any editing, modifying and/or amending thereof, enabled within the first transaction environment can allow the establishment of any number and form of signature blocks (e.g., "HESS Blocks" and any other forms of electronic signature) within the document. It can also be the case that the presence of all required signature blocks for an electronic transaction document can be confirmed and verified as satisfactory.

The executable transaction document established within the first transaction environment can include multiple signature blocks, wherein at least two or more of these signature blocks allow for the obtainment of handwritten signatures from different signatories to the executable transaction document. The plurality of signature blocks requiring handwritten signatures may or may not identify and/or encompass all parties to the transaction and/or signatories to the executable transaction document. Therefore, it can be understood that a plurality of required signatories are at least two or more of the parties to the transaction and may or may not comprise all signatories or parties to the transaction and the executable transaction document.

The first transaction environment allows the editing and customization of the transaction document to arrive at a form, including all required signature blocks, of the transaction document that best suits the needs of the parties to the transaction. In reference to step 120 of the current method, it is within this first transaction environment that an execution ready form of the executable transaction document is arrived at. Arrival at the execution ready form may encompass the performance of various capabilities and processes. The execution ready form of the executable transaction document can be understood and referred to herein as the "execution ready executable transaction document", "final document", "final agreement", "final transaction document" or such other indicator or designation as may be provided. The final document is an agreed upon form of the executable transaction document wherein no further changes may be made to the document prior to the obtainment of at least some of the required acts of execution as provided by the signature blocks contained within.

Arrival at the final document can be an automated response to a determination of the occurrence of a predetermined event, such as the inclusion of one or more signature blocks within the document, and/or be enabled as a user determinable feature, wherein one or more of the parties to the transaction can determine the arrival of the executable transaction document in an execution ready form. For instance, the establishment of two or more signature blocks, which each require the obtainment of a handwritten signature from a different signatory to the transaction, can be the event whose occurrence within the document can be determined and whereupon the arrival at the final agreement can be verified. Event verification, which can determine arrival at the final agreement, can include the establishment of various types and numbers of signature blocks within a transaction document and any other contemplated features included within transaction materials.

One or any number of transaction environments may be employed in the performance of a transaction. Therefore, arrival at the execution ready form of the executable transaction document can occur within various transaction environments provided by the current invention. Thus, the method further contemplates the establishment of any transaction materials, such as the electronic transaction document(s), execution ready executable transaction document(s) and/or final agreement, in an alternative or second transaction environment that is distinct, in some manner(s), from the first transaction environment. The establishment of transaction materials in multiple transaction environments can result from modification to the material(s) established therein, as such it can be that the customization of the electronic transaction document is allowed to occur within any transaction environment. Therefore, the electronic transaction document, at any point after its creation, can be established within any transaction environment, such as the second transaction environment. From above, the executable transaction document can be generated within this second transaction environment or generated, to varying extents, in another transaction environment and then established within the second transaction environment. Still further, the final agreement can be generated, established and verified within any of these transaction environments.

With the final document established in the first transaction environment, in reference to step 130, a determination is made whether the final document is ready to be and can be established in a real-time, simultaneous execution environment ("RSEE") for the transaction. This determination, as described in reference to the RSEE establishment package herein, can be based on one or several satisfaction determinations regarding one or more required RSEE Factors. These RSEE Factor satisfaction determinations are made while the final document is established within the first transaction environment. Alternatively, it is contemplated that these RSEE Factor satisfaction determinations can be made with the final document established within various transaction environments, such as the second transaction environment described above, or any other transaction environments.

As described herein, RSEE Factors can encompass one or multiple requirements regarding certain, identifiable transaction features or transaction environment features, operational parameters, transaction performance characteristics and/or any other aspects of a transaction, transaction environment or transaction materials as may be contemplated. These specific factors can provide a basis for one or more satisfaction determinations and verifications regarding various features, such as the nature of the transaction document itself, the parties accessing the document within a transaction environment and the parties seeking to establish and access the document within the transaction environment that allows interaction with the document.

In accordance with the current exemplary method, an RSEE Factor satisfaction determination (verification) can include, without limitation, any one or combination of the following: (i) that the electronic transaction document requires execution by at least two signatories and a plurality of the at least two signatories is concurrently accessing the document within the first transaction environment; (ii) that at least one of the plurality of concurrently accessing signatories is accessing the document within the first transaction environment via a mobile device; and (iii) that at least one of the plurality of concurrently accessing signatories is remotely located from at least one other of the plurality of concurrently accessing signatories.

The use of additional RSEE Factors and requirement for additional RSEE Factor satisfaction determinations, as described herein, are contemplated by the current invention. For instance, in the current example, it is further contemplated that another RSEE Factor satisfaction determination is made, prior to establishing the final document in an RSEE, regarding whether an electronic communication from the transaction system, executing an implementation of the current invention and hosting the transaction, was sent to at least one of the plurality of concurrently accessing signatories and provided a direction or link that enables their access to the first transaction environment. The timing for transmission of this communication can vary. The communication can enable the receiving party to access the first transaction environment and, thereby, promotes the accomplishment of the transaction.

Where the required RSEE Factors are determined to have not been satisfied the establishment of an RSEE can be prohibited and the final document can be prohibited from being established in an RSEE. Where the final document is prohibited from being established in an RSEE, the final document can be maintained within the first transaction environment. Alternatively, the final document can be stored "as-is" in a memory location. Where the final document is sent to storage it can result in the closing of the first transaction environment or any other preliminary transaction environment within which the document is or had been currently established. The closing of the first transaction environment, or any preliminary transaction environment, can result in the closing of the transaction. Closing of a transaction environment and a transaction can be temporary or of a more permanent nature. Thus, the storage facilities may provide short-term or long-term storage capabilities. The transaction may be re-opened by re-establishing the saved final document, from the location in which it has been stored, within another transaction environment for the transaction at some later time. In effect, this can result in the establishment of the final document within another first transaction environment for a transaction, whereupon all aspects of transaction operation and performance can proceed.

Where the required RSEE Factors are determined satisfied, in reference to step 140, the final document is allowed to be established within an RSEE. In exemplary operation, when a new version of the final document is established in the RSEE, various web-address schema can be employed. The web-address (e.g., URL) scheme can employ various paths for accessing the document within an RSEE hosted by the current invention. The paths employed can be a conversion from one path type to another and may promote the use of shorter URLs (web-address). It is further contemplated that the URL's employed can be composite and/or amended or appended to include various data (e.g., numbers or words) that enable identification of not only specific transaction environments, but also identify specific users or parties to a transaction. Thus, as will be described in this specification, the URL's can promote the security of a transaction through assignment of URL's that identify a specific user or users and/or party or parties to a transaction.

The determination to allow a document to be established within an RSEE can require the performance of various functions. One such function that can be required, and performed prior to and/or within the RSEE, is the translation of the final document from an original format to a secondary format. Thus, the establishment of the final document in the RSEE can require its translation into a secondary document format prior to it being established in the RSEE. In the current exemplary method, the final document can be established within the first transaction environment in a PDF format, including all required signature blocks properly positioned within the document. Establishment within the RSEE can require the final document, including all required signature blocks in their proper positions, be established in a secondary, HTML/Image format. This HTML/Image version of the final document can be referred to herein as the "translated version".

In reference to step 140, the translated version of the final document is established within the RSEE. Establishment within the RSEE enables user interaction with the version of the final document displayed therein. The obtainment of all required handwritten signatures within the designated signature blocks in the final document occurs while it is established in the RSEE. The required handwritten signatures are obtained in a real-time and simultaneous manner, or at least substantially so, from at least a plurality of required signatories to the executable transaction document while established in the RSEE. The designated signature blocks, referred to herein as "HESS Blocks," are included within the final document and allow for the obtainment of these handwritten signatures.

Within the RSEE the obtainment of required acts of execution within an executable transaction document occurs. The RSEE promotes the real-time, simultaneous obtainment of some or all acts of execution, including for instance the handwritten signatures from a plurality of signatories, which can be required to fully execute a final document. The obtainment of any required execution can include the performance of any act of execution, which may also include the performance of an indication of assent, consent, agreement, permission and the like, and the capture and application of the indication within the established signature blocks. As will be described herein, the act(s), including any indicators, can include anything from a click-to-sign act, such as that provided by a check-box, button, and the like, to a handwritten signature, to any form of indication (electronic or otherwise) that may be required by the establishment of a signature block within a final document. The handwritten signature can be any form contemplated, and includes the obtainment of an electronic representation of a handwritten signature.

Within the RSEE a determination can be made regarding whether all required acts of execution have been obtained within the translated version of the final document, as indicated by step 150. The determination is based on a verification of whether all acts of execution required to complete all signature blocks included within the translated version of the final document have been obtained (i.e., captured and applied) within the document. It is contemplated that the determination can be made with the final document established in the RSEE. Where the verification of the obtainment of the acts of execution for each signature block indicates that not all signature blocks have been completed, the RSEE can determine whether to maintain the established document or not.

Where the verification indicates all signatures blocks have been completed, a fully executed and complete version of the final document can be established and maintained in the RSEE, as indicated by step 160. For the current exemplary method, the maintenance of the document is in its original format, thus it is translated from the HTML/Image version back into its original PDF version, and includes all obtained acts of execution properly positioned within the document in accordance with the signature blocks. It is contemplated that the fully executed and complete version of the final document can be maintained within the RSEE in an original format or in a translated version of the document.

It is contemplated that the complete version of the final document, in its original or secondary format, can be stored in a memory location. Where the final document is sent to storage it can result in the closing of the RSEE. The closing of the RSEE can result in the closing of the transaction. The closing of the RSEE and a transaction can be temporary or of a more permanent nature. Thus, the storage facilities may provide short-term or long-term storage capabilities. The saved final document can be accessed in its storage location and retrieved to be established in another transaction environment at some later time. The transaction environment within which the fully executed, completed final document can be established at this later time may or may not allow any further modification or amendment to be made to the document. Thus, it may allow for viewing and printing of the document, but not allowing further changes be made to the document.

Within the current method and other exemplary methods described herein, it can be the case that the obtainment of handwritten signatures from required signatories are the only required acts of execution to be performed for completing an executable transaction document and establishing a fully executed and complete agreement between multiple parties. Therefore, the final document may only require the obtainment of the handwritten signatures from two required signatories for completing document execution. Alternatively, the full execution of any executable transaction document established within the RSEE, whatever its format, can require numerous acts of execution be performed.

As will be described herein, the promotion of the performance of handwritten signatures by a plurality of required signatories to an executable transaction document can be allowed to occur in various and multiple transaction environments. Further, within the transaction environments various acts of execution can be performed and/or obtained for one or more executable electronic transaction documents. It is contemplated that the transaction environments within which one or more acts of execution can be performed and/or obtained, the timing of the performance for these acts and the number of required signatories for performing these acts can vary for a transaction.

Figure 2:
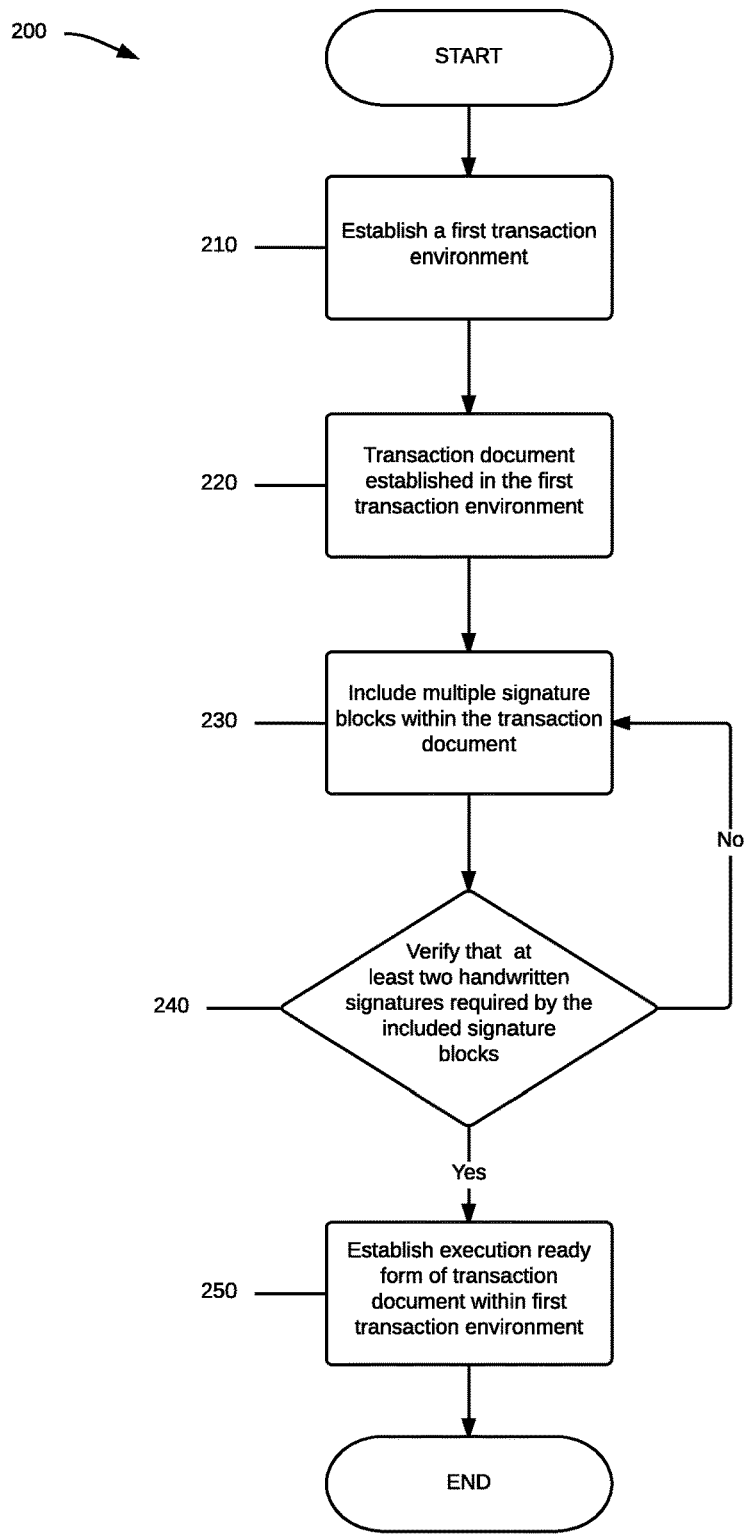
FIG. 2 is a block diagram representation showing an exemplary method for establishing an execution ready form of an executable transaction document in accordance with the current invention.

A method 200 for facilitating the generation of an execution ready form of an electronic transaction document that can be established within a real-time, simultaneous execution environment for the obtainment of acts of execution therein is shown in FIG. 2. In step 210 a first transaction environment is established for a transaction. The first transaction environment provides multiple parties with a user interface for the transaction. The user interface enabling the performance of all functional capabilities, including any transaction performance needs, by a party to the transaction. Based on input received through the user interface, a first transaction document is established in the first transaction environment in step 220. The first transaction document can be established in various manners, including but not limited to, using a previously created document that can be accessed and retrieved from a storage location (document template library) or utilizing document processing capabilities provided via the user interface to create a document. The document processing capabilities, provided for a document established within the first transaction environment, allow the amendment and modification of transaction materials, such as electronic transaction documents. In step 230 multiple signature blocks are established within the first transaction document in order to arrive at an executable transaction document. The number and positioning within the document of signature blocks can be varied significantly without departing from the scope and spirit of the current invention. It is also contemplated that the act of execution enabled to be performed for the completion of the signature blocks can vary as described herein. In certain preferred embodiments, of the multiple signature blocks established within the document, at least two must require the obtainment of a handwritten signature from at least two different signatories to the document. Therefore, in step 240, the document is verified to include at least two signature blocks that require execution by handwritten signature from at least two different signatories. The initiation of this verification processes can occur automatically or upon manual input received. For instance, the verification of the execution ready form of the executable transaction document can be performed by input received from a party interfacing with the document in the first transaction environment. Alternatively, an automated verification process can initiate upon the inclusion within the document of at least two signature blocks that require performance by the obtainment of handwritten signatures from two different signatories. Upon verification that the transaction document includes at least two signature blocks that require execution by handwritten signature an execution ready form of the executable transaction document is established in the first transaction environment in step 250. In the alternative, where the verification determines that the included signature blocks do not require execution by handwritten signature from multiple signatories the method can allow additional signature blocks to be included within the document. Upon the inclusion of an additional signature block(s) the method can proceed with verification of the handwritten signature requirement in step 240.

Based upon this verification, wherein the executable transaction document can be and is determined to be in execution ready form, the verification of required RSEE Factors for an RSEE establishment package (described herein below) can be performed. Therefore, in additional steps of the process, upon establishment within the first transaction environment of the execution ready form of the executable transaction document, an RSEE establishment package can be manually or automatically initiated. It is also contemplated that upon arrival at the execution ready form, a transaction document can be stored in a memory location based on a manual input or automated process.

The current invention contemplates method embodiments for establishing RSEE compliant transaction documents. The handling of a transaction over an exemplary HESS System (described below) is provided through the use of various transaction environments. The RSEE is a particular transaction environment within which the obtainment of acts of execution can be enabled. As described herein, the establishment of a document within an RSEE is based on satisfaction determinations (verification/validation) of one or more required RSEE Factors. For any transaction management provided by a HESS System implementation, the RSEE Factor verifications that are required for RSEE establishment can be pre-determined by the system configuration for these requirements or the required verifications can be a determinable feature and customized for a transaction or even on a per-RSEE basis.

Figure 3:
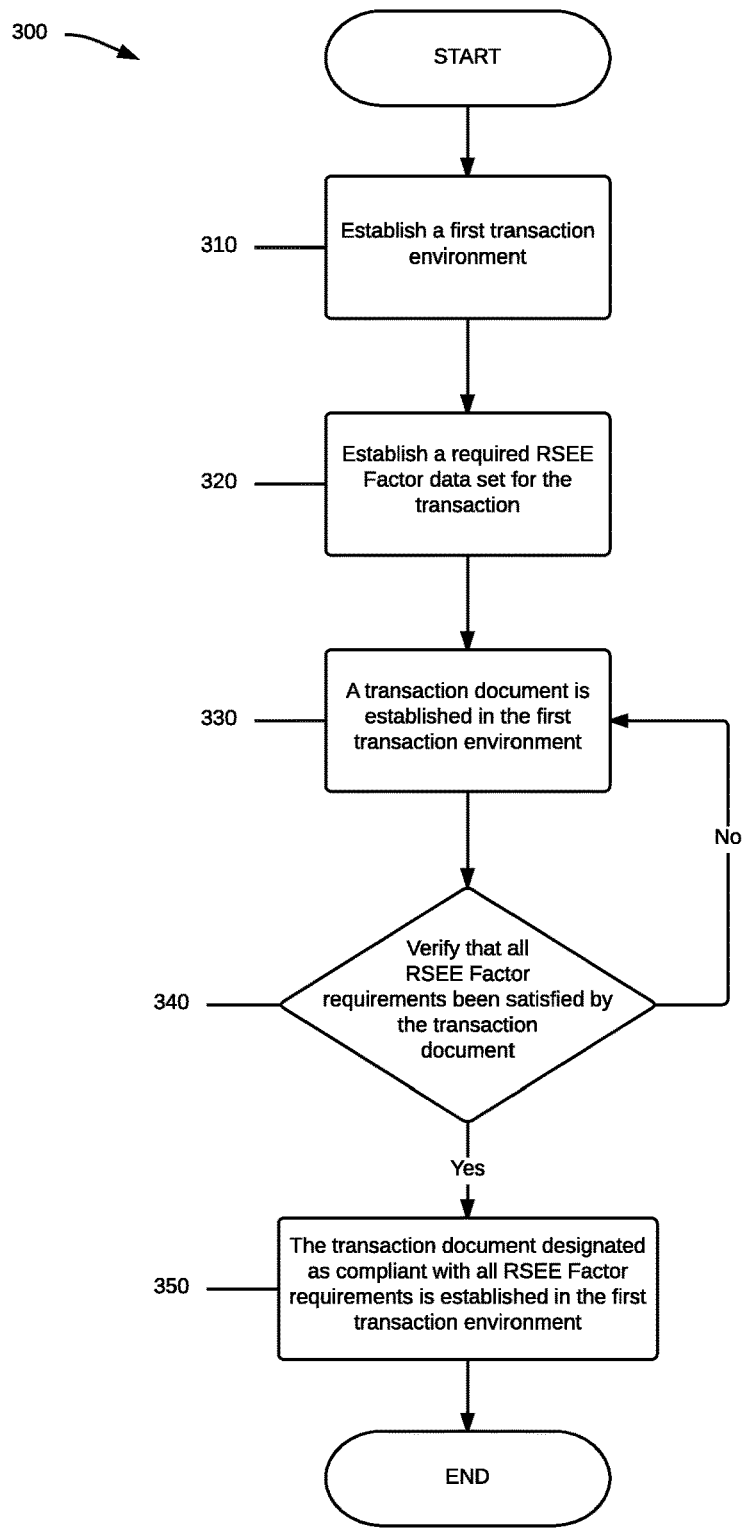
FIG. 3 is a block diagram representation showing an exemplary method for establishing an RSEE compliant form of an executable transaction document in accordance with the current invention.

FIG. 3 illustrates method 300, which is an embodiment for establishing an RSEE compliant transaction document. In step 310, a first transaction environment is established to initiate a transaction between parties. The establishment of a transaction, that can lead to the initiation and performance of any of the various methods, processes and/or capabilities enabled for accomplishing the transaction by the current invention, and described throughout this specification, is commonly initiated by the establishment of a first transaction environment. It is contemplated that the first transaction environment, via the user interface it provides, can allow and enable various parties with similar or different functional capabilities. For instance, a first transaction environment for a system administrator or transaction manager can enable them to determine and set system operation parameters, while a first transaction environment for a signatory party can enable them with document processing capabilities for establishing transaction materials, but not allow them to interact with other system operation features.

It is contemplated that the first transaction environment for any transaction, handled by the current invention can provide a unique transaction environment based on the user themselves. The first transaction environment can be a single, common transaction environment for all system users and/or parties to a transaction. It is contemplated that it may be a universal transaction environment for the initiation of all transactions managed by a HESS System. Alternatively, the first transaction environment can be understood and implemented as separate web-based transaction locations. Regardless, all transaction environments provided by the current invention promote the accomplishment of one or more transactions.

In step 320, a required RSEE Factor data set, which can be understood as a list of required RSEE Factors to be determined satisfied or not, is established for the transaction. The timing for the establishment of the RSEE Factor data set for the particular transaction can vary. For instance, it can be established upon initiation of the transaction or at any time during the performance of a transaction, but prior to the establishment of a transaction document within an RSEE. The RSEE Factor data set can be established based upon an implementation of a HESS Software configuration. This data set is intended to provide an identifiable record of the required verifications of RSEE Factors and all required RSEE Factors configured for the handling of a transaction provided by a HESS System. This data set can be formatted in any manner and gather and display the information in various forms, such as a listing, a table, a matrix or such other forms as may be contemplated for use.

The data set of required RSEE Factors can comprise information gathered from various sources, such a pre-determined HESS System configuration of required RSEE Factors and verifications or a customized configuration of required RSEE Factors and verifications. It is further contemplated that the RSEE Factor data set itself can be customized by the addition or deletion of various required RSEE Factors and/or RSEE Factor verifications. Such modifications made within the data set may be restricted in implementation and use to the establishment of an RSEE compliant transaction document. However, such modifications may be promulgated, automatically or manually, throughout a HESS System and, thereby, change the nature of RSEE establishment for a transaction or multiple transactions managed over the system.

Within the first transaction environment a transaction document can be established. In step 330, a transaction document is established through use of any of the document processing and/or document retrieval (from a document library) capabilities provided by the current invention. Transaction document establishment can be performed by one or more parties to a transaction via their user interface provided by a transaction environment. The performance capability can be similar across all transactions and transaction environments employed for transaction document establishment and in the performance of any methods enabled by the current invention.

A comparison against the RSEE Factor data set can be made in step 340 to determine whether all RSEE Factor requirements have been satisfied by the generation of the transaction document within the first transaction environment. For instance, within the first transaction environment and during transaction document establishment an RSEE Window displaying a list of required RSEE Factors may be presented to the parties. The display of the RSEE Window may be of any duration and the size may be of various configuration. It can be that the list updates upon the inclusion or removal of items within any transaction document that satisfy one or more of the required RSEE Factors. The updating can be performed manually or be automated. Thus, a comparison can be accomplished through the use of prompts or various displays, which can be referred to herein as the "RSEE Window", provided to the parties during the establishment of the transaction document, which can inform them of document status. This comparison can be made at any time during the establishment of a transaction document or after a version of a transaction document has been preliminarily completed. Preliminary completion of a transaction document can be a version of the document that is established in the first transaction environment that has not yet been verified as complete. Document status can be any indicator or indication provided, via the RSEE Window, to the parties of what RSEE Factors have or have not been satisfied by the current iteration of the document.

A monitoring or tracking of RSEE Factor compliance is part of the functional capabilities provided by this feature and displayed by the RSEE Window. For instance, upon establishment of a version of a transaction document within the first transaction environment, the RSEE Window can display a list of RSEE Factor compliance items. One such listed item within the RSEE Window, may be that the document is required by an RSEE Factor to include at least two signature blocks requiring execution by handwritten signature, each by a different signatory. Upon inclusion of two signature blocks that meet this required RSEE Factor, the display within the RSEE Window can be amended to remove this item from the list or simply to provide some other form of designation that this item has been satisfied. The designation can be of any manner, such as a check is placed next to the listed item or a different color or size font is applied to the item.

The RSEE Window provides a visual display to parties and allows for the tracking and monitoring of RSEE Factor compliance. In this manner, the establishment of a transaction document can be managed directly by the RSEE establishment requirements. As the RSEE Window designates compliance with the listed items therein, it is providing a roadmap for document creation, which promotes the establishment of a transaction document that is in execution ready form. In operation, as each listed item in an RSEE Window is indicated as satisfied, by whatever designation mechanism employed, it is providing a preliminary verification for the transaction and transaction document regarding satisfaction of RSEE establishment criteria.

Where it is determined that not all RSEE Factor requirements are satisfied by the transaction document established within the first transaction environment the process can allow further document processing to occur. Whereupon all items listed in an RSEE Window are designated as satisfied, step 350 establishes an RSEE compliant version of the transaction document in the first transaction environment. The RSEE compliant version is one that is compliant with all RSEE Factor requirements. This can allow a designation of the transaction document as being in execution ready form or some alternative designation. For instance, a preliminary determination can be associated with the transaction document. A preliminary determination can be used as an indicator for the current invention to initiate an RSEE establishment package, wherein the document can be confirmed or not as ready for establishment within an RSEE. It is contemplated that this preliminary determination can be stored in association with the transaction document. Then, upon later retrieval and establishment within a transaction environment the preliminary determination can save transaction performance time and improve transaction efficiency by making the information available for confirmation by an RSEE establishment package.

In contemplated additional steps, upon the determination of satisfaction of all RSEE Factor requirements, the transaction document can be established in an RSEE or some other transaction environment. Still further, where the determination reached in step 340 is "No" the document can be established in an alternative transaction environment for further document processing or stored for later access and retrieval.

The current invention provides for the establishment of a controlled, electronic document execution transaction environment. This controlled document execution transaction environment can facilitate and enable methods and systems for the establishment of a legally binding, formally executed electronic document (e.g., agreement) between multiple parties through the obtainment of handwritten signatures within an electronic transaction document established therein. For instance, in an exemplary operation, the current invention can provide a method for establishing a real-time, simultaneous execution environment (RSEE) for an execution ready form of an executable electronic transaction document. Within a first transaction environment, wherein an execution ready electronic transaction document is currently established, a verification or satisfaction determination is made regarding one or multiple required RSEE Factors. In the alternative, it is contemplated that RSEE establishment can be accomplished without any RSEE Factor satisfaction determinations. Where the RSEE Factor is determined satisfied, the execution ready electronic transaction document is established within a second transaction environment. The second transaction environment may or may not be capable of promoting the real-time, simultaneous obtainment of handwritten signatures from signatories to the transaction document established therein. Where it is determined that the required RSEE Factor(s) is not satisfied, RSEE establishment is prohibited and the execution ready electronic transaction document is prohibited from being established within an RSEE.

Figure 4:
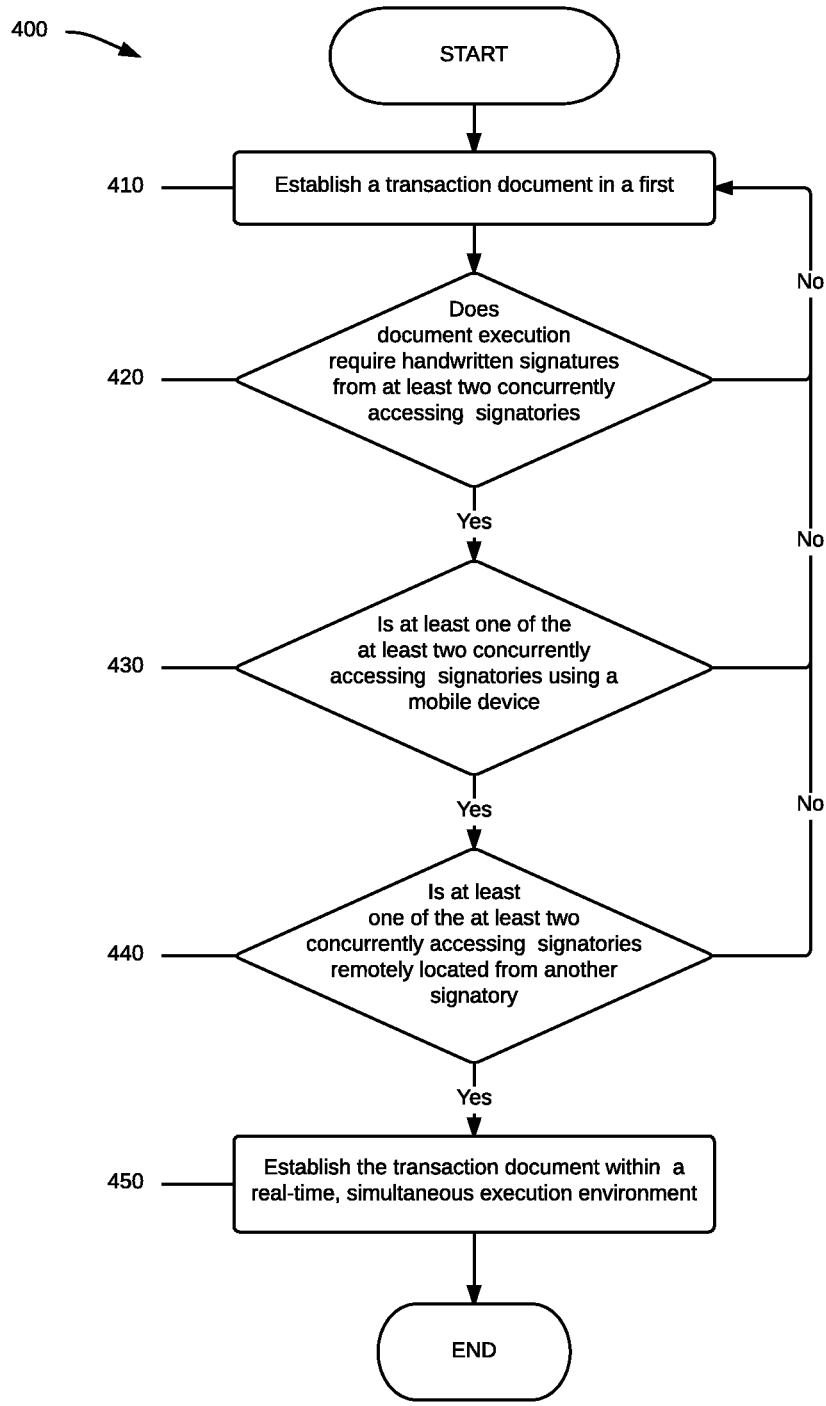
FIG. 4 is a block diagram representation showing an exemplary method for establishing a real-time, simultaneous execution environment compliant transaction document in accordance with the current invention.

FIG. 4 illustrates a method 400 for establishing a document within a real-time, simultaneous execution environment (RSEE). In a first step 405 a transaction document is established in a first transaction environment. In particular embodiments, this transaction document can be an execution ready form of a transaction document. Alternatively, it is contemplated, that the form of the transaction document established prior to initiation of the method can vary in accordance with the current invention. In step 410 it is determined whether a transaction document, established in a first transaction environment, requires execution by obtainment of a handwritten signature from at least two signatories and is being concurrently accessed in the first transaction environment by a plurality of the required at least two signatories. Where it is determined that the requirements identified for step 410 are satisfied, step 420 can provide a determination regarding whether at least one of the plurality of concurrently accessing signatories is accessing the document within the first transaction environment via a mobile device. Where it is determined that the requirement(s) of step 420 is satisfied, step 430 can provide a determination regarding whether at least one of the plurality of concurrently accessing signatories is remotely located from at least one other of the plurality of concurrently accessing signatories. Where it is determined that the requirement(s) of step 430 is satisfied, step 440 provides for the establishment of the document in a second transaction environment that allows real-time, simultaneous execution of the document by the obtainment of handwritten signatures from each of the plurality of concurrently accessing signatories.

Thus, FIG. 4 can be understood to illustrate a method provided by the current invention for establishing an executable transaction document for a multi-party transaction within a real-time, simultaneous execution environment. As will be described below in reference to the RSEE establishment package, the determinations being made in the process steps are satisfaction determination regarding required RSEE Factors. In the first step 410 it is determined whether a transaction document, established in a first transaction environment, requires execution by obtainment of a handwritten signature from at least two signatories and is being concurrently accessed in the first transaction environment by a plurality of the required at least two signatories. Where it is determined that these requirements are not satisfied, the document can be prohibited from being established in an RSEE and be maintained in the first transaction environment. It is contemplated that the document can be maintained in the first transaction environment or stored in a memory location. Within the first transaction environment the determination regarding satisfaction of the previously identified requirements can be re-initiated automatically or manually. It is also contemplated that some additional act of document processing, enabled to be performed within the first transaction environment, may be required to be performed prior to initiation of the determination regarding satisfaction of the above identified requirements. Where the determinations made in steps 420 or 430 are that this requirement is not satisfied, the document can be prohibited from being established in an RSEE and, similar to that described above, be maintained in the first transaction environment or stored in a memory location.

It is contemplated that prior to establishment of the transaction document within an RSEE or other execution environment, additional RSEE Factor satisfaction determinations can be made. For instance, a satisfaction determination can be made regarding whether an electronic communication from a transaction system was sent to at least one party to a transaction, such as at least one of a plurality of concurrently accessing signatories, and provided a direction or link that points and/or enables their access to the first transaction environment as described for the current example. The direction or link can be any type of a uniform resource identifier ("URI"), such as a uniform resource locater ("URL"), or any other type of indicator that can point a party or parties to a transaction environment for a transaction.

It is contemplated that the establishment of a transaction document in a transaction environment, such as an RSEE, can require the translation of that document from an original format to a second format. Document translation can occur for a document established within an RSEE. It is also contemplated that document translation may or may not occur prior to the establishment of a document within an RSEE or other transaction environment that allows performance and/or obtainment of acts of execution.

Document translation of a transaction document can convert the document from an original format to a second or secondary format. Translation may be from any original document format, such as a PDF format, to any secondary format, such as an HTML/Image format. Any document format that allows for the accomplishment of a transaction being managed by the current invention is contemplated for use. It is contemplated that a non-translated version or translated version of a transaction document can be established within any transaction environment, including an RSEE or other transaction execution environment. Document translation may or may not be initiated manually by a user or can be automatically initiated in a manner similar to or making it an RSEE Factor to be verified prior to RSEE establishment.

Any method for establishing an executable transaction document in an real-time, simultaneous transaction environment can include providing an execution ready electronic transaction document requiring execution by a plurality of parties in a first transaction environment. A link can be communicated to at least one of the plurality of parties that enables access to the executable electronic document, wherein the at least one party is physically remote from at least one other party. Then the execution ready electronic transaction document can be established in a real-time, simultaneous execution environment for the plurality of parties when concurrent access to the document is made by the plurality of parties and wherein at least one party is accessing the document via a mobile computing device. As indicated in previous exemplary methods, the obtainment of handwritten signatures from the parties to the document, while the document is established in the RSEE, can enable and allow for the generation of a fully executed document or a partially executed document.

In addition, establishing a real-time, simultaneous execution environment (RSEE) for a multi-party transaction, can require a determination being made within a preliminary (non-RSEE) transaction environment, as to whether an electronic transaction document established therein requires the performance of an act of execution. The required performance of an act of execution providing a distinction between an electronic transaction document and an executable transaction document. This determination can be followed by the performance of one or more RSEE Factor satisfaction determinations. These determinations including, (i) that the electronic transaction document requires execution by at least two signatories and a plurality of the at least two signatories is concurrently accessing the document within the preliminary transaction environment; (ii) that at least one of the plurality of concurrently accessing signatories is accessing the document within the preliminary transaction environment via a mobile device; and (iii) that at least one of the plurality of concurrently accessing signatories is remotely located from at least one other of the plurality of concurrently accessing signatories. A confirmation is made regarding the result of each RSEE Factor satisfaction determination. Wherein the confirmation determines that each RSEE Factor satisfaction determination has been satisfied, an RSEE can be established. The RSEE can host the executable transaction document and allow for all user interaction with any transaction materials established therein. This can include, without limitation, the performance of any required act of execution and obtainment of all performed acts of execution within the document.

Figure 5:
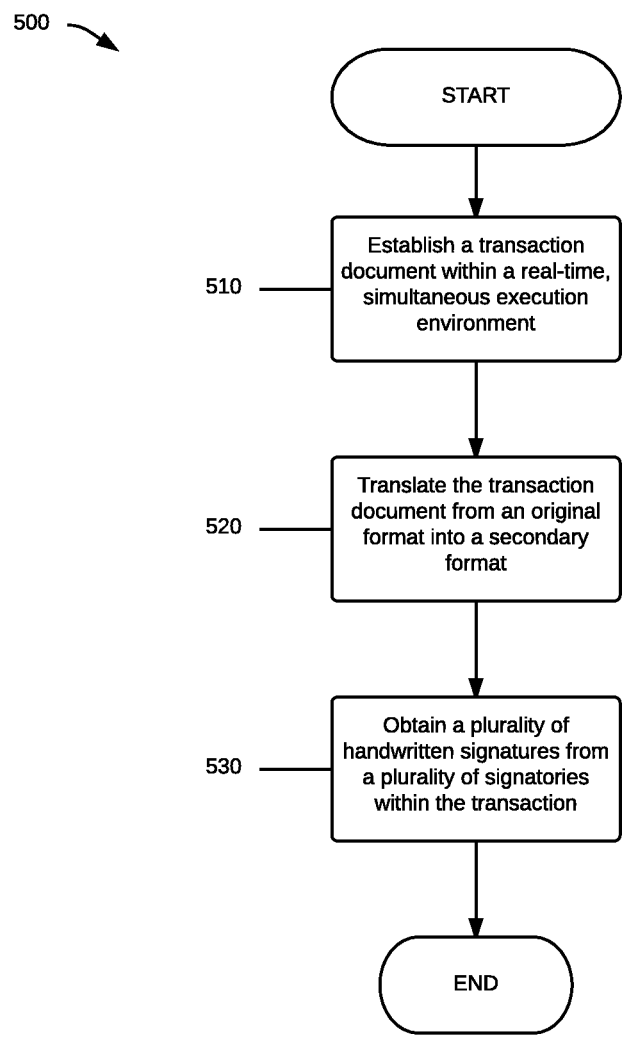
FIG. 5 is a block diagram representation showing an exemplary method for establishing a transaction document in a real-time, simultaneous execution environment in accordance with the current invention.

In exemplary embodiments, the current invention enables methods for establishing a fully executed transaction document for a particular transaction. FIG. 5 illustrates a method 500 for establishing a fully executed transaction document. In a first step 510, a real-time, simultaneous execution environment (RSEE) is established within which an execution ready electronic transaction document can be presented and/or displayed for the obtainment of acts of execution from a plurality of signatories to the transaction document. Upon establishment of the RSEE, the execution ready transaction document, in step 520, is translated into a secondary document format that enables the obtainment of the acts of execution from the plurality of signatories. In step 530 a plurality of handwritten signatures are obtained within the transaction document from a plurality of signatories, thereby establishing a fully executed, completed transaction document. It is also contemplated that the completed transaction document is translated back into its original format.

In a first step 510, the establishment of the RSEE is based on RSEE Factor satisfaction determinations, including the following: (i) that the transaction document requires execution by at least two signatories and a plurality of the at least two signatories concurrently accessed the document within a preliminary transaction environment; (ii) that at least one of the plurality of concurrently accessing signatories accessed the document within the preliminary transaction environment via a mobile device; and (iii) that at least one of the plurality of concurrently accessing signatories is remotely located from at least one other of the plurality of concurrently accessing signatories.

RSEE establishment can be determined by various RSEE Factor satisfaction determinations. For any methods identified herein, it can be that any one or combination of RSEE Factors must be confirmed satisfied. In the current method, it can be the case that the satisfaction of all three of the identified RSEE Factors must be verified in order for the RSEE to be established. Still further, other RSEE Factor satisfaction determinations in place of or addition to those identified above may be required to be performed and confirmed. For instance, verification of communication with at least one of the plurality of signatories may be required and the translation of the document prior to RSEE establishment. Still further, verification of the use of a mobile computing device by at least one of the accessing signatories to the document can be required prior to RSEE establishment.

Translation of the execution ready form of the transaction document that can occur in step 520, results in the document being established within the RSEE in a secondary document format, such as an HTML/Image format or any such other format that enables the obtainment of the acts of execution from the plurality of signatories. As previously described, document translation may be variously accomplished, utilize one or more alternative formats, employ one or more translation events for a document and be otherwise customized for a transaction.

The obtainment of the plurality of handwritten signatures (aka, acts of execution) within the transaction document from a plurality of signatories, occurs in step 530 and promotes or accomplishes the establishment of a fully executed, completed transaction document. As will be described herein, signature capture can be performed using one or more networked computing devices, including mobile computing devices, and/or one or more signature captured devices communicatively connected to these computing devices. Any known techniques for enabling the obtainment of an electronic signature, as discussed herein, may be employed without departing from the scope of the current invention.

The current method may require the verification of the obtained acts of execution, in particular the handwritten signatures. This verification may include a validation that the performance of the required acts of execution by the multiple signatories occurred simultaneously and in real-time. As will be further described in this specification, this verification of the performance of acts of execution can include determinations of when the acts were performed in relation to when the transaction document is established within the RSEE. In addition, or alternatively, the verification can include determinations of when the acts where performed in relation to one another. That is, when each independent act of execution was performed by each signatory.

The current invention may provide a verification of whether an obtained signature is a correct signature. For example, an executable transaction document can include multiple signature blocks for execution by multiple parties. Where a signature block established within the executable transaction document requires execution by Party A, the current invention can allow for verification and confirmation that any obtained act of execution within this signature block is from Party A. For instance, upon the obtainment of an act of execution within a signature block, a confirmation window ("pop-up") may appear asking a user/party to confirm that the correct signature has been obtained. This or any other type of manual verification process can be enabled to occur upon each obtainment of an act of execution, upon a closure of an execution environment for a transaction, or upon the occurrence of such other event(s) as may be contemplated.

In the alternative a verification and confirmation process for an obtained act(s) of execution within a signature block can be an automated process. Employing various well-known, and commercially available, techniques an obtained act of execution can be automatically analyzed and a determination reached as to whether the obtained act is the correct act of execution for a signature block. Any type of automated verification process can be enabled to occur upon each obtainment of an act of execution, upon a closure of an execution environment for a transaction, or upon the occurrence of such other event(s) as may be contemplated. It is understood that such verification and confirmation processes may have varying operational performance tolerances, such as verification/confirmation within varying degrees/percentages of certainty, and that such tolerances may be considered acceptable for use with the current invention.

Whether from a manual or automated process, where a determination is made that an obtained act(s) of execution is the correct act for one or more signature blocks the transaction document can then be established within a transaction environment and include the obtained act(s) of execution. Where a determination is made that an obtained act(s) of execution is the incorrect act for one or more signature blocks the transaction document can be established within a transaction environment and not include the obtained act(s) of execution. Additional transaction performance in regards to a transaction document with obtained acts of execution that have/have not been verified can occur in accordance with all aspects and capabilities described herein for the current invention.

The current method may utilize any or any combination of these performance verifications and validations in one or more additional steps to provide confirmation that the transaction document is fully executed and therefore completed. This confirmation may occur prior to a part or all of the transaction document being translated back into its original format or after the document has been translated back into its original format. This confirmation may be an automated response to the obtainment of acts of execution within signature blocks within the document. Alternatively, this confirmation may be initiated by a party to the transaction at any time, such as upon obtainment of acts of execution within the document.

It is contemplated that the obtainment of handwritten signatures from a plurality of signatories can accomplish a fully executed, complete transaction document. In such an instance, the version of the transaction document that is fully executed can be stored in a memory location. It can also result in the fully executed document being maintained in the RSEE. The maintained document may be a version of the document in its secondary format or one that has been translated back into its original format. It is contemplated that the RSEE may be closed, after the fully executed, complete version of the transaction document has been arrived at and either ready to be or established in another transaction environment and/or stored. Closure of the RSEE may result in the transaction document being established in a transaction environment alternative to the RSEE. RSEE closure may result in the transaction being closed, but allow later access and retrieval of a stored version of the transaction document.

The current invention allows for document execution to occur at the convenience of parties to a transaction, such as in situations where partial conformance with transaction requirements occurs. For instance, the obtainment of any act(s) of execution, including handwritten signatures from a plurality of signatories, may be determined to be initial acts of execution for the transaction document, but not result in the arrival at the fully executed, completed transaction document. In such instances, the obtainment of additional acts of execution, including additional handwritten signatures, may or can be required to arrive at the fully executed and complete version of the document. However, the obtainment of these additional acts may be allowed to occur based on alternative or user determined timelines that do not necessarily conform with any RSEE Factor requirements for establishment of an RSEE as are contemplated by the current invention.

Figure 6:
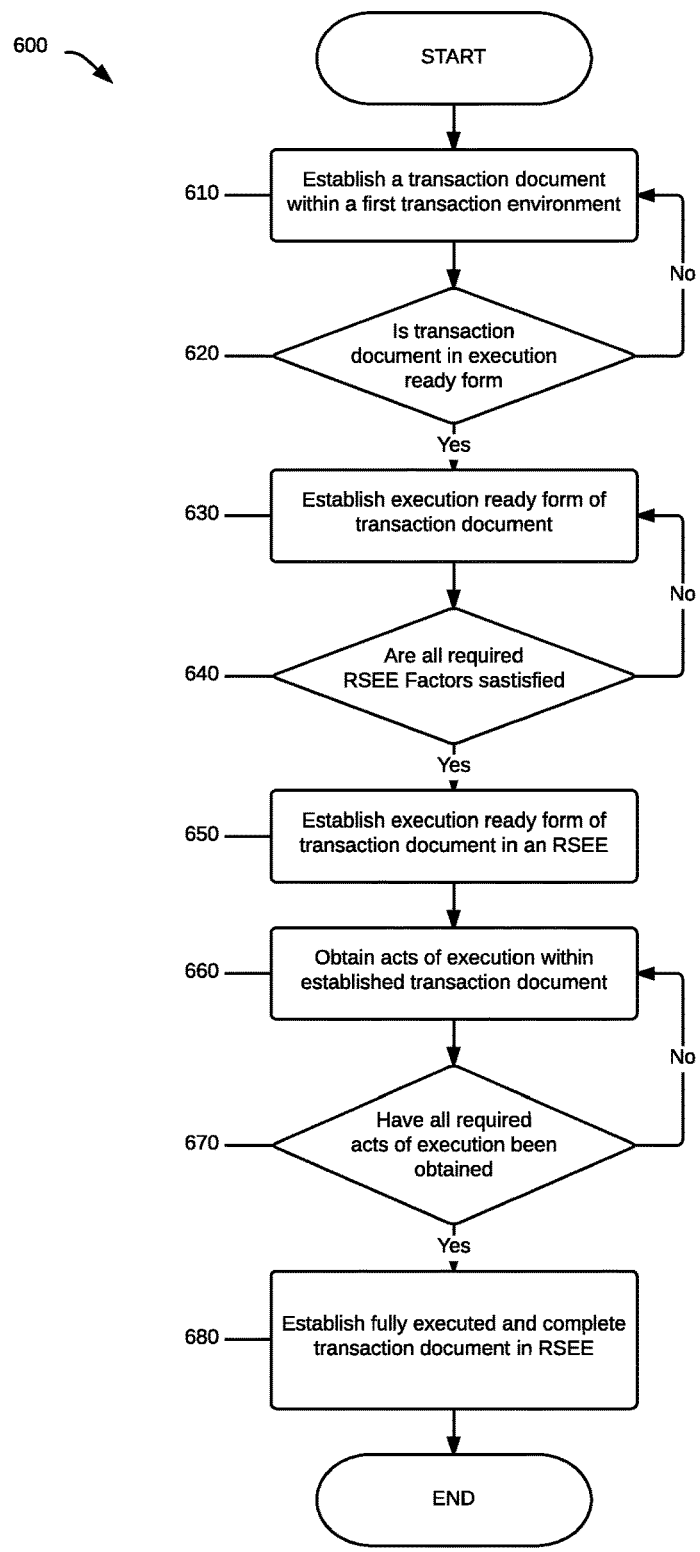
FIG. 6 is a block diagram representation showing an exemplary method for establishing a fully executed agreement in accordance with the current invention.

The current invention contemplates accomplishing a fully executed and completed agreement between multiple parties. By way of example, FIG. 6 illustrates a method 600 for arriving at a fully executed and complete agreement. In a first step 610, a transaction document is established within a first transaction environment for a transaction between multiple parties. Use of the document processing capabilities provided by the current invention enables the establishment of the transaction document within the first transaction environment. It is determined, in a second step 620, whether the transaction document is in execution ready form. The execution ready form of the transaction document is a version of the transaction document that includes at least two signature blocks that require execution by the obtainment of handwritten signatures from at least two different signatories. Where it is determined that the transaction document is in execution ready form, in step 630, it is established in execution ready form within the first transaction environment. With the document established in execution ready form, step 640 provides a satisfaction determination regarding required RSEE Factors, if any. Required RSEE Factors to be determined satisfied can vary amongst transactions being handled by the current invention, and it is contemplated for particular embodiments that the required RSEE Factors include, without limitation, the following: (i) that the transaction document requires execution by at least two signatories and a plurality of the at least two signatories concurrently accessed the document within a preliminary transaction environment; (ii) that at least one of the plurality of concurrently accessing signatories accessed the document within the preliminary transaction environment via a mobile device; and (iii) that at least one of the plurality of concurrently accessing signatories is remotely located from at least one other of the plurality of concurrently accessing signatories. In a step 650, based upon a determination that all required RSEE Factors are satisfied, the execution ready form of the transaction document is established within an RSEE. With the document established in the RSEE, obtainment of acts of execution from the signatories occurs within the signature blocks included in the document in step 660. Whereupon required acts of execution are obtained within the signature blocks, step 670 provides a determination of whether all signature blocks have been completed by the obtainment of their required acts of execution. This verification of the obtainment within the transaction document of required acts of execution can include confirmation of the completion of some or all of the included signature blocks within the document. In particular embodiments, the verification requires confirmation that the at least two signature blocks that require execution by the obtainment of handwritten signatures from at least two different signatories have been completed. Where this verification is confirmed, in step 680, the fully executed and complete transaction document is established in the RSEE. It is contemplated for this embodiment that the fully executed and complete transaction document represents and is the fully executed and complete agreement between the parties to the transaction.

It is contemplated that any embodiments of the current invention, including method 600, may or may not require the translation of the execution ready form of the transaction document. Document translation can comprise one or multiple translation events, occur in multiple steps and at multiple points within any transaction being handled by the current invention. For instance, in the current method 600, the execution ready form of the transaction document is translated from an original format into a second format prior to its establishment in an RSEE. It is contemplated that a translation can occur for a part or less than all of a transaction document. For instance, one or more signature blocks included with the execution ready form of the transaction document may be translated into a second format. Therefore, it is contemplated that document translation, which can occur for all or part of any transaction document, can be a requirement for RSEE establishment. In the alternative, a document translation event can occur while a transaction document is already established in an RSEE. The second format of the document established in the RSEE allows for the obtainment of the required acts of execution therein or such other acts as may be contemplated. It is further contemplated that the transaction document may be translated back into its original format upon closure of an RSEE, obtainment of required acts of execution, obtainment of all required acts of execution, or another event as determined for a particular transaction and its associated transaction environments.

The generation of a transaction document within a first transaction environment referred to in step 610 can be enabled to occur through the use of various capabilities provided by the current invention, as described herein, such as from document templates library and/or creation from document processing capabilities established and enabled for a user interacting with the first transaction environment. Other capabilities, such as the use of more than one transaction environment for document generation can be employed. Still further, it is contemplated that during the generation and/or modification of the transaction document, and even during its establishment in an execution ready form, at least one communication can be sent to at least one of a plurality of signatory parties to the executable document. This communication can be directed to at least one party of the said plurality of signing parties that is physically remote from a particular location or at least one other party. The communication can provide a link that enables access to the transaction document within the first transaction environment. The communication can also provide other information to the receiving party or direct the receiving party to alternative transaction environments.

The establishment of a fully executed and complete transaction document occurs, at least in part, by arriving at an execution ready form of an executable transaction document via the processing of a transaction document enabled within a first transaction environment. The document processing, contemplated to occur prior to step 620 identified above, enables the manipulation of the electronic transaction document to arrive at an execution ready form within the first transaction environment. It is upon arrival at the execution ready form of the transaction document that various determinations can be initiated by the current invention. The initiation of these various determinations can occur in an automated or manual manner. The establishment of an RSEE requires one or more satisfaction determinations to be made regarding required RSEE Factors and is an example of a determination that can be initiated. Upon determination of one or more required RSEE Factors being satisfied, the execution ready form of the executable transaction document is established in the RSEE.

Establishment of the execution ready form of the transaction document within a real-time, simultaneous execution environment, such as contemplated by step 640, can occur upon an additional verification that at least one of the two or more signing parties accesses the transaction document using a mobile computing device. Further, document establishment within an RSEE can require or include translation of the document from an original format to a secondary format, such as has been described herein. It is within this real-time, simultaneous execution environment that handwritten signatures, from the signing parties to the transaction documents, are obtained within the established execution environment. Through this obtainment of handwritten signatures within the executable transaction document a legally binding agreement for the transaction can be established.

It is contemplated that the real-time, simultaneous obtainment of multiple acts of execution for an executable transaction document can be enabled to occur with the document established in the RSEE. In the current embodiment of method 600, the execution ready form of the executable transaction document established within the RSEE requires execution by multiple parties or a plurality of signatories.

These multiple parties to the transaction, more specifically, a plurality of required signatories, are allowed to access the document in the RSEE. It is contemplated that at least one of the plurality of required signatories is using a mobile computing device to access the RSEE. Therefore, at least one act of execution by one of the multiple signatories is obtained via utilization of a mobile computing device. The obtainment of required acts of execution, including the capture and application of handwritten signatures, by the plurality of signatories occurs simultaneously and in real-time within the RSEE, such as the acts obtained in step 650. The real-time, simultaneous obtainment of acts of execution is promoted within the RSEE and can include all aspects of capturing and applying handwritten signatures from a plurality of signatories to an executable transaction document. A fully executed and complete agreement between the parties to the transaction can be established by the obtainment within the document of the handwritten signatures from the plurality of signatories.

As discussed herein, the obtainment of handwritten signatures from a plurality of signatories may or may not provide full execution of the transaction document. Therefore, the methods of obtaining a fully executed and complete agreement between multiple parties provided contemplate the use of multiple transaction environments, including multiple transaction environments within which acts of execution can be obtained from signatories to the executable transaction document. For instance, the obtained handwritten signatures from the plurality of signatories within the executable transaction document established in the RSEE can provide a partially executed version of the executable transaction document. This version of the transaction document can be maintained within the RSEE and further acts of execution obtained, such as is contemplated by the current method 600. Alternatively, this version of the transaction document can be established in another transaction environment, outside the RSEE, and additional acts of execution obtained. It is also contemplated that this version can be stored and later established in another transaction environment, including another RSEE or one outside an RSEE. Where this partially executed version of the transaction document is established in another transaction environment, that transaction environment may allow for the obtainment of additional acts of execution within. These additional acts of execution may or may not include the obtainment of additional handwritten signatures from other required signatories.

Establishing a fully executed transaction document, in additional embodiments, can include establishing an RSEE compliant transaction document in a real-time, simultaneous execution environment (RSEE). The executable transaction document requiring the obtainment of a plurality of handwritten signatures within the document from a plurality of signatories. While established in the RSEE and in real-time, handwritten signatures from the plurality of signatories can be simultaneously obtained within the executable transaction document.

In addition, establishing a fully executed transaction document can include establishing an RSEE compliant transaction document within an RSEE that allows the real-time, simultaneous obtainment of handwritten signatures from a plurality of concurrently accessing signatories. Establishment of the document within the RSEE requires the verification of the satisfaction of various transaction requirements. These transaction requirements can be provided as an RSEE Factor data set against which comparison can be made of the transaction document. It can be the case that it must be determined that the document requires execution by at least two signatories and a plurality of the at least two signatories is concurrently accessing the document within a preliminary transaction environment. Second, it must be determined that at least one of the plurality of concurrently accessing signatories is accessing the document within the preliminary transaction environment via a mobile device. Finally, it must be determined that at least one of the plurality of concurrently accessing signatories is remotely located from at least one other of the plurality of concurrently accessing signatories. Within the RSEE, upon verification of the satisfaction of each requirement, handwritten signatures can be simultaneously obtained in real-time from the at least two, concurrently accessing signatories. The real-time, simultaneous obtainment of the handwritten signatures within the executable transaction document from the at least two, concurrently accessing signatories can result in the establishment of a fully executed transaction document.

Partial transaction performance and conformance with transaction requirements can be discussed herein in terms of the maintenance of a transaction document within an RSEE. Maintenance of a transaction document within an RSEE can be determined by satisfaction determinations made in regards to required RSEE Factors for an RSEE maintenance package. While discussed briefly here in reference to this embodiment, the RSEE maintenance package and its operation are more fully discussed below. It can be the case that the satisfaction determinations made for required RSEE Factors of the RSEE maintenance package occur at various times, in sequence, in parallel, in a serial manner or in any manner during an established RSEE and can be determined satisfied by partial performance within an RSEE. Where the RSEE maintenance package determines required RSEE Factors are or have been satisfied the transaction document can be maintained within the RSEE.

By way of example and deriving from the above current method embodiments, it can be the case that within an established RSEE the required handwritten signatures from a plurality of signatories can be initially obtained within, but not complete the full execution of the transaction document. The obtainment of these initial acts of execution by handwritten signature within an RSEE can satisfy an initial RSEE Factor requirement, such as an RSEE Maintenance Period. The RSEE Maintenance Period can require that the handwritten signatures from a plurality of required signatories must be obtained within the executable transaction document in a real-time, simultaneous manner. The real-time, simultaneous aspects being RSEE operational parameters established for and required by the RSEE Factor. This and other RSEE Factors being established for an RSEEV maintenance package as configured by a HESS Software implementation. Where the obtainment of the handwritten signatures within the designated signature blocks occurs in satisfaction of the RSEE Maintenance Period it can allow a partially executed version of the transaction document, including the obtained handwritten signatures, to be maintained in the RSEE.

Maintenance within an RSEE can allow additional, required acts of execution within additional signature blocks to be performed by signatories and obtained within the transaction document. These additional signature blocks may or may not require the performance and obtainment of a handwritten signature from one or more signatories. The performance and obtainment of these acts, and therefore completion of these signature blocks, can be allowed to occur in a manner not subject to RSEE Factor requirements for an initial establishment of an RSEE. Therefore, a transaction document can be maintained in an RSEE for the obtainment of additional acts of execution, wherein "initial" or prior designated acts of execution occurred in satisfaction of required RSEE Factors.

It is contemplated that, upon obtainment of any acts of execution or any other modifications of the data/information within a transaction document established in an RSEE, a new version of the document can be established within the RSEE that reflects the modifications. The new version may be identified by various different designations that can be associated with the document by employing any known techniques and/or mechanisms. Designations, such as "(v2)" or "exe2" and the like may be employed without departing from the current invention. These designations can be associated with the document throughout all aspects of the life-cycle of the document within a transaction. For instance, the designations can be associated with the document upon its establishment in another transaction environment and where the document may be stored in a memory location for later access and retrieval.

Where required RSEE Factor determinations for an RSEE maintenance package conclude that they are not satisfied the RSEE can be closed. The initiation of the closing of an RSEE can be an automated or manual process. Closure of the RSEE can result in the translation of a current HTML version of the final document back into its original format and stored as an identifiable version of the transaction document in a memory location. The storage of this version of the document can result in the closing of the transaction. Similar to above, the transaction may be re-opened by re-establishing this version of the transaction document, from the location in which it has been stored, within another transaction (non-RSEE or RSEE) environment for the transaction at some later time. Alternatively, upon closure of the RSEE, the executable transaction document can be translated back into its original format and established as a version of the transaction document in the first transaction environment or another alternative (non-RSEE) transaction environment wherein the performance of acts of execution may or may not be allowed and capable of obtainment within the document. It is contemplated that the obtainment of any additional acts of execution may occur while the document is established within the RSEE or in an alternative transaction environment.

As described and will be further discussed herein, any transaction environment, including the RSEE or other execution environment(s), can be closed based upon various determinations. For instance, a user determination can be provided and effect a manual closure of a transaction environment. In addition, the obtainment of handwritten signatures from a plurality of concurrently accessing signatories can be verified and effect the closure of a transaction environment. Further, the obtainment of all required acts of execution from all required signatories to a transaction document can be verified and effect closure. Still further, determinations reached by various processes established for and executed in performance of one or more packages, such as an RSEEV maintenance package and/or a RSEEV PET package (described herein below), can result in the closure of transaction environments.

As indicated, the current invention provides an electronic transaction management system, referred to herein as a HESS System. The HESS System enables transaction performance by one or more parties to a transaction by hosting one or more web-based transaction environments that provide the enhanced transaction management capabilities of the HESS Software for promoting an improved user experience in accomplishing an electronic transaction. The HESS System can impact upon all aspects of a transaction including, without limitation, everything from the negotiations, to documentation, to execution of the agreement for formally defining a relationship between parties, to secure storage of all transaction materials.

As indicated, the HESS System provides its enhanced capabilities through various web-based transaction environments. The HESS System can provide and allow for the establishment, maintenance and/or termination of these web-based transaction environments. It is within these transaction environments that any and all transaction materials including, without limitation, transaction documents, can be established, interacted with and operated upon by a system user and/or a party to the transaction. Further, all system capabilities and functions can be enabled, including any and all user interaction capabilities, within these transaction environments.

The HESS System can impact upon all aspects of electronic document processing and management, including without limitation document creation and generation, access, editing, modification, amendment, security and access control, document storage, and the like. Further, the improvements may impact upon all management aspects of the web-based transaction environments, including establishment, maintenance, and termination of the web-based transaction environments. All enabled capabilities may be utilized independently or in any combination within the overall electronic transaction environment. Therefore, it is to be understood that the various capabilities provided by the electronic transaction management capabilities configured for and implemented as a HESS System may be enabled through various web-based transaction environments. This can include an RSEE or any other transaction environments, including those that are outside an RSEE, which can be referred to herein as preliminary, alternative, or non-RSEE transaction environments, or such other terms as identified herein.

In embodiments, the HESS System transaction environment may improve any aspect of and the overall transaction experience for a user and/or party to a transaction, such as a buyer, seller and any other interested parties involved in the transaction. As used throughout this specification and for any and all descriptive embodiments the terms "buyer(s)", "seller(s)", "user(s)", "party", "parties", "signatory", "signatories", "executor(s)", and the like shall be understood as being used interchangeably, unless otherwise specifically indicated, for identifying and defining an individual and/or single entity or multiple individuals and/or entities that are participating in a given transaction and/or interacting with transaction documents. Parties to a transaction particularly identified as "signatory", "signatories", "executor", "executors", and the like shall be understood as necessary to a transaction for performing at least an act of execution for one or more transaction document(s) as part of a transaction. Further, the terms "multiple" and "plurality" shall be understood as similar and being used interchangeably herein for identifying two or more users, parties, individuals, entities, signatories, executors, and the like.

The transaction management capabilities provided can allow for the performance and accomplishment of any transaction through the use of one or more of transaction environments hosted by the HESS System. The HESS System enables the performance of numerous acts of document processing and/or execution, including everything from document creation, to the establishment of an execution ready form of a document, to execution of transaction documents by one or more parties in the transaction environments. Therefore, it is understood that the HESS System may establish any transaction materials, such as a single transaction document or multiple transaction documents, within one or multiple transaction environments and that one or more of these transaction environments can be one or more RSEE or non-RSEE environments.

The accomplishment and establishment of a fully executed, completed transaction document can require the performance of one or more various acts of execution within a document by one or more parties. In particular embodiments, the document within which acts of execution can be obtained may be identified as and established in an execution ready form. However, it is understood that any transaction document enabled for obtaining acts of execution may be variously designated and operated upon to accomplish a transaction. The acts of execution can include the obtainment of handwritten signatures or other acts of execution that utilize various signature techniques, which can include "click-to-sign", initial blocks, buttons, check-boxes and the like as may be contemplated.

In embodiments, an RSEE enables the obtainment of all acts of execution including the real-time, simultaneous obtainment of the handwritten signatures from a plurality of required signatories to establish a fully executed, complete transaction document. Alternatively, transaction management by the HESS System can enable the use of various transaction environments for establishing a fully executed, complete transaction document. It is contemplated that the transaction management provided by the HESS System can enable transaction performance that requires an RSEE for only partial execution of an executable transaction document. The partial execution provided within the RSEE can work in conjunction with another RSEE and/or one or more alternative transaction environments to establish a fully executed, complete transaction document.

Transaction performance enabled by a HESS System can include providing multiple, distinct RSEE's, for one or more transaction documents, wherein different groups or groupings of parties to the transaction document(s) can be enabled to perform various acts of execution at similar or different times. Thus, one or more RSEEs can be operationally enabled to work in any sequential, progressive, serial, non-serial or other manner with any other alternative transaction environments for the accomplishment of all required acts of execution by the parties to the transaction.

The HESS System transaction management can include various capabilities. For instance, it may establish various locations, referred to herein as "closing locations", where one party or multiple parties to a transaction may or may not gather at a common location for accomplishing transaction performance, including the performance of the execution of transaction documents. Still further, the system may allow executable or non-executable transaction documents or materials to be generated, created, edited, notarized, witnessed, certified, validated and have any other manipulation performed on them within any of the web-based transaction environments provided. As a result of any of the enhanced transaction environment capabilities provided, the current invention may promote minimizing delays to transaction completion, the time spent obtaining acts of execution from the parties, the number of documents required to be executed and the risk of incomplete or incorrect transaction documentation and/or document execution.

In an exemplary embodiment, a HESS System is configured to implement any of the exemplary processes and/or methods provided by the HESS Software and can, without limitation, provide the following: (i) facilitate the creation, storage, and management of documents; (ii) allow for document execution to occur within a transaction environment, including execution by handwritten signature, which can be enabled to occur while the document is established within various transaction environments, such as a real-time, simultaneous execution environment (the "RSEE; and (iii) establishment of a fully executed, complete transaction document. Wherein the fully executed, complete transaction document can create a legally binding agreement between parties.

Figure 7:
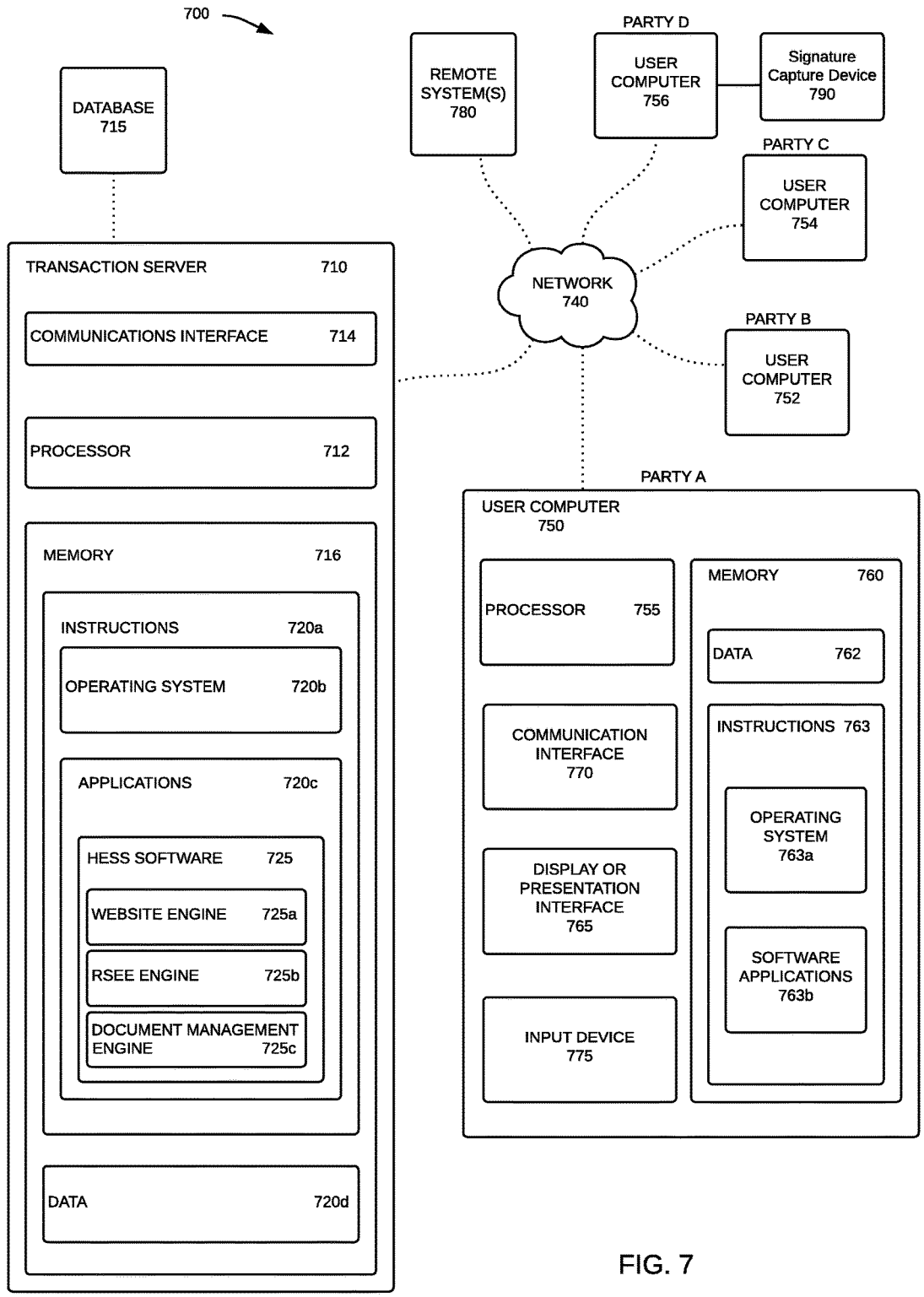
FIG. 7 is an illustration representing an exemplary system of the current invention.

An embodiment for an exemplary HESS System of the present invention and its advantages can be understood in reference to system 700 shown in FIG. 7 of the drawings, like numerals being used for like and corresponding parts of the various drawings. System 700 exemplifies a network of communicably coupled computing devices. These networked computing devices implement the functional capabilities configured within the HESS Software for a HESS System. Via a networked computing device a user has a tool and mechanism by which they can access the web-based transaction environments hosted by a HESS System. Within the web-based transaction environments the parties to a transaction, through their computing devices, are enabled to interact and perform or participate in the performance of any transaction activities, such as document processing and/or document execution, for accomplishing a transaction.

HESS system 700 includes a server 710 communicatively coupled with a database 715. Server 710, via network 740, is communicatively coupled with various devices that can be operated by a party or parties to a transaction. As shown in FIG. 7, a plurality of parties can utilize the HESS System 700, these are identified as party A, party B, party C and party D, and are communicatively coupled to the network 740 via communication capabilities enabled within computing devices 750, 752, 754 and 756, being used by each party respectively.

Server 710 can be understood as any server computing device, including an enterprise-level (e.g., corporation, service provider, etc.) server. The server 710 is and can be identified herein as a transaction server, HESS Server, data management device, server or the transaction management system server. The HESS Server 710 is capable of implementation upon and execution of the HESS Software, including the hosting all transaction environments, thereby, enabling and allowing the execution and performance of all functional capabilities, features and/or aspects configured by the HESS Software for a HESS System. As such, the HESS Server 710 can implement and manage all aspects of the transaction management system, including all web-based transaction environments providing transaction management. Transaction management can include and provide, without limitation, document management throughout a document life-cycle, management of multiple, independent transactions and/or transaction environments, execution of transaction documents (within and/or outside an RSEE), and the creation of legally binding agreements. The transaction management system of the current invention can be implemented within various network architectures, such as a centralized or a distributed network architecture. Various system capabilities can be implemented upon one or numerous devices and interact over the network communications structure to provide all functional capabilities to the system users.

The server 710 can be communicably coupled to one or more user computers, such as user computers 750-756 as shown, via the network 740. The server 710 may be a server or other computer system that communicatively couples several component features, such as a processor 712, a communication interface 714 and a memory 720. A communications bus (not shown) can be employed to enable communication between the processor 712 and the other component features of server 710 and any additional component features that can be added and as may be contemplated by those skilled in the field. Processor 712 is enabled to execute instructions 720a and/or save and/or retrieve data 720d. System memory 720 can store instruction set 720a that can be understood to include the computer operating system(s) 720b and/or the applications suite 720c which can define all or at least some of the operational capabilities for the server 710.

In the current embodiment, implemented as part of the applications suite 720c is an implementation of a HESS Software 725 that is configured to include a website engine 725a, an RSEE engine 725b, and a document management engine 725c that can be stored on system memory 716. In operation, these identified engines can operationally interact to provide the various features and capabilities of the current invention. As discussed below, the HESS Software configuration can vary significantly amongst different implementations, but it can provide all features described herein and those that are contemplated for the current invention.

Memory 716 may also store various other data 720d, such as various rules (e.g., laws, best practices, etc.), documents, user information, and the like that can be used in operation of the HESS System. Data 720d may include the data used to generate service agreements, templates, other transaction documents, signature block configurations, RSEE factors, or such other specific text, indications, party and/or document designations, and the like that can be used for various purposes, such as for identifying signature tags, user designations, etc. The server memory 716 can be variously configured to include one or more storage locations and/or matrices used in the operation of the current invention.

Through network 740 any user computer 750-756 networked within the HESS system 700 may access data from or import data to server 710. It is also contemplated that the server 710 may access data from, import/export data to any one or more user computers. Within the HESS System 700, data may be organized such that data common to a single transaction is stored in a common location (file or folder) or is otherwise identified as being associated with or related to a common transaction. Accordingly, in some embodiments, the HESS System 700 may promote an improved transaction organization and accessibility to the complex information and various numerous documents associated with a transaction.

The server 710 includes communication interface 714 that communicatively couples server 710 with network 740 and any external computing device, system, network or other communications apparatus. The communication interface 714 may allow wired or wireless communication in any known implementation and assist in enabling the performance of any of the various features of the current invention. Interface 714 can facilitate data transfer between the server 710 and the user computers 750-756 and/or any remote systems 780 or other external devices, such as database 715. For example, communication interface 714 may facilitate the transmission to and retrieval of documents and/or various other data from a remote system 780 (e.g., databases, web servers, other networks, or other computer systems) using the network 740.

The functional capabilities provided by the HESS Software, when loaded in whole or part upon a server and/or user computing device, can be accessible through the use of various forms of communication systems capable of networking the various devices comprising the HESS System, including, but not limited to, the Internet, Intranet, Extranet, the Cloud, Local Area Network (LAN), a Wide Area Network (WAN), a Metropolitan Area Network (MAN), a Personal Area Network (PAN), or any combination of these or other suitable forms of communication networks known to those of skill in the art. Additionally, the HESS software can be interfaced and integrated with currently existing software programs such as Microsoft Office, email clients, such as Outlook, Gmail, Google mail, etc., and other such software programs, as well as existing electronic document storage systems.

The database 715 may include redundancy/backup storage capabilities and may be proximal to or in a different geographic location relative to server 710. It is to be understood that the current invention implemented upon server 710 can be executed in communication with database 715 and/or other external data storage capability or without communication to an external data storage capability and may exclusively utilize internal memory 716. As shown, the database 715 can be communicably coupled to the server 710, via communications interface 714, by direct connections. It is contemplated that communication between the database 715 and other devices, such as server 710, may be accomplished via wireless connections, through other computers or through a local or wide area network, or any other suitable communication connection. The database 715 can be utilized to store any information including, without limitation, various data, files, profiles, sessions, programs and other information required to provide the capabilities of the present invention. The database or any external storage capability can be variously configured to include one or more storage locations and/or matrices used in the operation of the current invention.

It is contemplated that any computing device can be employed, wherein the computing device possesses the appropriate hardware capable of executing appropriate software for enabling the performance of any or all aspects of user interaction that can be performed within any transaction environment provided for a transaction managed by a HESS System. The computing device employed for the user computers shown in FIG. 7 (750-756) may include any type of computing device that is able to communicatively couple to the server 710. Any networked computing device in the HESS System may access data from or import data to a memory location within the system, such as the memory 716 of the server 710 and/or the networked database 715. It is contemplated for an embodiment of the current invention that at least one of the user computers is a mobile computing device.

Examples of computing devices that may be employed for use with the current invention include, but are not limited to, any of the following: personal computers (PC's), desk-top computers, mobile computers, any type of mobile computing device, computing workstations, laptops, tablets, portable computers, hand-held devices, personal digital assistants (PDA), smart phones or any other Internet- or web-enabled phones and devices, wireless devices, web-based technology systems, touch screen devices, typing devices, and any other similar electronic device enabled as shown.

Any networked computing device employed by the current invention may be capable of operating a web browser (i.e., Microsoft Internet Explorer, Netscape Navigator, Mozilla Firefox, Safari, Google Chrome, etc.). Further, any networked computing device can be equipped with and/or enabled to interact with various electronic document processing capabilities, such as that provided by Adobe Acrobat (pdf), Microsoft Word, and/or any other commercially available or proprietary computer programs which enable the performance of any aspect of the current invention.

As illustrated in FIG. 7, a user computer 750 is a general purpose computer including any of the standard component features well known to those skilled in the art. User computer 750 can include a processor 755 communicably linked via an internal communications bus (not shown) with a memory 760 to store data 762 and instructions 763, such as operating system 763a and/or other applications 763b. The processor is able to execute instructions, such as instructions 763, and/or to access and/or manipulate data 762. In certain embodiments, general purpose computer 750 may be adapted to execute any of the well known, commercially available operating systems including, without limitation, MS-DOS, PC-DOS, OS2, UNIX, MAC-OS and Windows operating systems, or any other available operating systems. As used in this document, operating system may refer to the local operating system for computer 750, a network operating system, or a combination of both. Where a user computer is a mobile computing device the implementation of operating systems specific for mobile computers can be employed.

The user computer 750 may include a display or presentation interface 765 that provides a display that presents information to a user, for example, webpages and/or any other interfaces hosted over a HESS System can be presented and user interaction enabled. The user computer 750 also includes a communication interface 770 that facilitates communication via network 740 with the server 710 and any other networked computing devices (i.e., computers 752, 754 and 756). The communication interface 770 can also facilitate communication with other computing devices, networks, and/or systems not networked within the HESS System 700.

Entry of information into a user computer, whether enabled as a mobile or non-mobile computing device, occurs through the use of an input device 775. Input device 775 can be various input devices including, but not limited to, mouse/pointing devices, keyboards, electronic and light pens, signature pads, touch screens, scanners, light pens, stylus, biometric devices and any other similar electronic input devices known to those of skill in the art. These input devices can facilitate all input, such as obtaining handwritten signatures and other acts of execution, from a user. Thus, it is contemplated the user computer can be established with and allowed to work together with software that enables handwriting capture and application within electronic documents presented and/or displayed by the user computing device. Furthermore, FIG. 7 provides merely one, non-limiting, example of a computer that may be used with the invention.

The invention can be used with computers other than the general purpose computer described above or other electronic devices without conventional operating systems, such as kiosk terminals and systems, and the like. Thus, the techniques and functional capabilities of the current invention may be equally applied in other contexts and/or to other types of computing devices. In particular, some embodiments of the current invention may provide a module (e.g., plug-in, widget, extension) configured to perform some, less than all of the described functional capabilities and/or techniques that can be established for a user or party to a transaction being managed within a transaction environment provided by a HESS System. Provision of some of these techniques may occur in the context of various applications and/or programs that establish different electronic environments. In addition, the techniques may generally be deployed (e.g., as a module) in the context of any web-based information or e-commerce service that has a need to obtain an electronic signature from a user (e.g., to obtain assent to terms and conditions, to enter into purchase/sale agreements, etc.).

Embodiments and/or certain aspects of the current invention can work in unison with other networked devices, and may also work independently on a single computing device. Therefore, the capabilities that may be enabled upon any one or multiple user computers networked within a HESS System for accomplishing a transaction is a determinable feature provided by the current invention.

As shown in FIG. 7, wired or wireless transmission from the user computer or device to a common server is possible. Storage for a HESS System of any transaction materials can occur on the user computer device itself and thus provide a user with direct access to the materials. Data access can be enabled via the Internet either directly or through other networked devices to any one or more networked devices, such as a central data warehouse outside of the server 710 of the system 700. Database 715 can represent such a centralized data storage facility to which any of the networked computing devices and/or server 710 can be communicably coupled either directly or indirectly.

Any computing device networked within a HESS System may include any appropriate application or applications that enable a user to perform any functional capability within a transaction environment established by the transaction management capabilities provided by the current invention, including document processing and/or execution of transaction documents. For example, the respective computing devices may include document processing applications that allow a party to prepare and/or participate in the preparation of one or more transaction materials and documents, such as a services contract, and/or participate in the overall transaction management capabilities, such as determining the parameters for various transaction environments that may be established for a transaction. These parameters can include rules, permissions, authorities, RSEE factors (discussed below), and the like that are to be or not to be implemented for a transaction and/or transaction environments provided for a particular transaction.

For the centralized aggregation of document processing, discussed further below, computing devices may also include applications suitable for allowing users and document preparers to export or upload transaction documents to the HESS System and document executors to download or view transaction documents that are managed by the HESS System. Other applications resident on or used by computing devices may enable each computing device to communicate with other computing devices within the HESS System.

Networked computing devices associated with a particular user may include any additional software applications that enable user interaction with transactions and transaction environments provided by the current invention and allow a user to participate in any or all of the capabilities enabled for a user within a HESS System transaction environment, such as document review or manipulation (i.e., editing) and, where applicable, execution of transaction documents. The acts of execution that a user may be required to perform can vary, from clicking a check-box, to providing a handwritten signature, and the like as further described herein. The performance, capture and application of an executory act, such as a handwritten signature or any other act of execution as may be determined by a signature block, can be promoted by an implementation of the current invention. Therefore, signature obtainment within a signature block of an executable transaction document can be fully enabled by a HESS System implementation.

A user computing device may include or have access to any well known signature capture applications and programs. The use of such applications and programs, whether provided directly by the current invention or as a capability that can be provided in operational concert with the current invention may allow for the obtainment, including the capture and application, of a user's handwritten signature to a document, such as an executable transaction document presented for execution within a web-based transaction environment established by the current invention. The use of any such $3^{rd}$ party signature capture programs and applications contemplates the interaction with and/or integration of whatever capabilities they provide with the capabilities provided by the current invention in order to accomplish a transaction. For instance, where the $3^{rd}$ party program provides for the capture (i.e., performance) and transmission of an act of execution from a computing device, such as a handwritten signature or otherwise, it can be that the current invention provides for the application of the act of execution within the transaction document being hosted within a transaction environment. It is contemplated that the current invention may employ any well known techniques and/or process, embodied in any form, including any commercially available ones, which allow the performance, capture and application of any required act of execution by a party for a transaction document hosted in a transaction environment provided for the accomplishment of a transaction.

As indicated for the current HESS System embodiment, the server 710 and/or database 715 can be established to provide for the storage of and access to transaction materials, including transaction documents, as described herein. In addition to transaction documents, the HESS System may store other transaction related data and information such as task lists, process flows, intellectual property and/or proprietary information indexes, instruction files, tutorials, and/or other transaction related information. Within the HESS System transaction materials may be organized such that those which are common to a single transaction can be stored in a common location (file or folder) or can be otherwise identified as being associated with a common transaction. Accordingly, in some embodiments, the HESS System may promote and provide improved organization and accessibility of the complex information and multiplicity of documents associated with a transaction.

In embodiments, transaction documents associated with a transaction can be accessed by parties to the transaction within the web-based transaction environments provided by the transaction management capabilities of the current invention. This access can be allowed by establishing the documents in a transaction environment that is not an RSEE. As described herein, these environments are commonly referred to as preliminary transaction environments. Parties, such as a buyer and seller, may review and/or manipulate documents at their leisure before the RSEE is established and the real-time, simultaneous obtainment of acts of execution occurs. Similarly, a party may provide feedback to other users, such as document preparers, system administrators, transaction managers, and the like, where revision of the documents is necessary before the execution ready form of a document can be established, an RSEE can be established and/or signatures obtained.

Additionally, a HESS System may provide any user with a variety of capabilities relating to the various stages of a transaction. For example, a party may access stored versions of documents previously created, manipulate and edit documents for a transaction, determine the status of tasks to be completed by that party or other parties having a role in the transaction, determine and/or establish a document in execution ready form, review fully executed and complete documents. In addition, the transaction management features made available to a user can include the determination and establishment of parameters for transaction performance that may impact upon one, some or all aspects of user interaction within one or more transaction environments.

Whether the program (HESS Software) is configured singularly or modularly, its implementation establishes the transaction system capabilities, including the operational parameters, performance characteristics and/or functional capabilities provided for and by any HESS System. In embodiments, the program configuration can be understood as including one, two or more operationally integrated component features or "system engines", which provide the transaction system management capabilities of a HESS System. It is contemplated that various HESS Software configurations can include fewer or greater number of component features and/or system engines to provide its functionality via any known mechanisms.

A component feature and/or system engine can itself be configured to include one or more aspects, functions, capabilities, and such other terms as may be used herein, that can be understood as describing a particular functional capability being configured and provided for a transaction management system of the current invention. It is contemplated that the HESS Software may provide various different engines, each of which can be similarly or differently configured as described herein, and provide varying functional capabilities in addition to what is described herein. Any functional capabilities described herein for the HESS Software can be established and implemented from within any networked, storage location within a computing device, such as server 710 or database 715 or a memory location within a networked user computing device or remote system, as contemplated and established for operation of the current invention. It is understood that, without limitation, the performance of any of the capabilities provided by the transaction system described herein may occur singularly or in any operational combination with any other functional capabilities that can be configured for and provided by the HESS Software.

A HESS System can be a full or selective implementation of any or all available transaction system features (functional capabilities) provided by the HESS Software. In this manner, a HESS System can be determined by a user to provide customized transaction performance capabilities. Customization can occur for any capability and/or on any level or basis. The customization can be established on a full, system-wide basis, per-transaction basis, per-transaction environment basis, individual transaction screen and/or page basis, modular basis, determination and/or confirmation basis, and/or for any RSEE factor, process or method, user designation, rules, permissions, authorities, commands, instructions, and any other feature, aspect, component, and the like as may be contemplated to be established and implemented for a HESS System.

As described above in the method embodiments of the current invention, the process of performing a transaction can include the establishment and user interaction with various web-based transaction screens and/or pages, referred to generally as transaction environments, hosted by a system implementation of and in conformance with the operational requirements configured by the HESS Software. These various web-based transaction environments allow a user to navigate, have access to and interact with transaction materials, thereby enabling the performance of all actions for accomplishing a transaction. The transaction materials can include, without limitation, the following: (i) editable information, data, and/or electronic transaction documents; (ii) information relating to transaction parameters, the parties, organization(s), sequence of events, conversion(s), translations, or other processing; (iii) execution ready transaction documentation, partially executed and fully executed transaction documentation; (iv) completed transaction package(s); and (v) such other date, information and/or electronic documents as may be employed for accomplishing a transaction and managing an established relationship using a HESS System.

In exemplary embodiments the transaction system management capabilities are provided via a three "system engine" configuration as exemplified in FIG. 7 to include: (i) the website engine 725*a*; (ii) the RSEE engine 725*b*; and (iii) the document management engine 725*c*. Therefore, HESS System operation and management will be described in reference to these three engines. In exemplary operation, the various transaction environments, including any and all individual screens and/or pages for accomplishing a particular transaction, can be hosted and provided by server 710 over a system website(s) as managed by the website management engine 725*a* and RSEE engine 725*b*. It is understood that this description is non-limiting, and that any HESS software configuration and HESS System implementation can be employed to accomplish the transaction capabilities provided by the current invention.

Transaction performance and all capabilities enabled for transaction performance by the HESS System can be provided via one or more web-based transaction environments, which can include without limitation, one or more websites, web-pages, screens, and/or other virtual locations. The website engine 725*a* may generate, establish and/or manage these one or more web-based transaction environments which provide user interface to a transaction and allow user interaction with any transaction materials for a transaction.

Transaction performance can utilize one or more linked or associated web-based transaction environments. These various web-based transaction environments allow a user to navigate, have access to and interact with various screens or pages containing, presenting or displaying transaction materials therein. These web-based transaction environments enable user interaction with and performance of any and all features and capabilities provided by a HESS System, including those configured for and provided via other engines, such as the document management engine 725*c* and RSEE engine 725*b*, described herein. It is contemplated that a user can interact with one or more transaction environments not only to accomplish transaction performance, but also to determine operational parameters for a transaction, including the features and/or functional capabilities enabled for particular transaction environments.

In embodiments, the website engine 725*a* manages all transaction environments that are not managed by the RSEE engine 725*b*. Therefore, it is contemplated that the website engine 725*a* manages all transaction activity within web-based transaction environments that are preliminary, outside or alternative to an RSEE. Alternatively, the website engine 725*a* can be enabled to manage RSEE transaction environments and/or transaction environments in concert with or independent from the RSEE engine 725*b* and/or the document management engine 725*c*.

The website engine 725*a* can provide for the management of multiple web-based transaction environments. For instance, a first (preliminary) transaction environment can allow a user to interact with the HESS System for generating a transaction document. In this first environment, the user can be enabled to interact with the system and perform any function for generating a document, including accessing a template document, creating a new document and/or editing a document. Once a transaction document is generated, the website engine 725*a* may establish the document in a second (preliminary) transaction environment, wherein all parties to the transaction can interact with the document. The interaction enabled within the second transaction environment, similar to the first transaction environment, may provide and/or allow performance of any system capabilities. In this example, the second transaction environment is a preliminary transaction environment (not an RSEE) and does not enable the obtainment of acts of execution, such as a handwritten signature, within the document from one or more signatories. The HESS System can require the establishment of the transaction document within a third web-based transaction environment, such as an RSEE, for allowing the obtainment of acts of execution, including a signatory's handwritten signature, to a transaction document. The website engine 725*a* may operate in concert with the RSEE engine 725*b* to transition the establishment of the document from within the second transaction environment to within the RSEE. Once established in the RSEE the management of the document within this transaction environment can be provided by the RSEE engine 725*b*, as described below. Therefore, it is understood that the website engine 725*a* can provide for the management of multiple, web-based transaction environments preliminary to or outside an RSEE, but work in concert with other features, such as the RSEE engine 725*b* and/or document management engine 725*c*, of the HESS System to promote the integrity and accomplishment of a transaction.

The website engine 725*a* can manage user access to transaction environments. By configuring this engine with known security features and/or access controls, it can provide substantially unrestricted or restricted access to a transaction and any transaction environments. Thus, it can be from within the website management engine 725*a* that various security features, access controls, "permissions" or "special permissions" that may govern system performance or user access to and performance capabilities allowed within the system can be established and applied. It is contemplated that any of the access and performance controls provided by the current invention can be established and applied from any component feature, including the RSEE engine 725*b* and/or document management engine 725*c*.

Examples provided herein of the various security features and controls may describe their configuration in and application from the RSEE engine, however, any description provided of a particular example shall be understood as non-limiting and the various features identified as capable of implementation from various other engines, modules, and the like configured in the HESS Software. Further, the enablement and performance of any security feature can occur within any transaction environment.

The security features that provide access control can include the use of any known security and certification processes and techniques. The security features may be implemented in different manners, for instance, the features may be implemented for a particular transaction document(s), a transaction environment, on a per transaction basis, on an individual user basis and/or on the basis of a user computing device. For example, a system user may be required to register with the system by creating a system account when first attempting to access the HESS system. The registration process may require the user to provide log-in information, such as a user name, user ID and/or password, that the user will be required to enter each time the user attempts to access the system. Additionally, system registration may require or result in a specific user computing device being identified to the system and therefore capable of being verified as having authority to access the system. For instance, the user computing device networked with a system implementing the HESS Software of the current invention may be implemented with a security feature. Within a system operational environment, the security feature can be an ID Tag that the user computing device transmits across the network to the system server 710 as part of accessing a specific transaction environment established for a transaction. It is contemplated that the security features and access controls may require user input to create and implement validation (e.g., "log-in") information or the system may automatically generate user validation information and then provide that information to the user.

Additionally, the functionality provided to a user by the HESS system may be governed in a role-based or user based manner. This is a secured access control feature that, in operation, assigns user permissions and/or authorities based on a system designation, unique identifiers, and/or unique URL's specifically assigned to and associated with a particular user. Individual users may receive customized views, functional capabilities, and/or be given customized options based upon their identity, designation or role to the transaction. The system may differentiate between the views and capabilities provided to any and all parties to a transaction, such as a buyer, vendee, seller, vendor, document reviewer, document preparer, signatory, transaction manager, system administrator and any such other designations as may be contemplated.

For instance, a user can be assigned and have associated with them a unique URL (web address) that directs or "points" them to a particular transaction environment for a transaction. It is contemplated that multiple users can be assigned individual, independent URLs or a single, composite URL that directs each user to a particular transaction environment. Employment and deployment of a composite URL shall not be understood as being limited to any particular transaction circumstance, however, the composite URL may be particularly useful in situations where multiple parties to a transaction are similarly located and/or are accessing a transaction via a single, shared computing device. The transaction environment that a user or multiple users are directed to by an assigned URL and/or composite URL can include various locations, such as an RSEE presenting an executable transaction document, one or more specific signature blocks located within an executable transaction document hosted in an RSEE, one or more transaction and/or execution environments and/or specific locations within any transaction materials, including executable transaction documents, presented by any transaction environment, one or more web-pages for a transaction, and the like. Assignment of any type of URL to one or more users for a particular transaction can be an automated process or one performed manually by an authorized user of the system. In embodiments, the URL can direct one or more users to at least one of a preliminary or non-RSEE transaction environment for a particular transaction. It is also contemplated that the URL can direct one or more users to an RSEE or alternative execution environment for a particular transaction.

The URL associated with a user(s) can be verified by the system upon an access request being made by the user and/or any other party attempting to use the assigned URL. It is contemplated that the use of the URL to access a transaction environment is self-authenticating to the transaction. For example, a URL assigned a user can itself be used to authenticate a user or it can be appended to include additional information ("parts") that identify the user securely and allow for them to be authenticated by the system. The URL can direct the user to an "authentication" process within a transaction environment that requires additional input by the user to validate their authority and access to the transaction.

In addition, to user authentication, the URL can include and/or be appended to include information that provides an indication or designation of a user's name, role in a transaction, certain permissions and authorities, certain restrictions and limitations, and such other information and data as may be contemplated for use by the current invention. Additional information appended to an assigned URL can have certain permissions and/or authorities associated with it and then when used by a user can verify to the system that the user is to have those certain permissions and/or authorities which can allow the user to perform specified transaction functions. For example, a URL assigned a user can designate them as a "signatory". When the user then uses this URL to access a transaction environment they are validated and authenticated to the system as an authorized user and for their identified role in the transaction. The validation includes establishing the permissions for the user associated with the role of signatory. These permissions can include, without limitation, transaction performance activities such as preparing transaction documents, executing transaction documents and the like. This user role designation can also be used by the system in performance of other activities, such as the performance of verification processes for an RSEE establishment package and the like, as will be described in this specification.

The user(s) can have their assigned URL, including a composite URL, communicated to them by the system or a user of the system via email. In this manner the system is capable of communicating to a user a "link" that allows and enables a user to access a transaction environment for a transaction. It is contemplated that other manners of communication, such as SMS messaging and the like, can be used to communicate this and other information to a user. The communication of an assigned URL can employ encryption protocols and/or other security features to protect the information and promote transaction integrity by increasing the likelihood that only authorized users for a transaction have access to the transaction.

A URL or any other unique identifier assigned a user for a particular transaction can "expire". Expiration can result from various occurrences including, without limitation, the prohibition, expiration or termination of a transaction environment and/or transaction, bad acts such as fraudulent behavior by a party, or such other occurrences as may be contemplated by those skilled in the art. Expiration can result in the URL no longer providing direction to a HESS System hosted transaction environment or being associated with the user, which can further result in the user not being allowed or provided access to a transaction and/or transaction environment. The expiration of a URL or other identifier for a particular user can allow the URL or other identifier to be used for another user for the same transaction or other transactions.

The URL assigned one or more users for a particular transaction can be used by a single user or multiple users to access and participate in multiple transactions. The URL can, therefore, identify and authenticate a user(s) to multiple transactions being managed by the current invention. Thus, a URL can point or direct one or more users to a transaction environment that can be employed in the performance of multiple transactions. It is contemplated that any manipulation, appending, use or other facility may be made of a URL as are known without departing from the scope and spirit of the current invention.

A user can have multiple URL's assigned to them. For instance, a user may have a series of links communicated to them that provide a series of assigned URL's that may direct the user to a transaction location that allows them to perform various different actions at different times. For example, a first link can be communicated to a user at a first time for a transaction and may direct them at a first point in time during a transaction to a first transaction environment within which a transaction document can be generated and/or manipulated. At a second (later) time in the transaction, the user may have a second link communicated to them that directs them to an execution environment (e.g., RSEE) and allows them to perform required acts of execution. Then at a still later time in the transaction, the user may have a third link communicated to them that directs them to a specific signature block within an executable transaction document being hosted within an execution environment.

It is understood that the communication of multiple, assigned URL's to one or more user's is not required to occur in series or be limited to a single transaction. It is further contemplated that the communication of one or more assigned URL's can be restricted and allowed to occur only upon verification of the performance of certain acts by one or more users/parties to a transaction. From the above example, the communication of the second link to a party may be prohibited from occurring until after the establishment of an executable transaction document, execution ready form of a transaction document, RSEE compliant transaction document, or such other transaction performance requirement as may be contemplated has been verified. This verification can be enabled to execute upon manual input received or can be enabled to execute in an automated manner, similar to other verification/confirmation processes provided by the current invention.

A user may be designated as an "administrator", "system administrator", "network administrator" for a transaction document, transaction, system-wide or as otherwise required, wherein such designation provides the user with a pre-determined set of access controls. For this designation such access controls may include the authority to control the overall operation of the HESS System and/or access, edit, modify, delete or otherwise manipulate any transaction, including any associated transaction environments and such transaction materials as may be established therein. Further, the administrator may be capable of modifying another user's authorities within the transaction environment, such as removing a user's previously assigned access and/or assigning designations to other users, thereby determining the access another user will have for a transaction document, transaction environment, transaction/system-wide or as otherwise required.

A user or users can be designated as "document preparer" which can provide them authority to access, generate, create, edit, modify, delete or otherwise manipulate a transaction document. A "transaction manager" designation may provide the user with the authority to add or remove transaction documents from a document package, add or remove users, various designations, signatory authority, and/or other authorities and permissions that are provided to other users and/or other designations. A user may be designated as a "signatory" party and enabled to access and modify certain transaction documents, participate in the establishment of the RSEE for the document and perform specific acts of execution for a transaction document. A "non-signatory" designated party may be allowed to access and modify a transaction document, but have no execution authority or capabilities. Other user designations can include, without limitation, the following: (i) authorized representative or agent; (ii) witness; (iii) notary; (iii) third party beneficiary; and the like, as are contemplated for the performance of a transaction within a transaction environment provided by the current invention. The various access controls and capabilities provided for and associated with each designation and any user so designated may vary as contemplated.

Establishment of the RSEE may include specific security features enabled by the current invention. For instance, a system administrator and/or transaction manager may or may not be a document executor and therefore, their access controls may not allow them to participate in the establishment of the RSEE for a transaction document. However, a designated administrator may receive communications from the system when the RSEE is established for a particular document and/or may be able to "view" an established RSEE for a document and thereby monitor document activity. This type of access to a transaction and/or transaction environment exemplifies a layered or tiered approach for the transaction management capabilities provided by the current invention.

It is further contemplated that any activity occurring within the HESS system for a particular transaction and/or transaction document may be automatically monitored. A document monitoring capability can be established as a feature of the HESS Software, such as an aspect of any of the various engines described herein. The monitoring feature may provide the capability to track all activity related to a particular transaction and/or any associated transaction environments and material(s) established therein and include a report feature that generates an activity report. The activity report can be automatically communicated to and/or made available upon request for viewing by any appropriately designated party, wherein such designations may include, without limitation, system administrator, transaction manager, or as otherwise contemplated.

In embodiments, each party to a transaction may only have access to transaction materials for which they are signatory to or for which they are assigned some designation that establishes their authority and responsibility within the transaction. Additionally or alternatively, each party to a transaction may receive a common designation, such as a "document viewer" and be able to view all documents but only be able to edit, modify or change documents to which they have been granted permission through an appropriate designation, such as "document preparer".

The execution options provided to the parties may also vary depending upon a signatory's role, including their system designations, with respect to the particular transaction. For example, a buyer signatory may be allowed to only provide a "handwritten signature" execution, within their appropriate signature block, while a seller may be provided with a similar capability and in addition is provided with a digital certificate retrieval capability.

The use of user designations can allow a transaction environment to be customized on a per-user, per-role, per-document, or per-transaction basis. Furthermore, the customized features, controls and associated capabilities may be expanded or diminished as desired.

It can be the case that user designations, such as those described above, can be given to parties that are or are not signatories to executable transaction documents for a particular transaction. Further, it is contemplated that the user designations provided by the current invention may include any functional capability that is desired for the HESS System being established. It is contemplated that various and multiple permissions, such as multiple user designations, can be assigned to a single user and that multiple users may have one or more designations that are similar. The various designations provided by the current invention and assigned to various users of a HESS System can provide an indication of the relationship of the designated user with other users involved in a transaction.

It is contemplated that these permissions, user designations, and various other security features can be utilized in conjunction with other operational capabilities of the current invention. For instance, the establishment of an RSEE may require a particular user (not a signatory) with a particular user designation be a party that, along with a plurality of signatories, is concurrently accessing a transaction document within a transaction environment. In the alternative, it can be the case that the user designation required for RSEE establishment be assigned or given to one of the signatories to a transaction document. Thus, the current invention contemplates that the plurality requirement (discussed below) can be satisfied, in whole or at least in part, by the additional and concurrent access to the executable transaction document by a party to the transaction that is not a signatory.

For example, a HESS System implementation can require that RSEE establishment be made only upon verification of the concurrent access to an executable transaction document by a plurality of signatories and the party designated as a document manager. The requirement of a document manager may promote transaction integrity and efficiency, by allowing a non-interested third party direct access to transaction materials. This type of access may assist in increasing the level of confidence all parties to the transaction experience. In this example, it can be that Party A is a document signatory, Party B is a document signatory, and Party C is a document signatory and is designated a document manager. Therefore, in this instance, Party C must be one of at least two signatory parties concurrently accessing the transaction document in order for RSEE establishment to occur, which, in this example is the required environment for obtainment of the handwritten signatures from Parties A, B and C. Thus, the RSEE may be established where Party C and A, Party C and B or Party C and Party A and B are verified as concurrently accessing the transaction document within a transaction environment. Alternatively, from the above example, Party C may be designated solely as a signatory and a Party D can be designated as a document manager. In this instance, RSEE establishment can require concurrent access by any one or combination of Parties A, B and/or C and Party D.

The HESS Software, from within an exemplary engine or otherwise, can implement various other rules that may govern the implementation of the current invention, for instance, rules established by governmental agencies (e.g., execution requirements, recordation laws, tax laws, etc.), best practices, and/or industry standards may be implemented. It is contemplated that any one or combination of engines can be configured with various transaction governance techniques and processes that establish and manage a transaction and/or transaction documents in accordance with any specific requirements and can be amended to accommodate any changes made to such requirements.

It can be the case that an engine, such as the website engine 725a and/or RSEE engine 725b, can be configured with the capability to validate or certify a user and/or signatory as a distinct, authorized party to a transaction and associated transaction environments prior to any determination made by any other verification process, such as that the concurrent access by multiple signatories requirement has been satisfied. This certification feature can encompass the individual or collective use of any known techniques for verifying a particular party's status and permissions or authorities assigned to them for access to a HESS System.

It shall be understood that the foregoing provides an exemplary, non-limiting description of only some of the contemplated computer and program configurations and implementations that can be established and applied for/by the HESS Software, including specific examples of only a few rules/requirements/permissions that can be established and applied. Any contemplated and known additional capabilities, such as those identified and described herein for the current invention, shall be understood as encompassed within the contemplated scope for the HESS Software and/or various implementations of a HESS System.

The document management engine 725c, referred to herein also as the "document manager", generally enables and is executed for the access, retrieval, creation, generation, manipulation, editing, amending, manipulation and/or modification of any transaction materials, such as electronic transaction documents. These electronic documents are generally referred to herein as "transaction documents" and may or may not require execution.

The providing of transaction materials, such as transaction documents, for defining a relationship between parties to a transaction is a process, often including the management of data, information and numerous documents.

Generally, the process of generating a document includes navigating through and having access to various transaction environments, such as screens or web-pages, containing editable information, data, and/or electronic documents or relating to the organization, sequence, conversion, or processing of such. The transaction environments can enable and allow for the manipulation, editing or modification of the information, data and/or electronic documents by the user. In exemplary operation, the transaction screens and/or pages can be hosted by the HESS System, via server 710 as shown for system 700, over a website as managed by the website management engine 725a. Through these transaction environments the parties to the transaction can perform any of the various operational capabilities provided via the document management engine upon or related to one or more transaction documents.

Frequently, changes may be made to the data and documents throughout the process of generating/creating transaction materials, including transaction documents, and the document management engine 725c can ensure the parties have access to and are working from current data and on transaction documents that reflect all edits and modifications being made or having been made to each document by each party to the transaction. This centralized capability, through which the parties to a transaction are enabled to interact with the data and documents on a controlled and secure basis, can assist in reducing the risk of compromising the integrity of a transaction and its associated transaction documents. This may significantly improve transaction document management and the user experience for a transaction.

As will be described herein, the functional capabilities of the document management engine 725c enable the creation and establishment of all transaction materials necessary for accomplishing a transaction. It is contemplated that the document management engine 725c can work in operational concert with the website engine and/or RSEE engine to enable users to determine, create and establish all necessary transaction documents. As such it can be understood that the process management capabilities provided by the current invention will include any and all capabilities required to allow all necessary user interaction to arrive at transaction material(s), particularly transaction document(s), that satisfy transactional and user needs and thereby promote the accomplishment of any transaction.

Additional capabilities that can be enabled for a HESS System that may be provided by the document management engine 725c can include, without limitation, the following: storage of any document and any version of a document, including executed and/or signed documents based on signatures captured outside and/or within the RSEE; allow for the controlled access to transaction documents based on the use of various security features, such as document security programs and applications, access controls and the like, such that access to the documents is inhibited; associate and store information related to any document access (e.g., accessing party, time, date, type of access, whether data was modified, what portions of the document were presented, etc.); control and allow for the editing, changing, manipulation, modification and/or amendment of transaction documents, whether the document(s) are established in a transaction environment outside or within an RSEE; associate and store information related to any determination, verification, confirmation, or other processes, such as those identified herein or as may be contemplated, for any transaction; associate and store information related to a transaction and/or multiple transactions, including parties and/or documents related to one transaction or multiple, different transactions; and such other management functions as identified and described for transaction documents herein.

It is further contemplated that the functional capabilities enabled over a HESS system can include providing document management for a party that is common to multiple transactions. These transactions can be related to one another or wholly independent from one another. The common party may be provided an indicator or user designation, that may be referred to herein as a commonality tag, within a HESS system that provides a verification or validation of the party and allows the party to interact with multiple transactions and their associated transaction documents established within particular transaction environments. The management capabilities provided a party identified through use of a commonality tag may include an enhanced document management capability, which can increase efficiency of document access, amendment, certification, validation, execution or any other document or transaction performance capabilities as described herein.

In overall operation, the capabilities provided by the document management engine 725c may reduce the risk of conflict between parties involved in a transaction by promoting document integrity, which may impact upon the time all parties must spend "in" the transaction. This may contribute to increased satisfaction with the transaction experience.

The data and documents that can be stored and manipulated by user interaction within the transaction environments provided by a HESS system 700, particularly as enabled via the document management engine 725c, may be related to various types of transactions, such as business, personal, financial or otherwise. Therefore, transaction documents can include any documents for the purpose of accomplishing the establishment of any contemplated relationship between parties. The relationship defined by the document(s) may encompass any need. It is contemplated that the document may relate to a sales transaction that may involve goods, services, information, and/or property. It is further contemplated that the document(s) relate to a legal proceeding or intellectual property comprising copyrightable material, ideas, patents, patent applications, trademarks, licenses or technology. The transaction documents, related or associated documents and materials for establishing a relationship between multiple parties can be memorandums, understandings, agreements, partial agreements or even sample language (e.g., sample clauses) for inclusion in an agreement. Still further, various transaction related materials, such as instructions, rules, process flows, tutorials, requirements, and any other information can be established by the document management engine for use within a transaction environment.

Transaction documents may be described herein in relation to a service agreement for providing electronic payment transaction processing services. Examples of such documents include, but are not limited to, a service agreement, confidentiality agreement, and any other document associated with a contemplated business transaction. Although the examples described herein illustrate how the HESS System 700 can promote an increase in efficiency for transaction performance, including the execution of transaction documents by multiple parties involved in a typical business services transaction, it is generally recognized that the HESS System may similarly operate to promote the improved efficiency of transactions within any context.

The document management engine 725c, whether using a document from a template manager or created via a generation manager as will be described below, includes the functional capability to provide for the establishment of one or more signature blocks within a transaction document. The providing of an executable transaction document is a process, often including the management of data and various documents and establishment of signature blocks within the documents. Generally, the signature blocks can be understood as user identifiable positions within a transaction document for the performance of an act of execution. The act of execution provides an indication of agreement, assent and/or consent to one or more requirements for defining a relationship as contemplated and embodied within a transaction document for accomplishing a transaction.

An act of execution can be the obtainment (i.e., capture and/or application) of a handwritten signature provided by a signatory within a signature block established within a transaction document. In exemplary embodiments, the signatory's handwritten signature can be a captured digital representation of their signature that is applied to the document at a specified location within the document. Signature blocks that enable the obtainment of handwritten signatures can be generally referred to herein as "HESS Blocks".

In addition, a HESS system can utilize and incorporate into a transaction and associated documents multiple forms of signature blocks for the performance and obtainment of different acts of execution for identifying a party's agreement, assent and/or consent to a transaction document(s). These multiple signature block forms, generally referred to herein as "Click-to-Sign" or "Toggle Blocks", can include, without limitation, the following: (i) initial blocks; (ii) check boxes; (iii) buttons; or (iv) any other manner of enabling an electronic indication of a party's agreement, assent and/or consent to a transaction document and/or stipulation made within a transaction document that is or may be contemplated for use in a particular transaction. Still further, another form of signature block that can be employed by operation of the current invention may be referred to as a "third-party block". A third-party block may be included for the capture of signatures for a transaction from various parties that are related to a transaction including, without limitation, a notary, certificate authority, or such other related party as may be required for accomplishing a transaction.

The document management engine 725c can enable the establishment of signature blocks, such as those for the obtainment of a signatory's handwritten signature and/or other acts of execution, within a transaction document(s) through the use of various tools, techniques and applications. The various forms of signature blocks contemplated herein can be established as pre-determined forms that are stored within a system memory location and accessible by system users. It is contemplated that during the generation of a transaction document a party may retrieve one or more of these signature blocks and apply them within the transaction document at user determined locations. Still further, the current invention can enable users to create signature blocks, such as establishing an underline with a name below it. The user created signature blocks can be established directly within a transaction document during the document creation and/or editing process or stored in a system memory location for later use.

The number of signature blocks and location within a transaction document of a signature block can be determined automatically or by a user. Therefore, it is contemplated that a transaction document can include any number, type and position of signature blocks. In particular embodiments, at a minimum, two HESS Blocks (one for each signatory party) positioned at or near the end of the document are included. These HESS Blocks may be proximal to the end of a transaction document or variously positioned throughout the document in any manner. Alternatively, three or more HESS blocks can be included in a document and they can be variously positioned within the document or placed at or near the end of the document. Still further, one or more user created signature blocks, third-party blocks, Toggle Blocks, including one or more of the underlines with name below, notary block, initials blocks, buttons, and/or check-boxes, for one or more of parties to a document, may be included and variously positioned throughout a transaction document in addition or the alternative to a HESS block for each signatory party to the document.

The position within the document that a signature block can be located may be unlimited or restricted by position restrictions established for the signature block. The transaction document itself may or may not include position restrictions that limit the location(s) in which a signature block can be established within the document. These position restrictions may be applied automatically by the HESS System or manually by a party to the different transaction documents used for a transaction.

A signature block(s) can allow the performance of a required act of execution, as designated by the signature block, only once and have that performance of an electronically captured signature applied as many times as required to a transaction document or a group of transaction documents. For example, a transaction document established within a transaction environment may require a user to initial each page of a transaction document. The user's handwritten initials can be captured either prior to or after review of a transaction document and stored within a system memory location. A signature capture device, as described herein, may be used to capture an electronic representation of the user's initials. As the user is reviewing each page of the document the user may use a mouse or other input device to "click" on an initials signature block at the bottom of each page of the document when review of the page is complete. Similarly, the user may use a mouse or other input device to "click" on a signature block at the end of the document. The "click" is an indication of the user's consent and intention to have their initials applied to each signature block established on each page within the transaction document. The initials may then be automatically retrieved from the system memory location in which they are being stored and applied to each initial block, respectively, that was identified by the user during the "click-to-sign" process. In an alternative for the above example, the user may provide their initials within a signature block established within the document at a particular location and upon performing that act of execution their initials may be automatically placed within the other related and/or indicated signature blocks within the document.

The document management engine 725c can include the functional capability for generating and/or identifying signature tags. The document management engine may generate transaction documents and automatically include signature tags or allow a user to determine the inclusion of signature tags. The signature tags can be metadata, software keys, specified text (e.g., text in white or "hidden" text that is identifiable by the system but not visible when presented to users, text such as "signature", "seller", "seller name", "buyer", "buyer name", "party type", etc.), and the like. These signature tags can facilitate identification of the type of and position for signature blocks within generated transaction documents. As such, these tags can be associated with one or more particular forms of a signature block (e.g., HESS, Toggle Blocks, third-party, user created) or any other signature forms as may be contemplated and commonly used. In this manner, the document management engine may automatically insert signature blocks within a transaction document based on a user identified form and position for one or more signature blocks within a transaction document.

The current invention contemplates the use of several different techniques for providing electronic transaction documents, including executable electronic transaction documents. The functional requirements and capabilities for providing a document as contemplated herein are a feature of the document management engine 725c of the HESS Software. The generation of one or more electronic documents necessary for a given transaction includes the generation of all required agreements between the parties to a transaction for defining agreement between the parties and establishing a legally binding relationship. In general, the document management engine 725c can be configured to enable any and all document processing capabilities desired to be established for the current invention including, without limitation, the creation, generation, manipulation, editing, amending and modification of any materials, including transaction documents of all types. The document management engine 725c can allow any user to access transaction document from or import transaction documents to any other networked computing devices within the HESS System.

The document management engine 725c can enable access to and use of any pre-existing electronic transaction materials, which can include a document library consisting of one or more pre-existing electronic transaction documents and other materials. Individual, pre-existing electronic transaction documents can be referred to herein as "templates" without limiting the nature and scope of the document being referenced. Templates can include any type of transaction documents, including those that do or do not require execution, related or associated documents, any materials for establishing a relationship between parties and/or transaction related data such as task lists, confidentiality requirements, process flows, instruction files, tutorials, or other transaction related information. The templates can include execution ready forms of transaction documents and/or RSEE compliant transaction documents in accordance with pre-determined data sets. The templates can be manipulated in any manner and therefore, any template can be customized for a particular transaction.

The document management engine 725c can use a system memory location, such as memory 716 of server 710 or the database 715 of the system 700, to store and provide access to transaction documents. The stored transaction documents can include any materials and can be accessed by any networked device and from any location that may be proximal to or remote from any other networked computing devices. The structure given to the storage location within which the transaction documents are stored may vary as contemplated by those skilled in the art, and can include an associative or relational structure. Transaction documents may be organized such that those that are or may be commonly used in performance of a single transaction are stored in a common location (file or folder) or are otherwise identified as being associated with or related. In this manner a HESS System can promote an improved organization and accessibility of complex information and various numerous transaction documents associated with a transaction.

The association of transaction documents can be supported by an associative or relational data storage location or matrix that can be established for use by the document management engine 725c. In such a transaction document storage matrix one or more transaction documents can be stored and/or accessed individually, as part of a related grouping of transaction documents or as a relatable group of transaction documents. For example, a transaction environment for a particular transaction can establish a required transaction document, such as a first Transaction Document "D1", wherein the user is provided access to and allowed to interact with D1. User access and interaction with the transaction document can be enabled via the transaction environment managed by the website engine, as described above. It is contemplated that prior to the establishment of a required transaction document, a transaction environment can enable a user to determine and/or select any or all required, associated transaction documents.

In the current example, upon establishment of D1 within the transaction environment, the document management engine can direct that all related transaction documents stored in the matrix also be established and provided to the user. In this example, it can be assumed that and second transaction document "D2" and a third document "D3" have been established within the matrix as related to or associated with D1. Therefore, upon establishment of D1, these other two documents (D2 and D3) can be automatically established within transaction environments that allow a user to interact with them. The related documents can be established within the same transaction environment established for D1. It is contemplated that these related documents be established together within a separate, but associated transaction environment or each document can be established within an individual and associated transaction environment.

In an alternative embodiment of the above example, the document management engine can, upon the establishment of D1, provide to a user a selectable list (e.g., "document menu") of related or associated documents that allows a user to determine whether they wish to have additional documents provided to them for their transaction. For instance, upon establishment of D1 within a transaction environment, a document menu that lists D2 and D3 can be provided. The document menu can allow the user to select one or both of these related transaction documents and have them provided from the storage matrix. By making a selection the user determines which related transaction documents to establish within a transaction environment for the transaction.

Additionally, various data and information can be displayed to a user in association with a transaction document or as part of a document menu, such as various audio and/or video materials or presentations. These may include indications of whether additional documents are required for completing a transaction in accordance with jurisdictional requirements and/or instructions for completing the execution of transaction documents. Still further, various lists of additional information and/or documentation available to the user through use of the HESS system 700, and any additional relational directives, display features, and system capabilities may be displayed to a user in association with or separate from a transaction document and/or document menu. It is further contemplated that any display of information and/or a transaction document made to a user via a transaction environment established for a transaction can occur at any point associated with or separate from the establishment of any other information and/or transaction document.

A user device, such as the user devices 750-756 shown for system 700, may include one or more transaction documents stored within their memory. These documents can be accessible by or communicable to other computing devices connected over a network established for a HESS System. Additionally, transaction documents can be stored at various other remote locations and upon devices that can be accessed over a network connection, but which may not be exclusively used by or for a HESS System, such as in remote system 780. In addition to transaction documents, the system memory location, user devices and/or other memory locations may store any other data and information as contemplated for storage in a system memory location.

Many transactions contemplate and require multiple parties to contribute to the preparation of transaction documents. While in some instances these documents may be selectable from the numerous, pre-existing templates as described herein, there can be many instances where entirely new documents will be needed or the templates will be amended and modified from their original form to accommodate the needs and requirements of a particular transaction.

The document management engine 725c provides a flexible platform for accessing templates, creating, generating, editing, modifying, storing and managing any of the transaction documents contemplated for use by the current invention. Therefore, amendment to the capabilities provided via the document management engine 725c falls within the contemplated scope of the current invention. For example, for establishing a services relationship between parties, a service provider may, at least initially, wish to prepare a terms of service agreement, a confidentiality agreement, and other transaction related documents. Templates for one or more of these documents may be provided and retrieved from a document library of the document management engine and established within a transaction environment. Alternatively, within a transaction environment for the transaction, the document management engine 725c may enable the seller or other users to use document processing capabilities that allows for the creation or generation of one or more of the desired or required documents. Any form of transaction document established within a transaction environment can be subject to user interaction, wherein the user can be enabled with document processing capabilities that may allow them to perform editing, amending, modifying, and storing functions in regards to the transaction document.

While transaction documents are established within a transaction environment, access to these documents can be provided to various parties. By way of example, a seller (party A) and parties B, C and D who are the prospective recipients or buyers of the contemplated and proposed services may access the transaction documents established within a transaction environment. These parties or users involved in the generation of an electronic transaction document do so through use of a computing device, which enables their interface with the transaction environment in which the document is established. For instance, the seller may be utilizing a tablet or other form of mobile computing device and the buyers may be using one or more desktop user computers, similar to that described for HESS System 700. The user computers and the mobile computing device can enable each respective party, via a communication connection over the Internet, access to the transaction environment(s) of a transaction being hosted by the HESS System. The transaction environments provide a display of and allow user interaction with any and all transaction materials, including information, data and/or electronic documents, established within.

Within the transaction environments the parties may operate upon the transaction documents until arriving at an execution ready form of the document. The execution ready form of a transaction document can be the form of a document that includes signature blocks and contains signature blocks that can be executed by the required signatories. Other transaction materials may arrive at a final form when determined by one or more parties to a transaction or when in a form that is agreed to by the parties. The document management engine 725c can enable user input regarding whether any transaction materials have arrived at an execution ready form. For instance, one or more users may be prompted to provide an indication, such as by "checking" a box presented via a pop-up window or other well-known manner, of their determination that the transaction material is in an execution ready form. Thus, the transaction materials can arrive at an execution ready form based on unilateral determination and/or agreement between one or more parties. In this manner, whether starting from a template document or creating a totally new document, the transaction environments enable parties to a transaction to create and arrive at an execution ready form or final form for all transaction materials. As described in this specification, a system determination that a transaction document is in execution ready form can be used, at least in part, in the determination of whether an executable transaction document can be established within an RSEE.

Within the transaction environments the parties may operate upon a transaction document(s) until arriving at an RSEE compliant form of the document. The RSEE compliant form of a transaction document can be the form of a document that includes one, multiple or all required aspects that satisfy the required RSEE Factors as determined for the establishment of an RSEE for a transaction document. As described herein, establishment of an RSEE compliant document can include the use of an RSEE data set, which provides an indication of required RSEE Factors that must be determined satisfied. These indicated RSEE Factors can be used in a comparative manner with the transaction document in order to determine whether the document includes the appropriate items to satisfy each RSEE Factor. The document management engine 725c can enable user input regarding whether any transaction materials have arrived at an RSEE compliant form. For instance, one or more users may be prompted to provide an indication, such as by "checking" a box presented via a pop-up window or other well-known manner, of their determination that the transaction material is in an RSEE compliant form. Thus, the transaction materials can arrive at an execution ready form based on unilateral determination and/or agreement between one or more parties. In this manner, whether starting from a template document or creating a totally new document, the transaction environments enable parties to a transaction to create and arrive at an RSEE compliant form for a transaction document. As described in this specification, a system determination that a transaction document is in RSEE compliant form can be used, at least in part, in the determination of whether an executable transaction document can be established within an RSEE.

The user computing devices, including the mobile computing device, may contain various transaction materials. For instance, various editable information, data and/or electronic documents can be accessible via a user computer's local memory where the files may be stored and exportable to other networked computing devices. Upon receipt, by server 710, the transaction materials can be established in a transaction environment hosted by the HESS System. The establishment of the transaction materials in a transaction environment enables all parties with access to this environment to interact with the materials and operate upon the materials using the capabilities provided by the HESS System.

It is contemplated that a HESS System implementation may enable communication between networked computing devices and an independent website management platform, which may establish transaction materials within independent web-based environments. Using the example provided in system 700, communication with a third party server that provides the independent website management platform can be established over network 740 with the user devices 750-756 and server 710. The independent capabilities can be provided via remotely located and connecting computing devices, which may be included, for instance in remote system 780, as shown in FIG. 7. In this manner, any transaction materials, regardless of their source, may be established, displayed and user interaction enabled via one or more third-party website transaction screens and pages. Such third-party platforms can be enabled to provide any part of or all aspects of document processing, as herein identified, from creation to final form. Once the document processing capabilities of the third-party platform have been utilized, the arrived at form of the document may be transmitted to the system server, such as server 710 of system 700, for accomplishing any and all additional document processing or performance of execution.

It is to be understood that access to and performance of various document processing capabilities within a particular transaction environment may be enabled for all parties to a transaction or limited to certain parties. As discussed, a URL can be assigned to a party and/or a composite URL can be assigned to two or more parties with appended information that can provide an indication of a party's role, permissions, and authorities for a transaction. Alternatively, where a party is to have full and complete access to all system capabilities they may or may not be assigned a designation. It can be the case that the lack of an assigned user designation indicates to the system that the user is to have full access to all system features and capabilities. The lack of an assigned user designation may indicate to the system that the user is not to have access to any system features and capabilities.

A party to a transaction that is to assist or promote the preparation of transaction materials, including transaction documents, may be referred to and/or designated as a "document preparer." Document preparation being contemplated to include everything from the creation, editing and modification of a previously unavailable document to the editing and modification of an existing document or template document. In this example, the service provider and any of the "buyer" parties can be enabled as a document preparer. The seller (service provider) can use the system 700 to access and select a template electronic document(s) or such other "blank" electronic document with which to build a service agreement. One or more of the buyers can use system 700 to access and select a template document or a "blank" electronic document with which to build a service agreement. Alternatively, the functional capabilities for creating, editing and modifying a document and/or editing and modifying an existing template document may be restricted to one or more parties, such as the service provider and one or more of the other parties.

Each party to a transaction may have multiple designations and roles with respect to that transaction and each may establish different capabilities for the designated user and place different transaction performance obligations on the party. The buyer and seller are described above as being document preparers and it may be understood that all parties in this example are signatories as well. The signatory designation may enable each party to perform acts of execution for completing fully executed transaction documents. Therefore, it can be that all parties to a transaction have similar system capabilities and obligations for transaction performance. Alternatively, less than all parties to a transaction may be assigned similar and/or multiple designations. It is generally recognized that the roles and responsibilities of the parties, based on their designation(s), may overlap and may be specific to a particular transaction, transaction environment and/or to a particular document.

It is contemplated that multiple parties to a transaction can share common user designations, but also be assigned sub-designations based on their commonality. It is therefore contemplated that the parties to a transaction can be assigned a "buyer" or "seller" designation in addition to their signatory designation. Wherein all parties to the transaction are designated signatory parties it can be understood that all parties will be required to execute at least one or more common documents. However, parties to a transaction may be individually responsible for the execution of other documents. For example, all buyers and the seller may sign the terms of service, while only one of the buyers and the seller may be required to sign the confidentiality agreement. It can be that such an additional signatory capability and responsibility, relevant to fewer than all parties to a transaction, can be assigned to individual parties as a sub-designation of one or more designations. For instance, Party A can be assigned the "seller" party designation and the Party B, Party C and Party D can each be assigned the "buyer" party designation. Additionally, Party B can be assigned a "sub-buyer-1" designation that enables them as a signatory to the confidentiality agreement, as indicated above. Any designations and sub-designations as contemplated for a transaction may be established for use by the current invention. Thus, the current invention can manage transactions and ensure proper completion and execution even where not all transaction documents related to a single transaction are relevant to all parties involved in the transaction.

The document management engine 725c promotes improved document processing by providing document version management capabilities. Transactions often include numerous documents and changes may be made to the documents after initial creation. In embodiments, this document processing capabilities provided herein can allow a user to manipulate or edit a transaction document and ensure that the transaction document established within a transaction environment accessible by all other users reflects the current version of the document with all modifications. While many versions of a document may be generated through the creation and/or editing processes the document management engine can assist in ensuring that all parties are operating from or upon the same version of a document.

In operation, a seller (Party A) can establish from a template document or by creating a new document a first document version ("fdv") within a web-based transaction environment. This particular transaction environment, while establishing the fdv, does not allow for the obtainment of an act of execution by a signatory. Therefore, this transaction environment is preliminary to or outside an RSEE. This version of the document can be presented to buyers (Parties B, C and D) for their review and modification within this transaction environment. In this instance, buyers B and C are satisfied with the document and buyer D wishes to amend the document to include additional language. Where buyer D has the authority, as may be assigned to Party D by an appropriate "document preparer" designation, then buyer D can make changes to the document. These changes can be immediately reflected in the document and the version of the document, including the changes, can be established as the second document version ("sdv") and maintained within the currently established transaction environment. The transaction environment within which the sdv is established may show the changes as the changes are being made by buyer D to all parties that are currently viewing the document, which can include the seller and buyers B and C. In this manner, the document editing process may provide real-time document version update and/or verification processing.

In addition or in the alternative, as changes are being made to a document or upon an entry of changes to a document, the document editing processing may establish the sdv (second document version), including all changes made and/or entered, in a system storage location. The document management engine 725c, working in conjunction with the website engine 725a, can use this sdv as the version of the document that can and will be established within the next web-based transaction environment opened for the transaction. Upon the saving of the sdv within a system memory location, the website engine 725a can operate to close any transaction environments of the transaction, thereby preventing any operation upon a document version that is not the sdv.

It is contemplated that a transaction document, established within a transaction environment provided for a transaction, can be subject to multiple user interactions at the same or a similar time. These user interactions can include changes being made to the document by two or more parties. The document edit processing can monitor and track all the changes being made and the document can remain established in the transaction environment. This processing can also enable one or more document versions, including the various changes, to be saved to a system storage location. It is contemplated that the document edit processing can provide for the merging of all changes made by the various parties into a single document version. Document edit processing can include identifying any and/or all inconsistencies regarding the changes made by the different parties. Where changes being made are incompatible with the establishment of a single, consistent document version reflecting all changes, the document edit processing can provide various user displays within the transaction environment(s) of a transaction indicating all discovered inconsistencies between one or more of the changes being made. The document edit processing can then allow the parties to correct the identified inconsistencies. The monitoring and tracking of all editing performed on a document, including any editing performed on any and/or all document versions, including the generation and use of one or more document versions for the generation of a single document version that reflects changes made in a consistent manner are all functional capabilities provided by the current invention.

Thus, the current invention can assist in reducing the risk of compromising transaction integrity and its associated transaction documents by the actions of one or more of the parties to the transaction. This may also assists in ensuring that the final executable form of a transaction document will include any and all agreed to changes in a document from its original form.

The RSEE engine 720b can be an integral aspect of the HESS Software application suite stored within the memory 716 of the server 710. In this manner the RSEE engine, including the functional capabilities, transaction performance features and any other aspects for managing and accomplishing a transaction configured therein, can be operationally implemented and integrated with any of the additional engines and functional capabilities provided by the HESS Software. Alternatively, it is contemplated that the RSEE engine, and any "engine" configured for the current invention, can be modularly implemented in various computing environments that are enabled to interact in operational concert with the other functional capabilities established for the current invention. Thus, it is contemplated that the establishment and application of the RSEE engine can be from a networked location other than server 710, such as a dedicated RSEE engine server. Such a dedicated RSEE engine server can be a computing device separate from but communicatively coupled with server 710 or other networked computing devices. Therefore, the RSEE engine can be hosted by networked devices of a HESS System or otherwise operationally interacting with or controlled by an implementation of the HESS Software.

As indicated, the HESS System is enabled to establish and apply any of the various program features of the HESS Software implementation. This can include any and all rules, commands, instructions, permissions, requirements, and any other coded "executables" (e.g., code segments, and the like) as configured for establishing the HESS System and providing the one or more transaction environments within which a system user is allowed to interact with transaction materials to accomplish transaction performance. The RSEE engine 720b can interact with or be configured to provide all functional capabilities of a HESS System. Therefore, it is contemplated that the configuration given an RSEE engine is not required to be limited to RSEE management, but be enabling of transaction management over any and all aspects, such as the other web-based transaction environments, provided by a HESS System.

In embodiments, the RSEE engine establishes and allows application of various functional capabilities, including those that promote or allow user interaction with documents and materials established within an RSEE. Thus, the RSEE can display, promote and allow user interaction with transaction documents. User interaction with documents established within the RSEE can include, without limitation, any one or combination of the following: (i) execution of documents by the obtainment of handwritten signatures within signature blocks established within the document; (ii) execution of documents by the obtainment of other acts of execution, such as providing other indications within additional signature blocks established within the document as to a signatory's agreement, consent or assent to a transaction document; (iii) document management, including editing, modification, amendment, storage, access to and retrieval of documents; and any such other functional capabilities as desired for accomplishing a transaction as are provided by the current invention.

The RSEE provided by the current invention can promote transaction integrity by enabling a plurality of signatories to access and view a single transaction document or multiple transaction documents and obtain their handwritten signatures for the transaction documents simultaneously and in real-time. Even where one of the plurality of signatories is physical distant or remote from another signatory party, they are enabled to concurrently access the executable document established within the RSEE and allowed to simultaneously perform their acts of execution, which may include the obtainment of handwritten signatures and/or other forms of electronic signature.

Operational management of an RSEE, including, without limitation, its establishment, maintenance, all user interaction capabilities and/or closure (i.e., expiration and termination) can be configured within an RSEE Engine of the HESS Software. Therefore, access to the RSEE environment, and interaction with an executable transaction document established therein, is managed or controlled by RSEE management functions and features, which can be configured within the RSEE engine. It is contemplated that the operational management of the RSEE can be performed by the RSEE engine independently from or in conjunction or concert with the website engine 725a, document management engine 725c and/or any other engine, aspect or feature established by and for the operation of the current invention.

The RSEE engine 725b can provide and manage operational performance of a real-time, simultaneous execution environment (the "RSEE") for the execution of transaction documents. The RSEE can be understood as a web-based transaction environment (e.g., a website, web-page or linked, multiple web-pages) or other "virtual location" provided as an integral part of or operationally linked with all other transaction environments established for the performance of a transaction hosted by a HESS System. The RSEE is a transaction environment within which one or more transaction documents and executable transaction documents can be established for the performance and obtainment of one, multiple or all acts of execution required for the transaction document. Within an RSEE the full and complete execution of any established executable transaction document may and can be performed and obtained. In embodiments, the required acts of execution include the obtainment of handwritten signatures from a plurality of required signatories to an executable transaction document. It is understood that the performance of all acts of execution contemplated by the current invention can be enabled within an RSEE.

For the descriptive embodiments provided herein, the RSEE engine is described to include an RSEE Manager ("RSEEM"), which is a feature of an RSEE engine that is configured to establish and provide all RSEE operational management functions. Therefore, the use of the terms RSEE engine and RSEEM shall be understood as similar and interchangeable, except where specifically identified that they are not. For instance, the RSEEM, and therefore the RSEE engine, can provide for the management of the real-time, simultaneous execution environments (RSEE) for any transaction. The RSEEM can manage and/or work in conjunction with other "engines" provided by the HESS System and manage the various functional capabilities established for a HESS System.

To provide its management functionalities, the RSEEM can be configured with various techniques and processes, which may be referred to herein as RSEE Confirmation processes ("RSEEC" or "RSEECs") and RSEE Verification processes ("RSEEV" or "RSEEVs"). In addition, it is contemplated that the RSEE engine may be configured with numerous additional techniques, mechanisms, methods, processes, features and capabilities. It is understood that the use of these or other terms are intended to denote functional capabilities provided by the current invention and should not be read as limiting the scope of capabilities provided or excluding any other capabilities as may be contemplated.

The RSEEVs provide verification or determinations regarding several different factors, referred to herein as RSEE Factors (RSEEFs). The RSEEM can enable the execution and performance of the RSEEVs either individually or in combination. Multiple RSEEVs can be grouped together and understood as an RSEE package or RSEE verification package (an "RSEEVP" or "RSEEVPs"). The RSEEVPs can be understood to include, without limitation, the following: (i) an RSEE establishment verification package; (ii) an RSEE maintenance verification package; and (iii) an RSEE prohibition, expiration and termination verification package, as will be described below. Other alternative and/or additional RSEEVs and RSEEVPs are contemplated for and can be employed by the current invention. Each RSEEVP establishes and applies one or more RSEEVs that determine whether specific requirements (RSEEFs) for the establishment, maintenance and/or termination of an RSEE have been satisfied or not. Thus, an RSEEVP, through the use and application of one or more RSEEVs provides determinations regarding whether various required RSEEFs have or have not been satisfied. These RSEEVPs can enable the execution of various and multiple RSEEVs that provide confirmation as to whether specific RSEE factors are or are not satisfied.

In operation, the RSEE engine provides confirmations determinations regarding the RSEE Factor satisfaction determinations made by the various individual RSEEVs and/or those RSEEVs that may be grouped together for any of the RSEEVPs. These techniques and processes can be referred to herein as the RSEE Confirmation processes or RSEEC. Therefore, the RSEEM can be understood to include one or more techniques and/or processes that can execute to provide confirmation of the RSEEV determinations made by the various RSEEVPs. The RSEECs, in exemplary operation, can include and provide techniques and processes that (i) confirm and allow for the establishment of an RSEE; (ii) confirm and allow for the maintenance of an RSEE; and (iii) confirm and allow for the closure, whether as an expiration or termination, of an RSEE. Other alternative and/or additional RSEECs are contemplated for and can be employed by the current invention.

Performance of the RSEEVs and RSEECs can provide, without limitation, the following RSEE operational management capabilities: (i) determination of whether required RSEE factors have been satisfied; (ii) determination of whether each RSEEV has been fully satisfied, (iii) determination of whether to establish, maintain or close an RSEE; and (v) the establishment, maintenance and/or closure of an RSEE.

The RSEEM, whether in operational concert with the website management engine 725a and/or document management engine 725c or not, can establish web-based transaction environments for a transaction that are preliminary to an RSEE, enabling users to perform various transaction activities that may involve any form of transaction materials and documents, without having to satisfy the requirements for an RSEE. Therefore, for these preliminary transaction environments, the RSEEM can also provide techniques and processes that (i) determine and allow for the establishment of a preliminary transaction environment; (ii) determine and allow for the maintenance of a preliminary transaction environment; and (iii) determine and allow for the termination of a preliminary transaction environment. All transaction environments provided by the HESS System, including the RSEE, are determinable features of the current invention.

Within the transaction environments provided by the current invention, the RSEE management may be operationally identified in several different ways. For example, it can prohibit or allow an execution ready form of a transaction document to be established within an RSEE where it can be viewed, interacted with and/or executed by a user. It can allow an established RSEE to be maintained and, thereby, continue to allow viewing, interaction and/or execution by a user of the executable transaction document established therein. It can close an established RSEE, thereby, no longer allowing document execution and/or viewing by a user of the executable transaction document.

RSEE management can enable transaction performance, including arriving at a complete and fully executed transaction document or a partially executed transaction document. RSEE management can provide for establishment and maintenance of executable transaction documents within an RSEE thereby allowing operation upon or manipulation of the document, including without limitation such documents that have been fully or partially executed. RSEE management can prohibit an executable document being established within an RSEE or close an existing RSEE and enable various operations upon the document, including without limitation, establishment in alternative transaction environments or storage within a system memory location. It is also contemplated that RSEE management can provide multiple RSEE execution environments or, working in conjunction with the other engines, such as the website management engine 725a, alternative transaction environments within which acts of execution can be performed and obtained for transaction documents.

RSEE management can determine the timing of performance for any individual RSEEVs or the RSEEVs of one or more RSEEVPs. Therefore, RSEEVs can be performed simultaneously or coincident with one another or can occur at some earlier or later time. For example, during the performance of an RSEEV for the RSEE maintenance package an RSEEV of the RSEE PET package can execute simultaneously. For instance, and as described further below, an RSEEV of the RSEE maintenance package may be executing to ensure that the time period for the established RSEE has not expired, while, simultaneously, the process for determining if an unauthorized party has accessed or attempted access to the RSEE. It can be the case that the determination reached by one process can impact upon the execution of another. From the above scenario, where an RSEEV of the PET package determines that an unauthorized party has accessed the RSEE, an RSEEC can confirm these determinations and then "close" the RSEE for the document. This RSEE closure may occur prior to the determination being reached on whether the maintenance time period had been exceeded.

RSEE management further includes functional capabilities that determine what happens to an executable transaction document established within an RSEE upon the closure of an RSEE. When an RSEE is closed the established document therein is no longer accessible within the RSEE environment. The RSEE closure can result in the prohibition of any performance of any and all user interactions enabled within an RSEE. The RSEE closure can automatically store the document in a system location and/or establish the document within a transaction environment outside an RSEE. The RSEE closure can prompt additional user interaction to direct operation upon the transaction document. Thus, through the use of various user input mechanisms, such as through pop-up windows or other display features, a manual process can be established to manage at least some aspects of the closure of an RSEE or any other RSEE functions.

The RSEEM can, either automatically or via manual user interaction, determine whether to initiate any RSEEVP using various and/or numerous techniques and processes. It shall be understood that the RSEEM is enabled to make an initiation determination regarding a transaction document and executable transaction document that is currently established within a HESS System transaction environment or stored in an accessible memory location within a HESS System.

By way of example, the automatic initiation of the determination whether the RSEEM shall initiate the RSEE establishment package can be the result of an RSEEM determination that an executable transaction document established within a transaction environment is specifically designated to be in its execution ready form. For instance, whereupon two or more HESS blocks (handwritten signature blocks) are established within a transaction document, thereby, generating an executable transaction document, the RSEEM can automatically designate the document as being in execution ready form. It is to be understood that similar reference to a transaction document that includes signature blocks that require acts of execution can be made as an executable transaction document, an execution ready form, a final form, and a final executable form, except where specifically indicated otherwise. It is contemplated that the document generation process can be enabled to allow the establishment of HESS blocks within a transaction document as a final step in arriving at the final executable form of the document. The addition of various other signature block forms can be enabled to occur at various points within a document generation process. The automated association of an execution ready form designation with the document made by the RSEEM can occur while the document is established within the transaction environment preliminary to and outside an RSEE. The designation can be made in any manner, take any form and can be used throughout the document generation process and/or stored with the document in a system memory location for later retrieval and use. Based on this document designation the RSEEM can automatically initiate the RSEE establishment package for the executable transaction document.

The RSEEM can allow a user to manually designate a document as execution ready while established in a transaction environment and prior to initiation of an RSEE establishment package. For example, while the document is established in a preliminary transaction environment one or more parties may be provided an interface that allows them to determine whether to designate the document as execution ready and associate a designation with the document. The interface may accomplish this association of a designation using various, well known techniques, such as a selectable designation list presented as a drop down menu. Where a party has determined that the document is in execution ready form, they can make the appropriate designation selection, which can be captured and associated with the document. It is contemplated that one party may be allowed to make and input their determination of whether the executable transaction document is in execution ready form. Alternatively, two or more parties may be allowed to make and input their determinations of whether the executable transaction document is in execution ready form. Where the input provided indicates the document is in execution ready form, the RSEEM can enable the initiation of the RSEE establishment package. Where the input provided indicates the document is not in execution ready form, the RSEEM can prohibit the establishment of the document within an RSEE and allow the document to be maintained within its current transaction environment, thereby, allowing additional user interaction.

The RSEEM can provide for the storage of a transaction document that is in execution ready form. This storage capability can be an automatic or manual determination regarding whether the parties to the transaction, upon establishing an execution ready document, are ready to proceed to execution of the document. This can allow the document to be retrieved and established in a transaction environment at a later time, wherein the parties to the transaction or the RSEEM can determine whether to initiate the RSEE establishment package.

The RSEEM, using either automated or manual processes, can provide the determination that a transaction document is in an execution ready or final form that is used as the basis for whether to initiate an RSEE establishment package for further determining whether to establish the executable transaction document within an RSEE.

The establishment of a transaction document in an RSEE is based on determinations made by RSEEVs regarding whether various RSEEFs have been satisfied. The RSEEFs determined satisfied or not by the RSEEVs of an RSEE establishment package can include, without limitation, any one or combination the following: (i) a plurality of signatories required for an executable transaction document(s); (ii) a plurality signatories are concurrently accessing the executable transaction document; (iii) at least one of the plurality of concurrently accessing signatories is accessing the document via the use of a mobile computing device; and (iv) at least one of the plurality of signatories must be physically remote from at least one other signatory.

Embodiments of the current invention can require that all of the above identified RSEEFs be determined satisfied by the RSEEVs of the RSEE establishment package prior to the establishment of a transaction document within an RSEE. Alternatively, less than all four of these identified RSEEFs, more than these four identified RSEEFs, or any combination of RSEEFs can be required to be determined satisfied prior to allowing the establishment of a transaction document within an RSEE.

The performance of RSEEVs for the RSEE establishment package determine whether the specific RSEEFs have been satisfied for establishing an RSEE and can include the following: (i) a Party Plurality Verification process (PPLV), (ii) a Mobile Device Verification process (MDV), and (iii) a Proximity Verification process (PV). In embodiments, and as discussed below, the performance of all three of these RSEEVs can be required to establish an RSEE. Alternatively, fewer than all three of these RSEEVs, additional RSEEVs and/or any combination of RSEEVs may be required to establish an RSEE. As disclosed herein, these processes make individual satisfaction determinations related to each of the required RSEEFs and then either the RSEEV or RSEEM can provide a conclusive determination of whether the RSEEF is satisfied or not. Where the RSEEV processes determine that the RSEEFs are satisfied then the RSEEM can determine to allow the establishment of and establish the RSEE. Where these RSEEV processes determine that the RSEEFs are not satisfied then the RSEEM can determine to prohibit or not allow the establishment of a transaction document within an RSEE.

Additional RSEEFs can be required to be determined satisfied or not by RSEEVs of the RSEE establishment package and can include, without limitation, any one or combination of the following: (i) electronic communication (i.e., email, sms, and the like) is made to at least one of the plurality of concurrently accessing signatories, wherein the message includes a "link" for providing access to the transaction document(s); (ii) at least one other party to the transaction is concurrently accessing the transaction document with the plurality of signatories; (iii) at least one other party, having a predetermined user designation, is concurrently accessing the transaction document with the plurality of signatories; (iv) the executable transaction document is in an execution ready form; (v) RSEE establishment occurs within a predefined time period from the establishment of the designated execution ready version of an executable transaction document; (vi) the document has already been fully executed; and/or (vii) various transaction management restrictions configured for a particular RSEE; and (viii) such other RSEE factors as may be contemplated and applied for a given transaction.

From these additional RSEE factors, it is contemplated that the RSEEM can be configured with various additional RSEEVs for an RSEE establishment package whose performance can occur as part of the required determinations to be made for establishing an RSEE. These additional RSEEV processes can include, without limitation, the following: (i) an Electronic Communication Verification process (ECV); (ii) Transaction Document Form verification process (TDF); (iii) an Establishment Timing Verification process (ETV); (iv) Additional Party Verification process (APV); (v) Designated User Verification process (DUV); and such other techniques and processes as may be employed to determine satisfaction of any of the identified or contemplated RSEE factors implemented for the establishment of the RSEE.

Similar to the processes described above, where these RSEEV processes determine that the RSEE factors are satisfied then the RSEEM can determine to allow the establishment of and establish the RSEE. Where these RSEEV processes determine that the RSEE factors are not satisfied then the RSEEM can determine to prohibit or not allow the establishment of an RSEE.

The RSEEM can be configured with an RSEE maintenance package which during an established RSEE can execute one or more RSEEV processes to determine whether an established RSEE shall be maintained and allowed to continue. It is contemplated that an established RSEE may not be subject to an RSEE maintenance package. In embodiments, the RSEE factors determined satisfied by the RSEEVs of the RSEE maintenance package can include, without limitation, any one or combination of the following: (i) has the current RSEE exceeded a predetermined time period for RSEE maintenance; (ii) have one or more required user maintenance interactions have been performed; (iii) are a plurality of parties or signatories still accessing the document established in the RSEE; (iv) is at least one party or signatory accessing the established RSEE using a mobile device; and (v) is at least one party or signatory accessing the established RSEE physically remote from at least one of the other parties or signatories accessing the established RSEE.

In embodiments, the RSEEV processes for an RSEE maintenance package that determine whether specific RSEE factors have been satisfied or not can include, without limitation, the following: (i) Maintenance Timing Verification process (MTV); (ii) Maintenance User Interaction Verification process (MUIV); (iii) Maintenance Plurality of Signatory Verification process (MPSV). As disclosed herein, these RSEEV processes make individual satisfaction determinations related to required RSEE factors and then can provide, or the RSEEM can provide, a conclusive determination of whether the RSEEF(s) is satisfied or not. Where the RSEEV processes determine that the RSEE factors are satisfied then the RSEEM can determine and allow the established RSEE to continue. Where the RSEEV processes determine that the RSEE factors are not satisfied then the RSEEM can determine to terminate or close the established RSEE.

The RSEEM can be configured with various additional RSEEV process and/or techniques, including RSEEV processes for an RSEE prohibition, expiration or termination package. These RSEEV processes can be configured and referred to as an RSEE PET package. This package can include and execute one or a combination of several RSEEV processes that enable various RSEE factor satisfaction determinations. From these satisfaction determinations the RSEEM, or the RSEEV processes of the package, either automatically or via a manual initiation, can determine whether to prohibit the establishment of or close an established RSEE. Therefore, any document established in a preliminary transaction environment or an RSEE may or may not be subject to, without limitation, any one or combination of the following RSEEV process of a PET verification package: (i) prohibition of RSEE establishment; (ii) expiration of an established RSEE; and/or (iii) termination of an established RSEE.

As indicated herein, the RSEEM can provide techniques and processes that (i) determine whether the executable transaction document is in execution ready form; (ii) RSEEV processes that provide RSEE factor satisfaction determinations and/or confirmation of the satisfaction determinations made regarding each RSEE factor by each of the RSEEVs; (iii) provide a determination and/or confirmation (RSEEC) of an RSEEV process, which is a conclusive determination regarding whether the RSEEV process has been satisfied; (iv) determines whether to allow establishment, maintenance or closure of an RSEE; (v) establishes, maintains or closes an RSEE; and (vi) enable the performance of any and all transaction capabilities for the performance of a transaction.

In exemplary operation, with an executable transaction document established within a preliminary transaction environment, the RSEEM can determine if the document is in execution ready form, as shown in FIG. 2. This determination may be understood as a preliminary verification process performed before the execution of one or more RSEEVs of an RSEE establishment package. It is also contemplated that this preliminary verification process, along with others identified herein, may be executed in conjunction with various RSEEVs processes of various RSEEV packages and/or integrated within any of the RSEEV packages. Where the document is determined to be in execution ready form the RSEEM can initiate the RSEE establishment package for determining whether to establish the document within an RSEE. As will be described below for exemplary embodiments, an RSEE establishment package may include and provide for the performance of the following processes: (i) a Party Plurality Verification process (PPLV); (ii) a Mobile Device Verification process (MDV); and (iii) a Proximity Verification process (PV). These processes perform a determination(s) of whether certain RSEE factors have been satisfied.

Upon completion of any RSEEV processes, the determinations reached regarding satisfaction of the required RSEE factors by each process can be stored in a system memory location, such as a determination matrix. This information can then be used to make the determination of whether to allow or prohibit the establishment of the executable transaction document within an RSEE. Where the determination is made that all RSEEV processes have been satisfied, and thus all RSEE factors are satisfied, the RSEEM can determine that an RSEE can be established and then establish a transaction document, such as an execution ready form of a transaction document, in an RSEE. Where the determination is made that not all RSEEV processes are satisfied, the RSEEM can use this information to determine that the establishment of the transaction (executable) document within an RSEE shall be prohibited and prohibit an RSEE from being established. When the establishment of a transaction document, such as an execution ready form of a transaction document, within an RSEE is prohibited the document can be maintained in the current transaction environment, be stored within a system memory location and/or established within another transaction environment, which can be understood as "outside" an RSEE.

When an execution ready form of a transaction document is established in an RSEE, the RSEEM can initiate an RSEE maintenance package. The maintenance package can perform the following RSEEVPs: (i) Maintenance Timing Verification process (MTV); (ii) Maintenance User Interaction Verification process (MUIV); and (iii) Maintenance Plurality of Signatory Verification process (MPSV). The determinations reached by each RSEEV process regarding satisfaction of the required RSEE factors can be stored in a common system memory location, such as the determination matrix. The RSEEM can then use this information to make the determination of whether to allow the established RSEE to continue for the executable transaction document. Where the determination is made that all RSEEV processes are satisfied the RSEEM can allow the RSEE to continue to present the transaction document for display to and interaction by parties to the transaction. Where the determination is made that not all RSEEV processes are satisfied, the RSEEM can use this information to determine that the established RSEE for the executable transaction document shall be terminated and close the established RSEE. When the established RSEE is closed the execution ready form of the transaction document can be stored within a system memory location or established within another transaction environment. Typically, the alternative transaction environment at this point in the overall performance of the transaction may not be an RSEE.

Numerous, different memory locations, such as an individual storage matrix for each RSEEV process result can be established by the current invention. It is understood that the above description regarding system memory structure for data and information related to any particular RSEEV processes of any RSEEV package, such as the establishment and maintenance verification packages, of the RSEEM can apply to any and all other RSEEM determination(s) and/or confirmation(s), including without limitation the RSEEV processes for a RSEE PET package, the determination of whether a document is in execution ready form, and such others as described herein. This stored information can be accessed and retrieved by the RSEEM for further confirmation and determination processing regarding the establishment of an RSEE or an established RSEE.

As will be discussed further below, it is contemplated that any and all capabilities established for an RSEE engine, including those established in an RSEEM of the RSEE engine, can be customized to provide various functional capabilities and performance characteristics for any transaction environment, including within or outside any RSEE, that can be established by the current invention. The RSEEM can be configured with additional RSEEV packages. The RSEEV packages can be configured with fewer or additional RSEEV processes (RSEE factor verification processes) than those identified herein. Further, the RSEEM configuration can customize the execution of any individual or combination of RSSEV processes of any RSEEV package, such as performing fewer RSEEV processes than have been configured within the HESS Software for a package. For example, a transaction environment can allow for the establishment of an executable transaction document within an RSEE under circumstances where not all RSEEV processes configured for the RSSEV establishment package are determined satisfied. The timing of performance of any techniques and/or processes configured for an RSEEM can be customized for any transaction environment.

Transaction completion is a customizable aspect of the current invention. In embodiments, a transaction can be considered complete when all executable transaction documents have been fully executed by the performance of all required acts of execution by all required signatories, such as that shown in FIG. 6. The required acts of execution can vary, but at least include the obtainment of handwritten signatures from two parties to a transaction. Completion of all required acts of execution can be accomplished within an RSEE or multiple RSEEs established for executable transaction documents of a transaction. Alternatively, the completion of all required acts of execution for one or more transaction documents can be partially accomplished within one or more RSEEs and partially accomplished in a transaction environment outside the one or more RSEEs. It is also contemplated that the timing of the performance of required acts of execution within one or more transaction environments, such as those identified, can be varied and still satisfy all requirements for the complete and full execution of a document.

The RSEEM, upon making confirmation determinations regarding the RSEEV processes and all required RSEE factors for an RSEE establishment package can determine and establish an executable (execution ready) transaction document within an RSEE. The establishment of an execution ready transaction document or any form of transaction documents within an RSEE or multiple RSEEs may or may not involve the application of one or more document translation techniques. Any known translation and conversion techniques and processes may be employed by the current invention within any transaction environments. Therefore, the application and performance capabilities enabled by the translation techniques may vary. More particularly, it is contemplated that RSEE establishment may or may not require the translation of an executable transaction document to an alternative format. Further, where document translation occurs, it may occur at any time/point prior to RSEE establishment, during an established RSEE, at the closing of an established RSEE, or in a transaction environment alternative to an RSEE. Still further, various document formats, such as Word, PDF, HTML/Image, and such others as are otherwise known, can be processed and used by the current invention in accomplishing transactions and document translation. The handling of the version(s) of the transaction documents upon which a translation technique is applied and/or the version(s) of the transaction documents generated by application of the translation techniques may vary. In addition, the use, storage, retrieval and other processing of the version(s) (e.g., original formatted version, second (secondary format) version, third version, etc. . . . ) of an executable transaction document can occur at various times/points in the performance of a transaction being handled by the current invention. Thus, in application, the timing of their application, the file formatting, and the handling of transaction documents and the version(s) generated the current invention can provide customizable document translation features.

Transaction documents in any format, including translated versions of transaction documents, can be stored and retrieved from any HESS System memory location, such as memory 716 and/or database 715. It is further contemplated that a HESS System can provide a cached memory location or short-term storage location that can accomplish providing temporary storage and retrieval of transaction documents in any format. Therefore, the storage and retrieval of a document that has been translated or upon which a translation technique can be applied may be from any HESS System memory location, including a temporary or "cached" storage location.

As previously indicated herein, a transaction document can be originally established in various formats, such as Word, PDF, and as otherwise known. This can be identified as the document's original format. In particular embodiments, an executable transaction document is translated from its original format to an HTML (second) format for establishment in an RSEE. In such an instance, the document is represented in HTML and part of that includes an image-based representation inside the HTML. In this manner the images and HTML go together, and as such are referred to herein as HTML/Image format. In such embodiments, the translation of the transaction document occurs prior to, concurrently or simultaneously with its establishment in an RSEE. It is contemplated that each load (establishment) of an executable transaction document within an RSEE involves the translation of the document from its original format to a second format. The format of the executable transaction document established within the RSEE can be different from or similar to the format in which the document was originally created, generated, retrieved or otherwise established within a transaction environment.

In operation, the RSEEM can be configured with a RSEEM Translation (RSEEMT) capability. The RSEEMT can provide the one or more techniques and/or processes for accomplishing the translation of a transaction document from one format to another. Thus, all translation features provided, such as translation application, the timing of their application, the file formatting, and the handling of transaction documents and the version(s) generated can be customized and provided by the RSEEMT. Alternatively, the current invention can provide the translation techniques and/or processes in any manner and configuration implemented for a HESS System.

Transaction performance contemplates reaching a final agreement between the parties involved, which is formalized by the completion of a fully executed transaction document. Arriving at a fully executed transaction document requires the obtainment of acts of execution in signature blocks established within the document. As part of the translation of a document from one format version to another, the translation capabilities provided by the current invention promotes similarity in the number and positioning of signature blocks established in a transaction document when the document is translated between different formats. Therefore, the translated version of the document displayed in an RSEE includes all signature blocks that were included within the document in its original format. Further, an RSEE presents and displays the image of the document with the positions of the signature blocks/buttons in similar or substantially similar locations as they were established within the document in its original format.

It is contemplated that during translation the number and/or position of one or more of the signature blocks within the secondary document format can be minimally or significantly altered from their original positions within the document. This alteration of the number and/or position may promote the performance and/or obtainment of acts of execution required by one or more signature blocks included within a transaction document. When handwritten signatures or other acts of execution are obtained in the designated signature blocks, regardless of any positional relationship established by the secondary format of the document, the translation back into the original document format locates or positions the obtained acts of execution into their originally established locations or positions within the original document format.

By way of example, an executable transaction document that is originally formatted as a PDF file can include a first and second HESS Block in a first and second location within the document, respectively. Each HESS Block requires execution by handwritten signature from a signatory. It is contemplated that completion of the document requires completion of these two HESS Blocks, whereupon document execution occurs by the obtainment of handwritten signatures from a plurality of signatories. In the PDF format, the transaction document may be established within a preliminary transaction environment outside an RSEE. With the document hosted within this transaction environment the RSEEM can determine whether to establish it within an RSEE, as described in this specification. It can be the case that once the document is determined as being in an execution ready form, through a user designation or automated process, the RSEEM can determine whether to establish it within an RSEE, as described. For this example, the RSEEM can confirm all required RSEE factors for the establishment of the RSEE have been determined satisfied and thusly, the RSEEM may establish the document in an RSEE. Prior to establishing the document in an RSEE, the RSEEMT can execute its translation techniques to translate the document from its original (PDF) format into a second (HTML/Image) format. The translated (HTML formatted) version of the document is displayed as an image in the RSEE. The signature blocks or buttons are applied in HTML where they appear in the image of the document presented or displayed in the RSEE. The image displayed in the RSEE includes the first and second HESS Blocks in their first and second locations within the document, respectively.

In general, it can be understood that an execution ready transaction document in an original format can be established in a non-RSEE transaction environment and the RSEE establishment package can confirm its readiness for establishment in an RSEE. The establishment of the transaction document in an RSEE may involve, at least in part, a translation from the document's original (first) format into a second (secondary) document format. Thus, a document translation, or translation event, can occur prior to, concurrently or simultaneously with the document's establishment within the RSEE. In this manner, the RSEE establishes a translated version of the executable transaction document within and it is within this translated version that the obtainment of acts of execution are allowed and enabled.

In operation, a user can interact with the document image, in its secondary document format (HTML), displayed within the RSEE and be enabled in the performance of all functional capabilities. This can include the performance of some or all acts of execution within the RSEE, including without limitation the obtainment of handwritten signatures within designated signature blocks (i.e., HESS Blocks). Then, with acts of execution obtained, the document can be translated back into its original document format with the obtained "signatures" appropriately positioned.

With the translated (HTML/Image format) document established or loaded within an RSEE, the obtainment (i.e., capture and application) of each signatories handwritten signature can occur within the HESS Blocks (appearing as and/or represented by the signature buttons), via a signature capture interaction with the document by each signatory using their computing or mobile computing device to access the RSEE. This obtainment of signatures (signature data) can occur in real-time, during transaction performance. For instance, the obtainment of signature data can occur immediately upon or after the loading or establishment of the transaction document in the RSEE. The timing of performance of any transaction activities, from document establishment, to various acts of transaction performance, to obtainment of any executory acts can vary without departing from the scope and spirit of the current invention. All captured and/or applied acts of execution (signature data) are stored in a memory location of the HESS System (see below). The storage of any signature data can be provided in a temporary (cached) manner or in a more long-term environment based on established transaction and/or system parameters.

In an exemplary operational embodiment, upon signature capture within a HESS Block (as represented in the HTML/Image formatted signature buttons displayed) the captured signature is applied to the appropriate HESS Block located within the original document. This is a real-time capture and application of the signature to the original format of the document. Therefore, the captured signature data is translated into the original format for application to the signature block within the original document. It is contemplated that access (read/write) to the original version of the document for obtainment of executory acts within the signature blocks is through a hosted transaction environment that provides for operational interaction with this version of the document and allows the performance of needed capabilities, while the system is still displaying an image of the document within the RSEE. That portion (signature block) of the original document, which contains the captured and applied signature data is then translated again to HTML/Image for display to the user in the RSEE or alternative transaction environment. The display provides an image or representation of the obtained signature as an integral feature or modular component of the transaction document.

The version of the original format document that includes the applied signature data can be stored in an accessible memory location. This version of the document can be stored in a temporary (cached) manner or a more permanent manner by the system. It is also contemplated that a captured signature can be cached or otherwise stored for application to the original document at another time.

Obtainment of signature data by the current invention can occur for multiple (two or more) signatures or other acts of execution, wherein multiple parties can interact with the signature blocks of the transaction document, such as in real-time, to provide their act(s) of execution. The parties can provide their act of execution at a similar or substantially similar time, which can be captured and applied to the transaction document. Thus, the execution of a transaction document by multiple parties can occur in a simultaneous and/or concurrent manner and, therefore, the performance and obtainment of multiple acts, including acts of execution by handwritten signature, are enabled to occur in real-time and simultaneously for a transaction document established in the RSEE. Alternatively, the capture can occur in real-time and simultaneously while the application of the signatures to the transaction documents, such as the original format of the transaction document, can occur at a later time and not in a simultaneous manner.

Where the obtained acts of execution provide a fully executed and complete transaction document, the document can be stored and/or transmitted to one or more parties to the transaction. It is contemplated that regardless of the document format, the obtained signature data, such as the handwritten signature data, (commonly referred to as an e-signature, electronic signature, and/or digital representation of a signature) is positioned within the appropriate signature blocks as established in their original position within the original formatted version of the document.

Upon arrival at a fully executed document the RSEEMT can translate the document from the HTML/Image format to a third format that is alternative to the HTML/Image format and the original format of the document. For instance, the document with obtained signatures can be translated to a non-modifiable copy. This copy can be cached and stored in memory for later access and retrieval. This copy can be immediately transmitted or sent to the parties to the transaction. This non-modifiable copy is a third version of the document arrived at through translation of the HTML/Image format of the document. Such additional translation can occur at any time, such as immediately upon the completion of a fully executed transaction document or some later time from a system storage location. In the alternative, the HTML/Image version of the document, upon arrival at the fully executed document, can be translated back to the document's original PDF format. This version can be stored and/or sent to the parties to the transaction.

It can be the case that any of numerous versions of a transaction document can be stored within a system memory location throughout the performance of a transaction. For instance, where a fully executed document is translated into a non-modifiable (third) version for transmission to the parties of the transaction, a version of the document in its original format may be simultaneously preserved by storage in memory. This may promote document consistency and transaction integrity. Therefore, it is contemplated that various different versions of a transaction document, including various different acts of performance, such as executory acts, can be maintained by the current invention. The various versions of a transaction document can be temporarily stored or cached. For instance, a version of a transaction document that includes some but not all required acts of execution may be cached for later retrieval and obtainment of additional acts of execution prior to it being translated to another format. This may promote a decrease in the number of document translation events that are required to occur or ensure that a translation event for a fully executed transaction document occurs only once.

The current invention can include the ability to determine whether all acts of execution have been obtained and, based on this determination, the transaction document can be translated back from a second document format to its original document format. This determination can be made through user input received or based on the automated execution of determination processes provided and configured for the RSEEMT, the RSEE Engine or as otherwise configured for and implemented by the HESS Software. The RSEEM, via the RSEEMT or otherwise, can determine when all acts of execution have been obtained prior to initiating any further processing. For instance, the translation of the transaction document from its secondary format back to its original format and/or into a "third" format version can be based on a determination of whether all acts of execution have been obtained. In reference to the method 600 shown in FIG. 6, upon the obtainment of one or more acts of execution the RSEEMT may include and execute a process that determines whether all required acts of execution have been obtained for the document or a process that "jumps" into the method 600 just before step 670 and, in a similar manner, determines whether all required acts of execution have been obtained for the document. Whereupon a determination is reached that all required acts of execution have been obtained the RSEEMT process may determine whether to establish the document within the RSEE in its secondary format or original format and/or translate the document into a third format. Where the RSEEMT process determines that the document is to be established and/or stored in its original format it initiates and completes the translation of the document back into its original format. Where the RSEEMT process determines that the document is to be established and/or stored in a third format it initiates and completes the translation of the document into this new format. These determinations, and other contemplated determinations, and then performance of document translation may both be enabled in an automated manner. As such, any known techniques and/or processes for achieving the automated determination and initiation may be employed.

Alternatively, the determination whether to translate a fully executed, complete transaction document back into its original format or another format may be initiated manually by a user interaction. For instance, a pop-up window may appear within the RSEE transaction environment requiring user input before proceeding with the translation of the document. The pop-up window may provide an indication to the user that all required acts of execution have been performed and ask the user to "click-here" to initiate document translation. It is contemplated that the user may be presented with the option to initiate or not to initiate document translation. Various other known user interface techniques for providing and utilizing user interaction can be employed in performing the capabilities described herein.

The RSEEM can enable the closure of an established RSEE based on user input. For instance, a user can be prompted to provide a determination whether to close an RSEE where some or all acts of execution have been obtained for an executable transaction document. Similar to the above, a pop-up window may appear within the RSEE transaction environment requiring user input before proceeding with the closure of the RSEE. It is contemplated that the user may or may not be presented with the option to initiate or not to initiate RSEE closure. Various other known user interface techniques for providing and utilizing user interaction can be employed in performing the capabilities described herein.

The RSEEM can be enabled to close an established RSEE based on the translation of a document back into its original format or into a third format. For instance, an established RSEE can be automatically closed upon the initiation of a translation process or occurrence of the translation of the transaction document. The RSEEM may establish the "re-translated" or third version of a transaction document in a transaction environment that is not the RSEE and therefore, no further acts of execution can occur. However, the established transaction environment can present, display and enable other user functionality as may be determined for the fully executed transaction document.

The RSEEM, upon manual or automated closure of the RSEE, may initiate several processes. For example, it may initiate the storage of the transaction document, whether fully executed or not, in a system memory location or establish the document in another transaction environment. Where a manual user interaction was required to initiate a translation of a fully executed transaction document the system may automatically establish the document in a transaction environment outside the RSEE. Still further, the system may prompt for additional user interaction to determine whether to establish the executed document in a transaction environment outside the RSEE or simply close the RSEE and store the document in a system memory location.

Described below in reference to the RSEE PET package, the current invention provides techniques and processes that can be employed to accomplish the expiration and/or termination of an established RSEE. Thus, upon obtainment of all required acts of execution, including required handwritten signatures, from each of the required signatories to the executable transaction document, an RSEE PET package expiration process can either independently or in conjunction with other capabilities, such as those provided by the RSEEMT, close or shut down the RSEE transaction environment for the executable transaction document. It is contemplated that the RSEE expiration can provide for the storage and/or transmission of the fully executed document.

Storage of a fully executed document in a system memory location can allow document access and retrieval for various purposes, such as transmission, viewing and/or printing. It is contemplated for embodiments that a fully executed version of the document will be "non-modifiable", "locked" or prevented from having any editing or modification made to it. This document security feature can be automatically or manually applied to the document upon its full execution.

The translation capabilities configured for the RSEEMT may further promote transaction completion from remote locations and the use of the mobile computing devices for accomplishing transactions using the transaction management capabilities of the current invention. Because the document can be presented and displayed in any format, such as one best suited for its display upon a mobile device enabled with a signature capture capability, and signatures obtained to the original format, or such other formats as may be used, a user can be anywhere with their mobile device and access the document, utilize any enabled transaction environment functionalities and perform any acts of execution. Also, the system may promote transaction integrity through the (i) document translation capabilities, which enable the obtainment and proper positioning of acts of execution within the appropriate signature block(s), throughout all document translation processes; and (ii) document storage capabilities, which enable secure storage of document versions and can restrict further unauthorized modification of a fully executed transaction document.

The following provides description for an exemplary, non-limiting configuration and implementation of the RSEEV establishment and maintenance packages for an exemplary RSEE engine 125b. It can be understood that other techniques and processes can be configured and implemented within the RSEE engine or other engines, features or aspects provided by the current invention.

For an RSEEV establishment package, required RSEE factors are determined satisfied by the exemplary RSEEV processes that can be configured, in exemplary embodiments of the current invention, for the RSEE establishment package: (i) a Party Plurality Verification process (PPLV), (ii) a Mobile Device Verification process (MDV), and (iii) a Proximity Verification process (PV).

In operation, the establishment of the RSEE by the current invention can be determined, in part or whole, by the PPLV. The PPLV determines (i) whether a plurality of signatories are required for an executable transaction document and (ii) whether a plurality of signatories are concurrently accessing the executable transaction document. Therefore, the PPLV provides determinations regarding the satisfaction of multiple RSEE factors. These determinations can be stored and used by the RSEEM, or the PPLV, to provide a conclusive PPLV process determination. In this manner the RSEEM, or the PPLV, can reach a determination as to whether the PPLV itself has been satisfied. The determination of whether the PPLV has been conclusively satisfied is used by the RSEEM to determine, at least in part, whether to establish an executable transaction document in an RSEE. For transaction documents that do not require execution or execution by multiple parties it is contemplated that a HESS System can provide one or more alternative transaction environments that may enable many of the functional features of the HESS Software, but not provide an RSEE for the particular document(s).

PPLV execution can be automatically or manual initiated and can provide verification, individually or in combination, of (i) a plurality of signatories being required for an executable transaction document, and (ii) concurrent access to the executable transaction document being made by a plurality of the signatories. The PPLV may be variously implemented as an integral component feature of the current invention, such as a Party Plurality Verification process of the RSEE engine of the HESS Software. Alternatively, this component feature may be provided through an independent, modular instantiation of the capability implemented within and upon any one of the various networked user devices or some other networked computing device, whether operated by a signatory or not, as may be contemplated.

In an embodiment, with an execution ready executable transaction document established within a transaction environment, such as a preliminary transaction environment, the PPLV can perform a first verification that determines whether the executable transaction document requires a plurality of signatories for execution. Then a second verification determines whether a plurality of the required signatories are concurrently accessing the executable transaction document within the transaction environment. Where both the first and second verification processes are determined satisfied, the PPLV can be conclusively determined satisfied. Where one or both of these processes is not determined satisfied, the PPLV can be conclusively determined not satisfied. These conclusive determinations can be used by the RSEEM as part of its process to determine whether or not to establish an RSEE.

The first verification process of the PPLV performs a first step of reviewing an executable transaction document to identify and determine the presence of two or more HESS blocks within the document, and then, in a second step, the name of each signatory associated with each HESS block is identified. Finally, in a third step, the PPLV compares the signatory names associated with each signature block and determines whether the signature blocks require execution by two or more different signatories. The PPLV determination of whether a document requires execution by two or more different signatories can be stored and this information made available for confirmation by the RSEEM.

The RSEEM, by accessing this information for use during a confirmation process, can then confirm that this requirement is satisfied for the establishment of the RSEE for the executable transaction document. Where the PPLV determines that document execution does not require two or more different signatories it can store this information and make it available to the RSEEM. The RSEEM, by accessing this information for use during its confirmation process can then make a negative determination indicating that this requirement has not been satisfied. Such a negative determination can, at least in part, contribute to a prohibition and/or failure of RSEE establishment.

To perform the second verification of the PPLV, the current invention is enabled to distinguish between and determine that different required signatories are concurrently accessing the executable transaction document within the transaction environment. It is contemplated that the name information captured and stored in the first verification of the PPLV may or may not be used in the performance of this second verification of the PPLV.

A first step identifies whether two or more of the required signatories for an executable transaction document are accessing the transaction environment of the HESS System for the particular transaction. In exemplary embodiments, this first step can be accomplished through the use of unique URLs assigned and sent to individual parties to a transaction. For any embodiments of the current invention, assigned URLs can identify a party or parties and their designated role for a transaction, IP address information, direct or point each party to a particular transaction environment and include such other information as contemplated. Thus, for the current example, a URL assigned and sent to each party can identify the party, that party's designated role as signatory for the transaction, and direct or point each party to the preliminary transaction environment in which the executable transaction document is established. It is contemplated that the URLs can direct any party to any transaction environment, including an RSEE, being employed for performing the particular transaction. Where two or more of the parties, to whom URL's (individual or composite) are assigned and sent, use their assigned URL to access the preliminary transaction environment, the PPLV process can validate their access and role in the transaction. In the current instance, URL verification can validate the identity of each party requesting access to the preliminary transaction environment and each party's designated role in the transaction as a signatory. Thus, where multiple parties access the preliminary transaction environment, through use of an assigned URL, this part of the PPLV verification can be determined satisfied.

In the alternative, where multiple access requests are received to a transaction environment, the next step of the process can identify and store the name of a first user that is accessing the transaction environment. Another step can identify and store the name of a second user that is accessing the transaction environment. The names of each user or party that is attempting to access the transaction environment can be captured in various manners, such as from system log-in information or via a prompt presented to the user prior to enabling and allowing their access to the transaction environment.

In a next step, a comparison can be made of the captured names for each of the users accessing the transaction environment and/or IP address information for each user computing device accessing the transaction environment in order to determine whether the names of each identified user and/or IP address information for each user is different. Where the user names are determined to be different from one another, then a further determination can be made of whether these different user names match the names of the signatories associated with the signature blocks in the executable transaction document. Where the PPLV determines that the user names, for each user accessing the transaction environment, match two or more different signatory names for an executable transaction document it can determine that the access by two or more different signatories requirement is satisfied.

In still further alternative embodiments, the system can capture and store assigned URL information and/or IP address information for the computing device used by the users, or for a router, server or other intermediary computing device that enables and establishes the communication connection between any networked user computing device, over the Internet or other communication network, with other networked computing devices, such as the server 710, of system 700 shown in FIG. 7. The storage of the identified names for the users, assigned URL, and/or IP address of each user computing device can be within a memory of a system server computer, such as memory 716 or server 710, or an alternative data storage location, such as within database 715.

It is contemplated for any of the process embodiments described herein, that another aspect of this PPLV process can include a determination of satisfaction of a time range or establishment window/period requirement. For instance, access by each of the signatory parties may be required to occur within a predetermined window of time. Therefore, in embodiments for the current invention, this part of the PPLV process can be understood as requiring the verification of a party's identity, their role in the transaction and the timing of access requests made by two or more parties to a transaction environment.

The predetermined window of time, which may be identified as an establishment period, can be configured as various ranges of time that are satisfactory for establishing the concurrence of access to the document and promoting the simultaneous obtainment of acts of execution by the signatory parties. The various ranges of time within which multiple document access requests can be received and determined concurrent can include, without limitation, the following: (i) up to 3 seconds; (ii) up to 5 seconds; (iii) up to 10 seconds; (iv) up to 15 seconds; (v) up to 20 seconds; and such other three to five second intervals as may be determined satisfactory. It is contemplated that satisfaction of the concurrent access timing factor may be established as intervals of less than three seconds, less than two seconds, or such other various intervals as may be contemplated. It is further contemplated that the concurrence of access can include time ranges measured in minutes, hours, days and such other measures as desired for a particular implementation of the current invention.

The satisfaction determinations can be stored and made available for confirmation by the RSEEM. The RSEEM, by accessing this information for use during its confirmation process can then confirm that this requirement is satisfied for the establishment of the RSEE for the executable transaction document. Where the PPLV determines that document access is not being made by two or more signatories and, as may be contemplated for certain embodiments, in a concurrent manner, it can store this information and make it available to the RSEEM. The RSEEM, by accessing this information for use during its confirmation process can then make a negative determination indicating that this requirement has not been satisfied. Such a negative determination can, at least in part, contribute to a prohibition and/or failure to RSEE establishment.

It is contemplated that the stored information, such as a party's or parties assigned URL, user name, signatory name and/or IP address information, may be accessed and used at any time after its capture, along with any additional user information captured and stored, for the performance of any processes and/or capabilities provided by the current invention, including to provide the determination whether an RSEE factor is satisfied or a confirmation of this satisfaction for the establishment of an RSEE.

In alternative embodiments, a document may require execution by three signatory parties. Two of those parties may be accessing the document from a first (single) user computing device while the third party may be using a second user computing device. Where each party has been assigned and sent a URL (individual or composite), and they make access to a transaction environment using their assigned URL, the HESS System can verify this information and the party in a manner similar to that described above. In this example and for any transaction, it is contemplated that concurrent access can be established for multiple parties in a "staggered" manner. For instance, one of the two users at the first user computing device, using their unique URL, may concurrently access a transaction environment with the user who made access via their unique URL to the transaction environment from the second computing device, thereby enabling the satisfaction of the PPLV requirements. At a later time, but while the user of the second computing device is still accessing the transaction environment, the second user of the first computing device can access the transaction environment using their unique URL. This may also provide satisfaction of PPLV requirements or other RSEE maintenance requirements as described below. It is contemplated that the information and confirmation regarding the first two parties can be captured, stored and used later in various manners.

Alternatively, the HESS System can capture, store and associate the assigned URL and/or single IP address for the first user computing device with each of the two parties. In such an instance, the PPLV process may require additional input from each of the two users, such as input by each user of their name, which can be captured, stored and associated with the assigned URL and/or IP address of the first user computer. Then a comparison can be made of these two parties based on their user names and a determination regarding whether a plurality of signatories are concurrently accessing the transaction environment can be made in accordance with the verification processes described above. In this example and for any transaction, it is contemplated that concurrent access can be required by all signatory parties to a transaction document, such as the three identified herein, and, thus, the information and confirmation regarding the first two parties can be captured, stored and used in a later comparison against the captured and stored information regarding the third party. Then the determination of the satisfaction of concurrent access by a plurality of signatories can be reached.

The verification techniques may be employed in any manner, such as in a serial or parallel manner, individually or in combination or with any alternative techniques for accomplishing the PPLV. It is contemplated that alternative or additional verification techniques may be employed to establish whether either or both verification steps of the PPLV have been satisfied in conformance with this requirement for establishing an RSEE of the current invention. These techniques can be identified as secondary, tertiary, alternative or additional verification techniques. An example of a secondary technique that may be employed individually or in combination with those described above can include a system interface that requires the input of information by a user. The information asked for can include a user's system log-in information, where user registration is required for a particular HESS System implementation. It can be the case that the verification techniques employed may include a comparison of information captured from a user computing device of a current session against such similar data captured and stored for a user computing device from a previous user session. Further, verification techniques can be employed using other unique identifiers that are manually or automatically transmitted from a user computing device in a first session to a networked system storage location, such as the memory of the computing device hosting the HESS Software, and then used in a comparison verification for a later session.

In embodiments, the PPLV process can automatically initiate upon access being made by a user and/or signatory to a transaction environment, such as a preliminary transaction environment within which an execution ready form of a transaction document is established. The PPLV determination can be made concurrently or simultaneously with or prior to or after the performance of any of the RSEEVs for an RSEE establishment package, including those configured for the MDV and PV. It is contemplated that the PPLV determination can be made at any time by the current invention including, without limitation, during: (i) access to a transaction environment; (ii) access to an executable transaction document, (iii) an RSEEM confirmation, (iv) any point prior to establishment of or during operational performance within an RSEE of the current invention, and any other point as may be contemplated.

The PPLV process can capture and store information within memory 716 of server 710. It is contemplated that the storage location may be identified as a common location, referred to as a determination matrix, as a distinct location, referred to herein as a PPLV matrix, or other similar storage capability in one or more of the networked computing devices of a HESS System. The satisfaction determination(s) of RSEE factors and/or the satisfaction determinations of the PPLV process can be stored. Additionally, information relevant to the PPLV can be stored, which can include any information that is related to each user, signatory, networked user computing device and/or that relates to pre-determined configurations, such as the time ranges required for concurrence to be established.

A manual PPLV can be enabled through a user interface to the HESS System that allows users to initiate a process, perform a process, and/or input information relevant to a process, this information can be relevant to the performance of any steps of the verification process. The manual PPLV process can include one, all or any combination of the operational steps identified above or as follows to be performed by a user: initiating a determination of whether an executable transaction document requires execution by a plurality of signatories; verifying a party based on their assigned URL (individual or composite); providing user name and/or user computing device IP address information; storing the information provided by the user; initiating a determination of whether a plurality of users who are accessing an executable transaction document are signatories and are concurrently accessing the transaction document; associating the captured and stored information with a signatory to the executable transaction document; and various other manually initiated and/or performed techniques. It is contemplated that any of these manually enabled capabilities can allow a user to complete any processes and/or process steps, thereby enabling the satisfaction, at least in part, of the PPLV requirements for allowing the performance of, including without limitation, the establishment or maintenance of and/or user access to the RSEE of the current invention for the transaction document.

The PPLV or any other verification processes employed by the current invention can be further enabled with additional processes, such as validation and certification techniques. For instance, a technique can validate all accessing parties to an executable transaction document(s) and/or a transaction environment for which the transaction document(s) is associated. This validation of the parties provided by a PPLV process can be, at least in part, utilized by the current invention in the performance of the HESS Software functionality including, without limitation, the establishment and/or maintenance of the RSEE. Additionally, the validation can provide a security technique, whereby a party that attempts to make unauthorized access to a transaction environment and/or transaction document(s) can be prohibited from gaining access, establishing an RSEE and/or performing any interaction with a document(s), including any act of execution. Still further, the security feature can be used to terminate the party's access to the system and prohibit the identified party from accomplishing system access at another time.

RSEE establishment can require that at least one signatory to an executable transaction document, for which the obtainment of their handwritten signature must occur within the RSEE, accesses the transaction environment using a mobile computing device. All aspects of the current invention, including the transaction environments and capabilities disclosed herein, can be accessed and performed through any mobile computing device possessing the appropriate hardware and component features.

Typically, a mobile device usable within the HESS system of the current invention can include various devices, such as a smart phone, tablet computer, laptops, portable computers, hand-held devices, personal digital assistants (PDA), smart phones or any other Internet-enabled phones and devices, wireless devices, web-based technology systems, touch screen devices, typing devices, and any other similar electronic device enabled as described and capable of operating a web browser (i.e., Microsoft Internet Explorer, Safari, Google Chrome, Netscape Navigator, Mozilla Firefox, etc.) and equipped with Adobe Acrobat (pdf), Microsoft Word, HTML or any other mobile electronic document application. The mobile computing device may be enabled to utilize all features of any such applications and may, alternatively, operate through use of other proprietary or open source software programs.

The techniques and capabilities of the current invention may be equally applied in other contexts and/or to other types of computing devices, including kiosk systems, and the like. In particular, some embodiments provide for a modular (e.g., plug-in, widget, extension) configuration and implementation of a HESS system, wherein certain aspects of transaction performance can be described in the context of a desktop or mobile application, a hosted application, or other application(s) as may be contemplated. In addition, the techniques may generally be deployed (e.g., as a signature module) in the context of any Web-based information or e-commerce service that has a need to obtain an electronic signature from a user (e.g., to obtain assent to terms and conditions, to enter into purchase/sale agreements, etc.).

In embodiments of the current invention, a mobile device is networked within a HESS system. The mobile device can be any tablet-style mobile computing device, such as an iPad by Apple Computers, Inc. The mobile device can be enabled to interface and interact with the HESS System via an Internet connection to the network, such as Network 740 of HESS System 700. This interface allows the user to interact with the transaction environments established by the HESS System for their particular transaction and its associated transaction materials and documents. Where the user is a signatory to a transaction document, this can include enabling them to access an executable transaction document established within an RSEE transaction environment.

In embodiments, it is contemplated that the mobile device is enabled with signature capture functionality for the obtainment of a signatory's handwritten signature. The signature capture capability of the mobile device can be established through use of any commercially available software application that allows for the electronic capture of a handwritten signature. In an exemplary operation, the display screen of the tablet device, which is or can be a touchscreen, is able to accept the input of and capture a handwritten signature from a user. This handwritten signature information or electronic representation of a captured handwritten signature can be obtained within the HESS block for an executable transaction document established within an RSEE at the same or substantially same time as the act of execution is occurring. It is contemplated that the mobile computing device can store and transmit an electronic representation of the captured handwritten signature at a later time than at the moment of the act of execution.

The user can provide their handwritten signature by utilizing and applying a signature instrument, such as their finger, a stylus, an electronic pen/pencil, and the like, to the touchscreen and writing their signature thereupon. The current invention can utilize various mobile and tablet computing devices, which can include, without the limitation, any such mobile computing devices offered by various companies, such as Microsoft, Hewlett Packard, Sony Inc., Acer, Inc., Fujitsu, Inc., and such other companies that make such devices commercially available.

A dedicated signature capture device, such as signature capture device 790 shown in FIG. 7, can be used in conjunction with the various non-mobile and/or mobile computing devices that may be networked and utilized for the performance of the current invention. A signature capture device may comprise an electronic signature pad that is used to capture the handwritten signature of a signatory. The signature capture device can be communicatively coupled with any user computing device, including a mobile computing device, networked within a HESS System. The signature capture device may operate similarly to any commercially available signature pads. For example, the signature capture device may include a window within which a signatory can physically sign and apply their signature using a stylus or electronic pen. Examples of signature capture device may include USB, serial, or other attached liquid crystal displays or other displays such as those offered by Veriphone, Micros, Topaz Systems, Interlink Electronics, or others. Still other examples of signature capture devices include a mouse or other input device that includes a pointer that is used to "write" a user signature.

It is contemplated that the tablet, identified above, and/or signature device be established with variously configured signature capture areas within the device that are pressure-sensitive or electronically enabled to capture movements thereupon through the use of various input devices and/or tools. The captured signature may be displayed to the signatory by the device that captures the signature, wherein particular embodiments, the signatory may be given the opportunity to accept or reject the captured signature. In addition, the RSEE may present a representative display of the signatory's captured signature and the signatory may be given the opportunity to accept or reject the captured signature.

User interaction provided to a signatory of whether to accept or reject a captured signature can provide a basis for an RSEEM determination whether the executable transaction document has been fully executed and the established RSEE should be closed. As previously described, the RSEEM determination that an executable transaction document has been fully executed can allow the performance of an expiration process, whereby the established RSEE for the document is closed. A signatory's determination of whether to accept or reject a captured representation of their handwritten signature can be part of a manual RSEE expiration process. The manual expiration process can require that all required signatories to an executable transaction document established within an RSEE have performed their handwritten signature (act of execution). Then each signatory can be presented with a required user interaction, wherein they are presented and asked to accept or reject the representative display of their handwritten signature. Where the signatory rejects the representation of their handwritten signature the RSEE can provide several options. One option can be that the signatory is allowed to provide another handwritten signature to replace the first signature. Again, the signatory can be asked to accept or reject this signature. Another option can be that the RSEE terminate and the executable transaction document be established within a transaction environment outside the RSEE. Still further, the RSEE can terminate and the executable transaction document can be stored within a system memory location.

Where the signatory accepts the representation of their handwritten signature the RSEE can record this and determine whether all signatory's have accepted their handwritten signatures. Where all signatories have accepted their handwritten signatures, the determination can be made that the document has been fully executed and then the RSEE can be expired or closed. As described, RSEE expiration based on the determination of a fully executed transaction document can result in the document being established within another transaction environment outside the RSEE, document storage within a system memory location, or such other action as contemplated.

In embodiments, the current invention includes a Mobile Device feature that enables the performance, including automated or manual initiation and execution, of a Mobile Device Verification process (MDV). The MDV can provide verification, individually or in combination, of at least one of the plurality of signatories required for an executable transaction document is accessing the executable transaction document via a mobile computing device. The MDV may be variously implemented as an integral component feature of the current invention, such as a Mobile Device feature of the RSEE engine of the HESS Software. Alternatively, this component feature may be provided through an independent modular instantiation of the capability which can be implemented within and upon any one of the various networked user devices or some other networked computing device, whether operated by a signatory or not, as may be contemplated.

In embodiments, the MDV process can automatically initiate upon access being made by a user and/or signatory to a transaction environment within which an executable transaction document that is in execution ready form has been established. The MDV determination can be made concurrently or simultaneously with or prior to or after the performance of any of the RSEE verification processes, including those configured for the PPLV and PV. It is contemplated that the MDV determination can be made at any point during a transaction including, without limitation, during: (i) access to an executable document; (ii) an RSEEM confirmation and/or determination; (iii) any point prior to establishment of or during operational performance within an RSEE; and (iv) any other point as may be contemplated.

The MDV can include a first step of capturing and storing information specific to the accessing device and a second step, based on the captured and stored information, providing a determination as to whether the device is a mobile device. Information that can be captured and stored in a first step of the MDV may include, without limitation, the following: IP address for the device or a router, server, and any other computing devices that operate to communicably couple the device with various networked devices; mobile interface (software application) used by the device to interact with the HESS System; and any other device specific information that may assist in determining whether it is a mobile computing device, as may be contemplated for use by those skilled in this field.

Using this information, a second step of the MDV then performs a determination of whether the device accessing the HESS System is a mobile device. Where it is determined by the MDV that a user is accessing a transaction environment, which can include an established executable transaction document, via a mobile computing device, the MDV provides an indication that this RSEE factor is satisfied. This MDV determination of satisfaction can be used by the RSEEM to confirm that this requirement for the establishment of an RSEE for an executable transaction document is satisfied and therefore, may allow the establishment of an RSEE for the executable transaction document. Where the MDV determines that this RSEE factor is not satisfied and access to the executable transaction document is not being made via at least one mobile computing device, this MDV determination can be used by the RSEEM for confirming that this requirement is not met and therefore, may prohibit the establishment of an RSEE or terminate an established RSEE for an executable transaction document, as will be discussed herein.

A manual MDV can be enabled through a user interface to the HESS System that allows users to initiate an MDV process, perform an MDV process, and/or input information relevant to an MDV process. This information can be relevant to the performance of any steps of the MDV. The manual MDV can include one, all or any combination of the following operational steps to be performed by a user: inputting information specific to an accessing device; initiating the capture and storage of information related to a computing device being used by a user and/or signatory to access the system; associating the captured and stored information with a signatory to an executable transaction document; determining whether the device is a mobile device based on the captured information; and such various other manually initiated and/or performed steps as may be contemplated to achieve the satisfaction determination for the MDV.

It is contemplated that any of these manually enabled capabilities can allow a user to complete any processes and/or process steps, thereby enabling the satisfaction, at least in part, of the MDV requirements. This can further enable, including without limitation, the establishment and/or maintenance of an RSEE for an executable transaction document.

It is contemplated that alternative or additional techniques may be employed for the MDV to establish whether the mobile device requirement has been satisfied in conformance with this requirement for establishing an RSEE. The techniques may be employed in any manner, such as in a serial or parallel manner, independent from or in combination with those disclosed above or any alternative techniques for accomplishing the MDV. These techniques can be identified as secondary, tertiary, alternative or additional verification techniques. An example of a secondary technique that may be employed individually or in combination with those described above can include a system interface that requires input by a user of information related to the type of device they are using to access the HESS System. This user interaction can provide information requested by an MDV and may include a certification statement, wherein the user is required to perform an act that provides confirmation that the device they are using to access the HESS System is a mobile device. It is contemplated that the act required from the user can be the act of executing a signature block, such as any one of the HESS blocks, "toggle" forms of signature blocks or initials block as disclosed herein, wherein the signature block is associated and establishes a user's agreement to a pre-determined certification statement validating that the user's access to an executable transaction document is being made via a mobile computing device.

It can be the case that secondary verification techniques employed for the MDV may include a comparison of information captured from a user computing device of a current session against such similar data captured and stored for a user computing device from a previous user session.

Further, verification techniques can be employed using other unique identifiers that are manually or automatically transmitted from a user computing device in a first session to a networked system storage location, such as the memory of the computing device hosting the HESS Software, and then used in performing a comparison against unique identifiers captured for a later session.

An established RSEE provides a transaction environment that connects multiple parties to a transaction over a communication network. The connected parties are provided access to an executable transaction document for the obtainment of required acts of execution. At least one of the connected parties is at least one of the signatory parties and is not present at a closing location or otherwise physically proximal with another of the signatory parties. Thus, the system allows document execution and transaction performance to take place without requiring all the parties being present at one physical location.

The current invention includes a Party Proximity feature that allows for the automated or manual initiation and execution of a Proximity Verification process (PV). In exemplary embodiments, the PV initiates and executes prior to RSEE establishment and can provide verification, individually or in combination, that at least one or more of the plurality of signatories, required for an executable transaction document, is remotely located in relation to a closing location or at least one other signatory. The PV may be implemented as an integral component feature of the current invention, such as a Party Proximity feature of the RSEE engine of the HESS Software. Alternatively, this component feature may be provided through an independent modular instantiation of the capability implemented within and upon any one of the various networked user devices or some other networked computing device, whether operated by a signatory or not, as may be contemplated.

In embodiments, the PV process automatically initiates upon access being made by a user and/or signatory to a transaction environment established for a transaction document in execution ready form. The PV determination can be made concurrently or simultaneously with or prior to or after the performance of any of the other RSEE verification processes performed for an RSEE establishment package, including those configured for the PPLV and MDV. It is contemplated that the PV determination(s) can be made at any time including, without limitation, during: (i) access to an executable document; (ii) an RSEEM confirmation and/or determination; (iii) any point prior to during operational performance within an RSEE of the current invention; and (iv) any other time within a transaction environment as may be contemplated.

In embodiments, the PV process can include the following performance steps: (i) when a first party accesses a transaction environment established for an executable transaction document the PV can determine, capture and store location information related to the first party; (ii) when a second party access the transaction environment of the executable transaction document the PV can determine, capture and store location information related to the second party; (iii) using the stored location information for the first and second parties the PV can determine whether the parties are similarly located; (iv) where the PV determines the parties are similarly located the PV captures and stores this determination; (v) where the PV determines the parties are not similarly located the PV captures and stores this determination.

In operation, the PV performs a first step of determining, capturing and storing location information related to a first party that is accessing a transaction environment for an executable transaction document. The process can capture and store IP address information for the computing device used by the first party, or for a router, server or other intermediary computing device that enables and establishes the communication connection between any networked user computing device, over the Internet or other communication network, with other networked computing devices. It is contemplated that this IP address information can be used, at least in part, to make the determination of the location of the first party. The storage of this information can be any data storage location within the HESS System, such as the determination matrix discussed herein, a proximity matrix, or any alternative data storage location.

A second step determines, captures and stores location information related to a second party that is accessing the transaction environment for the executable transaction document. The capture and storage of the information regarding the second party can be made in manner similar to that described above for the first party in step one of the PV.

Using the stored location information for the first and second parties, in a third step, the PV can determine whether the parties are similarly located. This determination can be accomplished by accessing and comparing the stored IP address information for the parties. Where the IP address is similar the PV process, in a fourth step, can determine that this RSEE factor is not satisfied and store and make this information available to the RSEEM. Where the IP address is not similar the PV process, in a fifth step, can determine that this RSEE factor is satisfied and store and make this information available to the RSEEM. The RSEEM, by accessing this information for use during its confirmation process can then confirm that this requirement is or is not satisfied and then determine whether the PV process has or has not been satisfied. This conclusive PV determination by the RSEEM directs, at least in part, whether an RSEE can be established or will be prohibited from establishment for the executable transaction document.

The location information captured and stored in the first and second steps of the PV can be used in the performance of additional PV steps. For instance, where it is determined that the IP address information is not similar for the parties, another PV step can determine whether the IP address information satisfies a predetermined party distance or degree of proximity requirement. The distance between parties to a transaction may vary significantly and still satisfy this RSEE factor and thereby contribute to the establishment of an RSEE, including all functional features of the HESS Software, and allow for the execution of a transaction document.

It is contemplated that the PV can make a determination of whether the distance between two party's locations satisfies a defined allowable distance, such as within a range of distance tolerance. For instance, the distance of separation between two parties may be determined to within an accuracy of plus or minus so many feet, yards, meters, kilometers, miles, etc., and still satisfy the proximity requirement. It is contemplated that the party distance requirement can include distance ranges measured in any standard unit of distance as desired for a particular implementation of the current invention. Therefore, it is contemplated that the predetermined required distance between parties or degree of proximity requirement can be established as (i) greater than 500 feet; (ii) greater than 500 yards or meters; (iii) greater than 1 kilometer; (iv) greater than 1 mile; and such other distance intervals as may be determined satisfactory. The current invention may configure its proximity requirements at any interval distances, such as greater than 10 feet, greater than 20 feet, etc. This degree of proximity or distance requirement can be customized for each transaction or established on a system-wide basis.

Alternative or additional techniques may be employed to establish whether the party proximity has been determined satisfied by the PV in conformance with this RSEE factor required for establishing an RSEE. These techniques can be identified as secondary, tertiary, alternative or additional verification techniques. An example of a secondary technique that may be employed individually or in combination with those described above can include a system interface that requires input by a user. The user input can be of information related to their location, such as a physical address, city, state, zip code, country, location coordinates, and the like. The input information asked for can include a certification statement wherein the user is required to perform an act that provides confirmation of their location from which they are accessing the HESS System. It is contemplated that the act required from the user can be the act of executing a signature block, such as any one of the HESS blocks, "toggle" forms of signature blocks or initials block as disclosed herein, wherein the signature block is associated and establishes a user's agreement to a pre-defined certification statement validating that the user's access to an executable transaction document is being made from their stated location. It can be the case that a secondary PV may include a comparison of information captured from a user computing device of a current session against such similar data captured and stored for a user computing device from a previous user session. Further, verification techniques can be employed using other unique identifiers that are manually or automatically transmitted from a user computing device in a first session to a networked system storage location, such as the memory of the computing device hosting the HESS Software, and then used in performing a comparison against unique identifiers captured for a later session. Alternatively, it is contemplated that a location validation technique can be implemented that executes automatically or can be manually initiated and can subject any location information provided to independent validation.

A manual PV process can include one, all or any combination of the following operational steps performed by one or more users or parties that is accessing or attempting to access a transaction environment: inputting location information; inputting IP Address information regarding the user's networked computing device, initiating the determination of the similarity of the captured location information; initiating a comparison of the captured location information against an established closing location and/or a determined or captured location of an additional user and/or additional user's networked computing device; and initiating the determination of whether the captured physical location information satisfies the distance requirements for this RSEE factor. Such user input can contribute to the establishment, maintenance, and/or access to an RSEE for an executable transaction document.

All the above techniques may be employed in any manner, such as in a serial or parallel manner, independent from or in combination with those disclosed above or any alternative techniques for accomplishing the PV.

The contemplated determination or proximity matrix, similar to the PPLV and/or MDV matrix, is a data storage location within the HESS System. Information related to the PV process can be stored and retrieved from this location in support of the performance of the PV processes, other RSEEM executed processes and/or other system functions within an established transaction environment, including an RSEE. This matrix can be variously configured to provide the information for performing process determinations and/or confirmations, such as determining whether proximity requirements are being met by a user's and/or a user's networked computing device location in comparison to closing location information, other user locations, and/or user's networked computing device location information.

The proximity matrix, and the PPLV and/or MDV matrices, can be entirely or partially populated by accessed, gathered, captured, determined and/or validated information. The matrix can include pre-defined transaction information. The timing of the entry of information into the various matrices, including the proximity matrix, can be pre-determined, vary and/or coincide with the performance of various techniques, processes and/or other functional capabilities provided by the current invention.

The proximity matrix can include information regarding the physical location of a pre-determined closing location for a transaction, along with the other information as indicated above. Thus, a HESS System can implement or be implemented with one or more pre-determined closing locations. A closing location can be generally recognized as any physical location at which any networked computer in the HESS System transaction network is located and may be used for accomplishing the performance of a transaction, which can include the execution of executable transaction documents. For many service-based transactions, a closing location may be hosted by the signatory(ies), person(s) or entity(ies) that will be receiving the service, but the closing location can be variously established.

Where a transaction is being handled over a HESS System, in order for the parties to fully execute an executable transaction document, they must satisfy all configured or determined (selected) requirements for establishing and maintaining an RSEE for the executable transaction document. In exemplary embodiments, it is while the document is established within the RSEE that the obtainment (i.e., capture and application) of the signatories handwritten signatures within their designated signature blocks (e.g., HESS Blocks) occurs.

For the RSEEM to initiate an RSEE establishment package, the RSEEM first makes the determination or is provided the determination that the executable document is in execution ready form. This can be accomplished in accordance with an aspect of the description provided above regarding the process employed by the RSEEM for making this initial determination. Where the executable transaction document is determined to be in execution ready form, this information can be stored for later retrieval and use or employed immediately by the RSEEM for proceeding with an initiation of an RSEE establishment package. Upon the initiation of the RSEE establishment package the required RSEE verification processes (PPLV, MDV and PV processes), determine whether the required RSEE factors that have been configured for each of these processes have been satisfied. Then the RSEEM can determine whether all processes of the RSEE establishment package have been satisfied, thereby confirming whether all required RSEE factors have been determined satisfied. Where the RSEEM determines that all RSEE verification processes have been satisfied, the RSEEM can determine to and establish the executable transaction document within an RSEE. Where the RSEEM determines that not all RSEE verification processes have been satisfied, the RSEEM can determine to and prohibit the establishment of the executable transaction document within an RSEE.

By way of example, a contemplated service transaction can include a first and a second buyer (signatories) and seller (signatory) agreeing to a terms of service contract which can be an electronic document generated by the parties within a first transaction environment, using the document processing capabilities provided via the website engine and document management engine, and thereby establish an executable transaction document. The executable transaction document is established and accessed by all parties within the first transaction environment and document processing can occur until an execution ready form of the document is arrived at. It is contemplated that one or both of the buyers may be located in the same physical location or remotely located relative to one another. In addition, the seller may be located in the same physical location as one of the two buyers.

The HESS system can establish a location for completing a transaction, commonly referred to herein as a closing location. For the current example, both the buyers and seller may each be located at pre-defined, system designated locations (e.g., the "closing location") for accessing the transaction environments established for the generation and completion of the executable transaction document. It is contemplated that two or more closing locations can be established as part of a HESS System. Each closing location can include one or multiple computers enabling one or more users to perform various acts of execution for various transaction documents. It is contemplated that one or more of the computers can be a mobile computing device. The system established closing location(s) can be neutral to a buyer, seller, or other parties associated with a transaction. The system can determine that the parties may meet at or independently visit a closing location to electronically execute transaction documents and perform other duties associated with a transaction.

In the current example, the first buyer and the seller can be physically located together at a designated first closing location and the second buyer may be located at a designated second closing location (e.g., the "remote location"). The second closing location being some distance from or remote to the first closing location and the first buyer and seller. The distance established by the system for the first and second closing locations being some amount that can satisfy or at least support the satisfaction of a proximity requirement RSEE factor.

The first and second designated closing locations, as indicated, are pre-defined locations specified by the HESS System implementation in accordance with and designed to meet any and all proximity requirements that have been established for the transaction environment provided. These closing locations can therefore support an RSEE factor determination by the PV process that at least one signatory (the second buyer) is remote from at least one other signatory (the first buyer and seller). Thus, the PV process can determine this RSEE factor satisfied and this determination can be used by the RSEEM to determine, at least in part, whether to establish an executable transaction document within an RSEE.

The at least one first buyer may use a desktop computer located at the first closing location and networked within the HESS system to access the executable transaction document established within the first transaction environment. Also located at the first closing location, the seller may use a mobile, tablet computer, which is wirelessly networked within the HESS system, to access the executable transaction document established within the first transaction environment. Both the first buyer and seller can access the executable transaction document, via the first transaction environment, at the same time, a similar time or different times. As indicated, the second buyer is located at the designated second closing location which is remote from the first closing location and can use any type of computing device that is or can be networked within the HESS System to access the first transaction environment within which the executable transaction document is established. The second buyer can access the first transaction environment at the same or a similar time as the first buyer or seller, thereby, making concurrent access with the other signatories to the first transaction environment and the executable transaction document established therein.

Any computer with network accessibility and signature capture capabilities may be used by the signatories to access and execute transaction documents established within transaction environments hosted by a HESS System. Thus, the system can enable remote closings that allow signatories, such as the second buyer in this example, to concurrently access and simultaneously execute transaction documents from a distinct physical location that is remote from the first buyer and the seller. Parties to a transaction may utilize any networked mobile or non-mobile computing device, enabled with signature capture capabilities, such as that provided through use of a signature capture device as identified above, to perform necessary functions including the execution of the transaction document.

It is further understood that at least one, any or all of the parties may use networked mobile computing devices to access transaction environments and perform their necessary functions, including the execution of a transaction document. Furthermore, where remote closing is desired from a location that does not include a signature capture device any of the parties to the transaction or any independent third-party may send a representative to the remote location with a signature capture device that may then be used to capture an electronic representation of the document executor's signature.

It is contemplated that the first and second closing locations can further promote satisfaction of the concurrent access requirement (RSEE factor) for establishing an executable transaction document in an RSEE. For instance, at a specified time on a specified day, the transaction documents that have been prepared for the parties' signatures may be displayed to the parties on the respective displays associated with computers at the first and second closing locations. Still further, the system may promote the satisfaction of any and all other transaction requirements and performance capabilities, including but not limited to the real-time, simultaneous obtainment of handwritten signatures from required signatories. Alternatively, the parties at the first and second closing locations may perform various acts of execution and their execution duties independently and at different times.

When any or all of the signatory parties access the first transaction environment established with the execution ready form of the executable transaction document the RSEEM can operate to initiate an RSEE establishment package. The package can initiate the execution of the following processes: (i) PPLV; (ii) MDV; and (iii) PV. As described previously, the initiation of this package may be dependent on an automated determination being made by the RSEEM or a manual determination provided by user input that the executable transaction document is in an execution ready form. Therefore, this execution ready form determination can occur prior to the initiation and/or execution of the establishment package processes.

The PPLV performs a determination of whether the executable transaction document requires a plurality of signatories and that a plurality of signatories are concurrently accessing the transaction environment within which the document is established. In accordance with the process descriptions provided herein, the executable transaction document requires execution by three signatories and therefore, we will assume that this verification process can determine satisfied this required RSEE factor of the PPLV process. The other RSEE factor required to be determined satisfied by the PPLV is that concurrent access is being made by a plurality of signatories. This can be established by any one of the following access scenarios: (i) the seller and first buyer; (ii) the seller and second buyer; or (iii) the first buyer and second buyer. For the current example, we will assume that the seller and second buyer are determined to be concurrently accessing the document and therefore, this RSEE factor can be determined satisfied. As described, satisfaction of the PPLV processes can be promoted through the assignment and use of individual or composite URLs, which may or may not included additional appended information, for each party to the transaction. This determination is stored in a system memory location, such as the determination or PPLV matrix as described above.

The MDV performs a determination of whether at least one of the concurrently accessing signatories is accessing the document using a mobile computing device. From the current example, we have indicated that the seller, who has been determined to be concurrently accessing the document with the second buyer, is using a mobile computing device to access the first transaction environment within which the executable transaction document is established. Thus, the MDV can determine that the seller is using a mobile device and therefore satisfies the RSEE factor that requires at least one of the concurrently accessing signatories access the document via the use of a mobile computing device. This MDV determination is stored in a system memory location, such as the determination or MDV matrix as described above.

The PV performs the RSEE factor determination of whether at least one of the concurrently accessing signatories is physically remote from at least one of the other concurrently accessing signatories. From the current example, the PV can determine that the seller is accessing the document from the first closing location and confirms the position of this closing location. The PV can then determine that the second buyer is accessing the document from the second closing location. The PV can confirm the position of the second closing location. The PV can use the confirmed location information regarding the first and second closing locations to make the determination regarding whether the proximity requirement of this RSEE factor is satisfied. From our current description, the seller at the first closing location and the second buyer at the second closing location establishes these signatories in positions remote from one another and can be determined to satisfy this RSEE factor. The PV determination information can be stored in a system memory location, such as the determination or PV matrix as described above.

The RSEEM executes to determine and/or confirm the determinations reached by the various RSEE verification processes performed for the RSEE establishment package. The RSEEM can use the information stored regarding the results determined for each of the RSEE factors by the RSEE verification processes to make the conclusive determinations of whether each RSEE verification process of the establishment package has been satisfied. The conclusive determination reached for the RSEE verification process then allows the RSEEM to determine whether to establish an RSEE for the executable transaction document. In the current example, the RSEEM can determine all RSEE verification processes, and therefore all RSEE factors, satisfied and allow the establishment and establish the executable transaction document within an RSEE.

The current invention can store and access information related to various process steps and/or determinations in any number of different memory locations. As described, each of the verification processes and the determinations made can be stored in the individual storage matrices. Alternatively, the verification processes and the individual determinations made can be stored in a single memory location, commonly referred to herein as the determination matrix, which can be used by the system for the performance of various techniques, processes and/or executable instruction steps. For instance, it is contemplated that the determination matrix can store all information related to the determinations, validations and/or confirmations executed and reached by the RSEEM. This can include determinations made by the RSEE packages, including any and all RSEE factor satisfaction determinations made by the RSEE verification processes of the RSEE packages and executable instructions for the process steps to be performed in reaching the determinations.

Preferably, the RSEE allows the concurrently accessing signatories to execute the transaction document through the simultaneous obtainment of the handwritten signatures from each of the accessing signatories. Thus, for the current example, the seller and second buyer are enabled to simultaneously execute the document in real-time, from different physical locations, wherein a mobile device is used for obtaining the seller's signature. The executed transaction document can be stored, including the handwritten signatures from each of the signatory parties identified above, at a system memory location. It is contemplated that the first buyer may concurrently access the RSEE and be enabled to simultaneously or substantially simultaneously execute the executable transaction document established therein with the seller and second buyer. Alternatively, the obtainment of the handwritten signature from the first buyer may be enabled via a later established RSEE or in a transaction environment outside the established RSEE.

As described previously, various user capabilities and interactions can be enabled within the RSEE established for an executable transaction document. For instance, the seller and second buyer that are concurrently accessing the executable transaction document within the established RSEE can be allowed to review the document and/or modify the document before executing it.

As a further variation of capabilities provided by the current invention, it is recognized that an RSEE can be established and document execution accomplished when not all parties with a role in a transaction have access to an individual computer. For instance, from the above example, the first buyer may not have an individual computer from which they may access the HESS System and the executable transaction document. The first buyer may utilize a computer that has been established at the first closing location, such as the one configured for and being used by the seller. Within the RSEE established for the document, as described above, the first buyer may only be enabled to perform their execution of the document and not be enabled with other capabilities. Although such a buyer may not realize many of the benefits described herein, the buyer may still benefit from an improved closing experience where their electronic execution of a transaction document(s) is enabled using the computer associated with closing location. Additionally, the first buyer may be allowed to access and execute the transaction document within the RSEE from a second computing device established at the first closing location. It is contemplated that the HESS System, in such a scenario, may only allow the first buyer to execute the document. This act of execution may occur simultaneously with or separately from the execution by the seller and second buyer. The HESS System may enable the first buyer to perform various acts from the second computing device, but not be part of the verification processes for establishing and/or maintaining the RSEE for the transaction document. It shall be understood that the capabilities described and enabled by the current invention, are contemplated for and applicable to any transaction environment including any number of users and/or signatory parties and any number of transaction documents.

As can be seen from the different transaction scenarios contemplated and described, the establishment of a transaction document within an RSEE can be accomplished based on RSEE establishment parameters that do not require determinations based on all signatories to a document. From the above, the RSEE can be established and maintained to allow execution by two (seller and second buyer) of the three signatory parties. The third signatory party, the first buyer in the current example, can be allowed to execute the document at a later time using the same or a different computing device as that used by the seller. Thus, in an alternative embodiment, an executable transaction document may be partially executed within an established and maintained first RSEE, wherein all requirements for establishing and/or maintaining the executable transaction document within the RSEE have been met. Additional acts of execution, by other signatories, can occur within a second RSEE or alternative transaction environment established for the executable transaction document. The establishment and/or maintenance of the second RSEE may not be subject to the same or any RSEE verification processes for an RSEE establishment or maintenance package. Therefore, it is contemplated that the obtainment of a handwritten signature for an executable transaction document from a required signatory can occur in various transaction environments and at various times during the performance of a transaction, so long as the first two or more handwritten signatures that are obtained for the executable transaction document occur simultaneously, in real-time within an RSEE. From above, the obtainment of the handwritten signature from the first buyer may occur within a second RSEE or a transaction environment outside an RSEE and may occur at any time after the original RSEE for the executable transaction document has been closed.

By way of further example, an executable transaction document can require execution by four (4) parties, Party A, Party B, Party C and Party D. The executable transaction document can be established within a first RSEE, for execution by Party A and Party B. These parties being required to satisfy and satisfying all RSEE factors for establishing and maintaining the first RSEE and performance of their execution duties. After these parties complete their execution by obtainment of their handwritten signatures to the document, this partially executed version of the document is stored and the first RSEE can expire or be terminated. At a later time, a second RSEE or alternative transaction environment may be established for execution of the stored, partially executed document by Party C and Party D. The establishment and maintenance of this second RSEE for the partially executed document can be allowed to occur with or without a determination of satisfaction for any RSEE factors of an RSEE establishment package. Party C and Party D can perform their required acts of execution, such as performing their handwritten signatures, which can be obtained within the document and thereby establish a fully executed transaction document.

The determination of whether an executable transaction document has been fully executed and a completed transaction document arrived at can be made by the RSEEM of the RSEE engine 725*b*. In the alternative, the website management engine 725*a* and/or document management engine 725*c* can be configured to perform this determination. The RSEEM can determine, while the executable transaction document is established within an RSEE, whether the transaction document has been fully executed by the obtainment of the handwritten signatures from each of the signatories required to execute the transaction document. When all required signatures have been captured and applied, the RSEEM can designate the document as "executed", and expire or close the established RSEE for the transaction document. This RSEE expiration can prohibit further access to the document and store the document within a system memory location.

It is contemplated that the determination of whether an executable transaction document has been fully executed can occur while the document is established in a transaction environment outside an RSEE. As indicated above, the HESS System can accomplish transactions whose completion of all acts of execution by the required signatories can occur in various transaction environments. For example, where obtainment of partial execution of a document occurs within an RSEE and additional acts of execution are obtained in transaction environments outside the RSEE, the RSEEM or other engines of the HESS Software can interface with the non-RSEE transaction environment to determine when the full execution of the document has been arrived at and a completed document established.

Upon a determination that an executable transaction document has been fully executed an RSEE PET process, in particular an expiration process, can execute to close the RSEE via expiration. It is further contemplated that upon RSEE expiration based on the determination that the document is fully executed the transaction can be determined completed and all transaction environments established for the transaction can be closed. This transaction closure can enable the HESS System to prohibit the establishment of the transaction documents within any transaction environment that allows any type of document processing, such as editing, and/or the performance of any acts of execution. However, the HESS System can provide a transaction environment that allows access to and retrieval of the transaction documents, including executed transaction document(s), for purposes other than document processing.

It is contemplated that a fully executed transaction document can be stored at a system memory location that is similar to or different from the memory location used for the performance of the transaction. For instance, the performance of the transaction may utilize a determination matrix system memory location. Upon the completion of execution of the transaction document, the fully executed document may be stored in a system memory location established separately from the determination matrix and/or in a separate data storage location, such as database 715 of system 700 (FIG. 7). It is contemplated that the storage location provided and/or made accessible via a HESS System may be configured to improve system performance and thereby improve the user experience within a system of the current invention for the performance of a transaction.

For an RSEEV maintenance package, required RSEE factors are determined satisfied by the exemplary RSEEV processes that can be configured, in embodiments of the current invention, as the RSEEV maintenance package: (i) Maintenance Timing Verification process (MTV); (ii) Maintenance User Interaction Verification process (MUIV); (iii) Maintenance Plurality of Signatory Verification process (MPSV).

Transaction management capabilities provided by the current invention can include one or more time limitations or restrictions. In operation, the maintenance of an executable transaction document within an established RSEE can be determined, in part, by a Maintenance Timing Verification process (MTV). The MTV determines whether an established RSEE for an executable transaction document has exceeded a predetermined time period for its maintenance. As indicated above regarding the RSEEM customization capabilities, alternative configurations for the RSEEM and the RSEEV maintenance package may or may not include the MTV or one or more of the RSEE verification packages and/or processes as identified and as may be contemplated for inclusion therein, and therefore, no maintenance timing requirement may be required to be verified in order to maintain an RSEE.

In accordance with requirement(s) of an MTV process the RSEE may only be maintained for a pre-defined time period upon its establishment. This time period is referred to herein as the RSEE maintenance period. Thus, signatories to a transaction document may only be enabled to execute the documents within a narrow window of time from the establishment of the document within the RSEE, thereby providing a mechanism for promoting a simultaneous, real-time execution of a transaction document. The simultaneous execution of a transaction document can be understood as the simultaneous capture and/or application of handwritten signatures from the plurality of signatories for whom the executable transaction document was established within the RSEE. Therefore, the RSEE maintenance period, which is an amount of time that the execution ready form of the transaction document is maintained in the RSEE and therefore capable of execution by the plurality of signatories, can be defined and limited to seconds, minutes, and hours. It shall be understood that any specific time designation and/or interval of time is contemplated for use by the current invention.

In exemplary embodiments, the RSEE maintenance period for an established RSEE can be defined as a ten (10) second window, fifteen (15) second window, twenty (20) second window, twenty-five (25) second window, thirty (30) second window; and the like. Additionally, it can be defined as a five (5) minute window, ten (10) minute window, fifteen (15) minute window, twenty (20) minute window, twenty-five (25) minute window, thirty (30) minute window; and the like.

The current invention can establish and apply a transaction clock mechanism or some other form of time monitoring mechanism that tracks the progress of time in relation to an established RSEE for an executable transaction document. This timing mechanism can establish an RSEE start time based on the time the RSEE was established or such other basis as may be determined and used. The RSEE start time, or other determined start time, can be the basis or point of reference for all time measurements made for the MTV or any other RSEEV processes for any of the RSEEV packages.

The MTV can, in a first step, establish and store a start time for an established RSEE. In a second step, the MTV can track or monitor the passage of time for which an established RSEE provides the display of and allows user interaction with an executable transaction document. The enabled user interaction provided within the RSEE can include, without limitation, the capture and/or application of an act of execution from a signatory within a signature block included within the established transaction document. A third step compares the amount of time for which the RSEE has been established against an RSEE maintenance period and determines if the established RSEE has exceeded the RSEE maintenance period. Where it is determined that the RSEE maintenance period has not been exceeded, this can be used by the RSEEM as part of a determination to allow the established RSEE to continue. Where it is determined that the RSEE maintenance period has been exceeded, this can be used by the RSEEM as part of a determination to terminate the established RSEE.

Alternatively, at this point, the RSEEM, via the MTV, can display a user interaction prompt, such as a pop-up window, that asks for input from a user as part of a process for determining whether to maintain the established RSEE. User input can be required by the process in order to continue maintaining the currently established RSEE. For instance, a user can be prompted through a pop-up window to indicate, via a yes or no input, whether they are still viewing the displayed document or wish to continue interacting with the displayed document at this time. Upon a yes indication input, the RSEEM can reset the RSEE start time to the time the user input was provided and the MTV can perform the steps of its process again based on this new RSEE start time. Where the user provides a no input or fails to provide input, this MTV determination can be used by the RSEEM to terminate the established RSEE.

It is further contemplated that a particular RSEE maintenance period can be established for each transaction document that is required to be executed. Thus, where multiple transaction documents are required to be executed for the completion of a transaction, each document can be established with an RSEE maintenance period. For instance, a particular transaction may require the execution of two separate transaction documents. The RSEE can be established to provide a first transaction document with a forty-five (45) second RSEE maintenance period and a second transaction document can have an RSEE maintenance period of five (5) minutes. It can be understood that the first RSEE is the 'primary' RSEE, wherein the RSEE establishment satisfies all required RSEE factors and the real-time, simultaneous obtainment of handwritten signatures from a plurality of signatories must occur. Thus, the maintenance period for the first transaction document established in the RSEE can be set at an interval of time that may support this transaction performance requirement. It is contemplated that where the performance of required acts of execution for the first transaction document in the RSEE are satisfied, the RSEE can 'expire' or 'close' for that transaction document. In such a circumstance, as has been described herein, the first transaction document can be stored in a system memory location and/or established in an alternative transaction environment that is outside the RSEE. Upon 'closure' of the first transaction document from the RSEE, the second transaction document can be established in the RSEE. The establishment of the RSEE for the second transaction document and/or the performance and obtainment of required acts of execution within the second transaction document can be required to occur in satisfaction of similar of different RSEE Factor requirements as that required for the first transaction document. Alternatively, the establishment and accomplishment of execution of the second transaction document within the RSEE may not be subject to any RSEE Factor requirements.

As will be discussed further in reference to an RSEE PET process herein below, the expiration of the RSEE maintenance period can result in the expiration and closure of the RSEE for the transaction document(s) for which it was established. Where RSEE expiration is based on the determination that multiple transaction documents have been fully executed the transaction can be determined completed and the entire transaction environment can be closed. This transaction closure can enable the prohibition of the establishment of any of the transaction documents within any transaction environment that allows any type of document processing, such as editing and amending. The expiration or closure of the RSEE and/or transaction can prohibit the performance and obtainment of additional acts of execution for the transaction document(s) by the signatories. However, even upon expiration or closure of an RSEE or transaction for a transaction document(s) the HESS System can provide a transaction environment that allows access to and retrieval of the transaction document(s), including executed transaction document(s), for purposes other than document processing.

The transaction management capabilities for maintaining an established RSEE can include required user interactions. In operation, the maintenance of an executable transaction document within an established RSEE can be determined, in part, by a Maintenance User Interaction Verification process (MUIV). The MUIV determines whether one or more required user maintenance interactions within the currently established RSEE have been performed.

These user interactions occur during the RSEE for an executable transaction document(s) and may be referred to as RSEE user interactions. For instance, a prompt, such as a separate pop-up window, may appear during the RSEE maintenance period, which requires input from the user to verify that they are currently viewing the RSEE for an executable transaction document. The required user input can be a "click here" box, or any such other feature as may be contemplated, that captures information from the user. Where the user provides input, and the input is the selection of an appropriately designated response option, the results can be the closing of the pop-up window and maintaining of the executable transaction document within the established RSEE. In the alternative, user input may indicate a selection of a designated response option that results in the closing of the pop-up window and closing of the RSEE. It is further contemplated that where a user is prompted for a response and fails to provide any response this may result in the closure of the RSEE.

The timing for the appearance of these RSEE user interactions may be based on and employ the timing mechanism discussed above for the MTV. It is contemplated that the user interactions may by configured to appear once or repeatedly during an established RSEE and be based on any single or repeated measure of any unit of time. For instance, a user interaction "window" may appear after the expiration of one (1) minute, two (2) minutes, and the like from an established RSEE start time. Any unit or measure of time may be employed by the current invention for accomplishing RSEE user interactions.

The user prompts, whether as a pop-up window or other information display feature, can include instructions regarding document execution, document status information, or any other information as may be desired to be provided regarding a transaction, transaction environments, transaction documents and/or parties to the transaction. These RSEE user interactions can provide an indirect, manual verification process, as configured for an RSEE engine, of a user's current status regarding a particular transaction document, status regarding one or more transaction environments for a transaction, or simply be provided for informational purposes.

Regardless of the purpose served by the RSEE user interaction feature, it is contemplated to be a temporary display within the RSEE for a transaction document. During a user prompt display one, all or any combination of functional capabilities provided a user within the RSEE can be temporarily suspended. This temporary suspension can be terminated, and full functional capabilities restored, upon the user performing the action asked for by the user prompt. Alternatively, during a displayed RSEE user interaction feature, none or some of a user's functional capabilities within the RSEE may be suspended. The temporary nature of the display provided by user prompts, in any form and for any purpose, can be universal for a HESS System and the management of all transactions and/or capable of customization for particular transactions and/or transaction environments.

In operation, upon the establishment of an executable transaction document within an RSEE, the MUIV can perform a first step of establishing an RSEE start time using any form of timing mechanism, which can be similar or different from the one discussed above for the MTV. The MUIV, based on a determined timing factor, can display an RSEE user interaction to one or more of the parties and/or signatories currently accessing the document within the established RSEE. The displayed RSEE user interaction requires input from the user. In exemplary operation, the required input is a selection of a option from a menu of options. The menu of options may be only two options, such as "yes" or "no", or include any number of selectable options. The RSEE can be terminated or determined as selected for termination upon user input of the selection of an option that indicates the user does not wish to continue interacting with the established document in the RSEE. Where the user does not provide any input, such as fails to select any option presented, this can be understood to not satisfy the requirement(s) of the RSEE user interaction, the MUIV can then determine this failure and this information can be used by the RSEEM as part of a determination whether to terminate the established RSEE. Where the user input received is the selection of an option indicating the user's desire to continue interacting with the RSEE and established transaction document therein, it can be determined that the user input does satisfy the requirement(s) of the displayed RSEE user interaction and the MUIV can then determine this satisfaction. This MUIV determination can be used by the RSEEM as part of a determination of whether to allow the established RSEE to continue.

Upon an RSEE termination based on the determination that one or multiple user interactions for one or multiple transaction documents have not been satisfactorily performed the executable transaction document can be stored in system memory location or established in one or more transaction environments outside the established RSEEs. The transaction environments may or may not allow any type of transaction and/or document processing, such as enabling another determination whether to establish the executable transaction documents within another RSEE.

In operation, the maintenance of an established RSEE can be determined, in part, by a Maintenance Plurality of Signatory Verification process (MPSV). The MPSV determines RSEE factor satisfaction of whether at least one of the plurality of signatories that established the current RSEE is (i) still accessing the RSEE; (ii) still accessing the document via a mobile device; and/or (iii) physically remote from at least one other of the remaining signatories.

The first MPSV process determines satisfaction of whether at least one of the plurality of signatories that established the current RSEE is still accessing the document within the RSEE and can include a first step of determining the "establishing signatories", who are the signatories that were determined as concurrently accessing the executable transaction document within the transaction environment outside the RSEE in order to determine whether to establish the RSEE. This determination can be made by using information, such as an assigned URL or appended information included with the URL assigned a party or parties or gathered and stored in the performance of other processes and used to accomplish other determinations. In a second step, a determination can be made of the "accessing signatories", who are the signatories currently accessing the document within the RSEE. This determination can be reached by verifying the URL or appended information to the URL as assigned and used by each party or parties to access the transaction environment within which the transaction document is established. In a third step, a determination can be reached whether a plurality of signatories that established the RSEE are sill accessing the RSEE by comparison of the establishing signatories against the accessing signatories. This can occur through the use and comparison of assigned URLs to each party or parties. It is contemplated that various mechanisms and information pertaining to the parties can be used in order to reach one or more of these various determinations.

An MPSV determination that the establishing signatories are similar to the accessing signatories can be used by the RSEEM for determining whether to maintain and then maintaining the established RSEE. An MPSV determination that the establishing signatories are not similar to the accessing signatories can be used by the RSEEM for determining whether to maintain and then maintaining or terminating the established RSEE. A dissimilarity between the establishing and accessing signatories as determined by the MPSV can be used by the RSEEM for accomplishing various transaction environment purposes. In one instance, the RSEEM may determine that the established RSEE should terminate and then terminate the RSEE. In the alternative, the RSEEM may determine that this dissimilarity does not require termination and allow the established RSEE to continue.

Still another alternative may include the RSEEM initiating a secondary process that determines whether other parties are accessing the document within the RSEE. An exemplary secondary process can provide a satisfaction determination for this RSEE factor based on whether the accessing parties include one or more parties that have been assigned a particular user designation. For example, an MPSV may determine this RSEE factor satisfied if one or more of the accessing parties has been assigned a "transaction manager" designation. Then, where the MPSV determines that at least one party has this particular user designation, the RSEEM can determine whether to allow the established RSEE to continue. Thus, it is contemplated that this process, which is part of the MPSV package, can be alternatively configured to identify and determine that the accessing parties satisfy this RSEE factor even when no or less than all establishing signatories are still accessing the executable transaction document within the established RSEE.

The second MPSV process can determine satisfaction of whether at least one of the plurality of signatories that established the current RSEE is still accessing the document within the RSEE via a mobile device and can include a first step of determining the signatories that are still currently accessing the document within the RSEE. In a second step, the determination made by the MDV during RSEE establishment can be accessed to identify the signatory that satisfied the mobile access requirement. A comparison of the currently accessing signatories identified in the first step and the mobile access signatory identified in the second step can be performed in a third step and a determination of similarity can be made. As described above for the first MPSV process, the RSEEM can use the "similarity determination" made by this second process for its confirmation determination and then can determine whether to terminate the established RSEE or allow the established RSEE to continue.

The third MPSV process can determine the satisfaction of whether at least one of the plurality of signatories that established the current RSEE is still accessing the document from a remote location in comparison to at least one other signatory, and can include a first step of determining the signatories that are still accessing the document within the RSEE. In a second step, the determination made by the PV during RSEE establishment can be accessed to identify the signatory that satisfied the remote access requirement. A comparison of the accessing signatories identified in the first step and the remote access signatory identified in the second step can be performed in a third step and a determination of remoteness can be made. As described above for the first and second MPSV processes, the RSEEM can use the "remote determination" made by this third process for its confirmation determination and then can determine whether to terminate the established RSEE or allow the established RSEE to continue.

The various processes and configuration(s) established for the performance of an RSEE maintenance package can be similar in many ways to that described above for the RSEE establishment package. For instance, any of the above establishment and/or maintenance packages and processes can be established as an integral feature(s) of the RSEE engine and can be included within an RSEEM configuration. Alternatively, these features may be provided through an independent modular instantiation of the capability implemented within and upon any one of the various networked user devices or some other networked computing device, whether operated by a signatory or not, as may be contemplated. Also, the initiation of the execution of these establishment and/or maintenance packages and processes can be enabled to occur in an automated manner or based on user interactions that allow for manual initiation.

The MPSV package may or may not include any of the process steps identified herein. Therefore, maintenance of an established RSEE may or may not require determinations related to whether continued access to the transaction document by an establishing signatory is being made, whether at least one of the plurality of signatories that established the current RSEE is still accessing the document within the RSEE via a mobile device and/or whether continued mobile access to the transaction document may be needed in order to maintain an RSEE. In still further configurations for any verification processes of an MPSV package the RSEE factor requirements to be determined satisfied may vary and employ alternate determinations.

The data and information generated and/or collected for and by the performance of these maintenance verification processes can be stored in various memory locations networked within a HESS System. It is contemplated that each maintenance process have an associated and identified storage "matrix" location. The information in a matrix can support the performance of the particular maintenance process, RSEEM processes and/or other functions within an established transaction environment. The matrix can be entirely or partially populated by accessed, gathered, captured, defined, determined and/or validated information. The timing of the entry of information into the matrix can be pre-determined, vary and/or coincide with the performance of various techniques, processes and/or other functional capabilities provided by the current invention.

In embodiments, the performance of these maintenance processes can be automatically or manually initiated upon RSEE establishment or during an established RSEE for an executable transaction document. The determinations for any of these processes can be made concurrently or simultaneously with or prior to or after the performance of any other of the RSEE maintenance package or RSEE PET package RSEEV processes. It is contemplated that these determinations can be made at any time by the current invention including, without limitation, during: (i) access to an executable document; (ii) an RSEEM confirmation and/or determination; (iii) any point prior to during operational performance within an RSEE of the current invention; and (iv) any other time within a transaction environment as may be contemplated.

The RSEEM can employ various techniques and processes for providing confirmation determinations regarding the satisfaction determinations made by any or all of these processes. As described throughout, these RSEEM confirmation determinations are based on the information provided by the appropriate RSEE maintenance verification process determinations and then allow the RSEEM to manage an RSEE either by allowing an established RSEE to continue or terminating an established RSEE. It is contemplated that the RSEEM may require the performance of one or more of the maintenance processes and utilize one or more of their satisfaction determinations in performance of its confirmation techniques or processes that can result in continuation or termination of an established RSEE.

It is further contemplated that determination of the satisfaction of additional RSEE factors by additional RSEEV processes as may be configured for an RSEE engine, or RSEEM of an RSEE engine, may be required for the establishment and/or maintenance of an executable transaction document within an RSEE. These additional RSEE Factors may include, without limitation, the following: (i) at least one party to a transaction, which can include at least one of the concurrently accessing plurality of signatories, must have received an electronic communication from the HESS System providing them information that directs them to a web-based, transaction environment location through which an RSEE for an executable transaction document may be established; (ii) at least one other party to the transaction must concurrently access the transaction document with a plurality of signatories; and (iii) at least one other party, having a particular user designation, must concurrently access the transaction document with a plurality of signatories.

It is contemplated that these additional RSEE Factors can be determined satisfied by additional RSEEV processes that can include, without limitation, the following: (i) a Digital Communication Verification process (DCV); (ii) Other Party Verification process (OPV); and (iii) Party Designation Verification process (PDV).

In operation the DCV provides a satisfaction determination of whether at least one party to a transaction, which can include at least one of a plurality of parties concurrently accessing a transaction environment or concurrently accessing signatories in exemplary embodiments, accessing an executable transaction document in a transaction environment has been sent, via electronic communication, a URL and/or some form of "indicator", "link", "tag" or other mechanism that provides them a direction or pointer to a transaction environment of a hosted transaction and may also include a user's designation as to the user's role(s) in a transaction. It is contemplated that any HESS System user or party to a transaction being hosted by the HESS System may be sent an electronic communication. A transaction document, in any form, such as an executable transaction document may be established within the transaction environment to which the party is being directed by the provided link. It is contemplated that the transaction environment to which the link directs the party can be an RSEE or any transaction environment outside an RSEE, such as a preliminary transaction environment. These non-RSEE transaction environments can display or present various information and data related to a transaction, such as a user registration page, user log-in page, or such other web pages and transaction environments as may be established.

By way of example, the performance of the DCV can include the step of identifying parties that are concurrently accessing an executable transaction document in a transaction environment. In a second step the DCV can determine whether one of the concurrently accessing parties has received an electronic communication from the HESS System. This may be accomplished by comparing the identified concurrently accessing parties against a list of names, stored within the HESS System, to which the electronic communication of a "link", such as a URL, or other information has been made. The "link" providing web-address information that directs the party to the transaction environment within which the executable transaction document is established. It is contemplated that the current invention is enabled with sufficient techniques and processes (e.g., computer executable instruction sets contained within the RSEE engine or otherwise configured) to track and/or monitor the access point (e.g., assigned URL) which at least one party, including a signatory, to a transaction document uses or used to connect with the transaction being hosted by the HESS System. Where the DCV determination is satisfaction of this RSEE factor or that this RSEE Factor is not satisfied, the RSEEM can confirm these determinations and then use it for making the determination as to whether to establish, maintain or close an RSEE.

It is contemplated that the electronic communication(s) made by the HESS System can be based on assigned individual or composite URLs and any additional user designations for the parties to a transaction. For instance, a party and/or signatory designated as "transaction administrator" may be communicated a link directing them to a specific transaction environment, such as a dedicated "transaction administrator" transaction environment. Therefore, a HESS System configuration can be customized to include multiple transaction environments that allow user access based on assigned user designations. These transaction environments can be customized to include any type of information and present it in any format as may be contemplated.

In operation the OPV provides a satisfaction determination of whether at least one of the plurality of parties concurrently accessing an executable transaction document is not a signatory to the document. By way of example, the performance of the OPV can include a first step of identifying who the required signatories are for an executable transaction document. This information may be retrieved from the information gathered and stored in performance of the PPLV of an establishment package. In a second step the OPV can identify the parties that are concurrently accessing the executable transaction document. In a third step the OPV can determine whether one of these concurrently accessing parties is not a signatory to the executable transaction document by comparing the identified concurrently accessing parties against the names of required signatories. Where the OPV determination is satisfaction of this RSEE factor or that this RSEE Factor is not satisfied, the RSEEM can confirm these determinations and then use it for making the determination as to whether to establish, maintain or close the executable transaction document within an RSEE.

In operation the PDV provides a satisfaction determination of whether at least one of the parties and/or plurality of parties concurrently accessing a transaction document has a particular user designation. The particular user designation required can be any that have been configured for the HESS Software and System, such as any described previously and contemplated herein. By way of example, the performance of the PDV can include a first step of identifying a list of parties and user designations for a particular transaction, which can be stored within a memory location of a HESS System. In a second step the PDV can identify a required user designation for establishing a transaction document within an RSEE or other transaction environment employed in performing the transaction. The parties and user designations for a particular transaction may be determined and established by any party or parties with access to the HESS System and can be applied to a single, multiple or all transaction environments that are established for a transaction being managed by the HESS System. In a third step the PDV can identify the parties that are concurrently accessing the executable transaction document. Then, in a fourth step, the PDV can determine if at least one of the accessing parties has at least one of the required user designations. This can be accomplished by a comparison of the identified accessing parties, including their assigned user designations, against the list of required parties and required user designations, wherein the comparison can enable a determination of whether one or more of the accessing parties matches at least one required party and user designations. Where a match is found, this information can be used by the RSEEM for determining whether to establish and/or maintain an RSEE or alternative transaction environment for an executable transaction document. Where no match is found, this information can be used by the RSEEM for determining to prohibit the establishment of and/or close an RSEE or alternative transaction environment.

The DCV, OPV, PDV and/or any other additional RSEEV processes can be configured within an RSEE engine, including an RSEEM of an RSEE engine, for any of the RSEE packages, including those for the RSEEV establishment, maintenance and/or the PET packages. Therefore, it is contemplated that any additional RSEEV processes can execute in addition to those being executed in the performance of RSEE verification packages and, at least in part, provide a contribution to an RSEEM confirmation and determination process(es). This can promote and allow the customization of transaction environments provided for a particular transaction or for all transactions. It is further understood that such flexibility and user customization for transaction environments can apply to all aspects, features and functions provided by the current invention.

It is contemplated that the verification of any of the above identified additional RSEE Factors, and any other additional RSEE Factors identified herein and as may be contemplated for use by the current invention, can be included in an RSEEV establishment package, RSEEV maintenance package and/or RSEE PET package. Still further, any additional RSEE Factor determinations can be established and implemented through an independent modular instantiation of the capability implemented within and upon any one of the various networked user devices or some other networked computing device, whether operated by a signatory or not, as may be contemplated.

The data and information generated and/or collected for and by the performance of these verification processes can be stored in various locations within a HESS System, such as within the memory 716 of server 710 or the database 715 of system 700, as shown in FIG. 7. It is contemplated that a particular location may be established for each verification process and identified as a "matrix" in which the data storage and retrieval for the respective processes can occur. The information in a matrix can support the performance of the particular RSEE verification process, RSEEM processes and/or other functions within an established transaction environment, including an RSEE. The matrix can be variously configured to provide the information for performing process determinations and/or confirmations and can be entirely or partially populated by accessed, gathered, captured, defined, determined and/or validated information. The timing of the entry of information into the matrix can be pre-determined, vary and/or coincide with the performance of various techniques, processes and/or other functional capabilities provided by the current invention.

The initiation of the execution of any additional RSEE Factor determination processes can be enabled to occur in an automated manner or based on user interactions that provide for manual initiation. Therefore, the performance of these additional verification processes can be automatically or manually initiated upon establishment of a transaction environment, RSEE establishment or during an established RSEE for an executable transaction document. The determinations for any of these processes can be made concurrently or simultaneously with or prior to or after the performance of any other of the RSEEV package processes. It is contemplated that these determinations can be made at any time by the current invention including, without limitation, during: (i) access to a transaction document in any form; (ii) an RSEEM confirmation determination; (iii) any point prior to during operational performance within an RSEE of the current invention; and (iv) any other time within a transaction environment as may be contemplated.

The RSEEM can employ various techniques and processes for providing confirmation determinations regarding the satisfaction determinations made by any or all of these additional verification processes. As described throughout, these RSEEM confirmation determinations are based on the information provided by the appropriate RSEEV package process determinations and then allow the RSEEM to manage an RSEE either by allowing an RSEE to be established, an established RSEE to continue or terminating an established RSEE. It is contemplated that the RSEEM may require the performance of one or more of the additional verification processes and utilize one or more of their satisfaction determinations in performance of its confirmation techniques or processes that can result in the establishment, maintenance or termination of an RSEE. As indicated above regarding the RSEEM customization capabilities, alternative configurations for the RSEEM may not include some or any additional verification processes. Still further, an RSEE engine may or may not include the various processes indicated above or one or more of the processes identified and additional processes as may be contemplated for inclusion therein.

As described above, the current invention can configure the RSEE engine, via the RSEEM or otherwise, with various RSEEV process and/or techniques, which can collectively be referred to herein as an RSEEV prohibition, expiration or termination (PET) package. This package can include and execute one or a combination of several RSEEV processes that enable RSEE factor satisfaction determinations. These determinations can be used in conjunction with any other determinations being made and enable the performance of various capabilities by the RSEE engine. Therefore, any transaction environments, including an RSEE, can be subject to, without limitation, any one or combination of the following RSEEV PET package processes: (i) prohibition of RSEE establishment; (ii) expiration of an established RSEE; and/or (iii) termination of an established RSEE.

It is contemplated that the management capabilities configured for an RSEEV PET of an RSEEM can include one, some, all and/or any combination of RSEE factor RSEEV processes as have been identified for a configuration of an RSEEV establishment and/or maintenance package. This integration of processes can allow any RSEEV process to be established and configured to provide its RSEE factor satisfaction determination for two or more RSEEV packages. For instance, determinations made for an establishment package can be configured and included in a prohibition package and determinations made for a maintenance package can be configured and included in a termination package. This integration can provide an overlap in the utility of the determinations made by the various RSEEV package processes.

Contemplated additional RSEE Factors to be determined satisfied or not by an RSEEV package process established and configured for an RSEE PET can include, without limitation, any one or combination of the following: (i) all required handwritten signatures have been obtained from the plurality of required signatories to the executable transaction document(s); (ii) all required acts of execution by the plurality of signatories have been obtained; (iii) established RSEE exceeds maintenance period; (iv) an act of execution by other than an authorized signatory; (v) access to RSEE by other than an authorized party; (vi) editing of document by unauthorized party; (vii) determination by system and/or transaction manager; and (viii) such other RSEE Factors as may be contemplated and applied to a given transaction. An RSEEV process can be configured for making a satisfaction determination regarding any one or combination of these RSEE factors, which can be used for determining the prohibition, expiration or termination of an RSEE.

Where a determination is made to prohibit the establishment of a document in an RSEE, terminate an established RSEE or to allow an RSEE to expire, the transaction management provided by the current invention can enable various options. The execution or performance of any of these options can be automated or be initiated manually by one or more user interactions. The determination can be a comparative determination of current operational factors related to a transaction environment established by the system and RSEE Factors, such as comparing the current time period for an RSEE against an established RSEE maintenance period. Still further, other contemplated deterministic processes, tools, techniques and/or mechanisms can be employed by the current invention.

Where an executable transaction document is prohibited from being established in an RSEE, the transaction management can allow the document to remain established in a transaction environment that is preliminary to or outside an RSEE. Therefore, the document can remain established in its current transaction environment or be established in an alternative transaction environment to its previous transaction environment. A termination or expiration of an RSEE can result in the establishment of the document in an alternative transaction environment outside an RSEE. Any of these transaction environments that are outside an RSEE can enable the obtainment of various acts of execution or not allow the performance of any acts of execution for the document to be permitted. Further, these transaction environments can allow or restrict in any manner the document management functions provided by the current invention, such as editing, modifying, amending, or otherwise performing any act that changes the document from the form of the document that was established in any other transaction environment, including an RSEE.

Upon a prohibition, termination or expiration determination being reached, the document can be captured and stored by the system. It can be that the transaction environment in which the document was established is closed and document access is at least temporarily restricted in conjunction with the capture and storage of the document. Alternatively, the capture and storage of the document may be coincident with the establishment of the document in a transaction environment outside an RSEE. The storage location can be any system memory location, including any common and/or individual storage locations. The document storage can capture the documents "as-is", thereby storing a version of the document, and allow this version to be retrieved at a later time for further read/write access and/or obtainment of an act(s) of execution. The storage of the document can include a document designation that provides an indication of the form of the document that has been captured and stored. For example, the document designation can indicate the version of the stored document and/or provide an indication of whether, and by whom, one or more acts of execution have been performed.

The prohibition, termination or expiration of an RSEE can impact upon the entire transaction and associated transaction environments provided by the system. It can be that where any one of these determinations is made the system amends a transaction via its one or more associated transaction environments. Such an amendment(s) can include any options, from allowing a current transaction environment to remain established, to closing down a transaction environment, such as an RSEE, and establishing a second transaction environment, to closing down the entire transaction and any associated transaction environments. Therefore, it can be understood that customization can be made for the RSEE PET package regarding the outcomes provided and that this customization can be determined on a per-transaction environment basis, per-transaction basis or system-wide.

It is contemplated that decisions to terminate an RSEE can be made by system users and parties to a transaction(s) and a termination command submitted to the system. This enables transaction management to accommodate various circumstances, unforeseen or otherwise, arising during the course of a transaction process. For instance, one party may be discovered to be negotiating in "bad-faith" and as such, where such a determination is made, a system administrator, transaction manager or other party can be authorized to terminate an established transaction and/or associated transaction environment(s). Such act(s) of bad-faith are contemplated to include any type of misrepresentation, misappropriation, undue influence, duress, and the like as are known. The party to the transaction that has the authority to terminate may be provided one or more user interactions, including any form of user prompt, that allows them to enter a termination command and result in a termination of a transaction environment(s), including an RSEE.

In an exemplary aspect of the RSEE PET process, establishment of an RSEE can be prohibited. Execution of this aspect of the process can be initiated manually or automatically initiated by the current invention prior to RSEE establishment.

The determination whether to prohibit RSEE establishment can be based on similar RSEE factor determinations made by the RSEEV processes of an RSEE establishment package, including the following: (i) a plurality of signatories required for an executable transaction document(s); (ii) a plurality signatories are concurrently accessing the executable transaction document; (iii) at least one of the plurality of signatories is accessing the document via the use of a mobile computing device; or (iv) at least one of the plurality of signatories must be physically remote from at least one other signatory. In operation, where the RSEEM determination is that required RSEE factors, such as those above, for establishing an RSEE are not satisfied the RSEEM can initiate the process that prevents an RSEE from being established for an executable transaction document.

It is contemplated that the determination whether to prohibit RSEE establishment can be based on the additional RSEE factors previously identified, including without limitation, the following: (i) whether email communication has been made to at least one of a party to the transaction and/or the plurality of signatories, wherein the message at least includes a "link", such as a URL, for providing access to a transaction environment(s) and/or the transaction document(s); (ii) system administration authority provided; and/or (iii) satisfaction of an RSEE establishment period. It is further contemplated for additional exemplary embodiments of the current invention, that RSEE establishment can be prohibited based upon the determination of one or any combination of the above identified RSEE factors.

The RSEEV prohibition package can include RSEEV processes that make determinations related to one or more time limitations or restrictions. For instance, RSEE establishment may be contingent on meeting certain, pre-defined time restrictions. The determination of whether this RSEE factor is satisfied can be provided by an RSEEV process that is configured within an RSEE prohibition package. Applicable time restrictions can be defined and limited to seconds, minutes, hours, etc., and it shall be understood that any specific time designation is contemplated for use by the current invention. In operation, once a final version of an executable transaction document has been established an RSEE may be required to be established within a two (2) hour window of time. This window of time can be referred to herein as the RSEE establishment period. It is understood that all factors or requirements to be verified prior to RSEE establishment are therefore, required to be verified within the RSEE establishment period. Where the RSEEV process of the RSEE prohibition package determines that not all required RSEE factors are satisfied within the RSEE establishment period the RSEEM can be enabled to prohibit the establishment of an RSEE.

Where a transaction requires the management of multiple executable transaction documents, separate and distinct RSEE establishment periods can be assigned for each of the documents. The RSEEV process of the RSEE prohibition package that determines the satisfaction of the RSEE establishment period can provide multiple determinations, each of which can be used by the RSEEM to determine whether to prohibit the establishment of one or more RSEEs. For example, a particular transaction may require the execution of multiple documents, wherein each document requires a plurality of signatories and wherein each document requires execution by a plurality of signatories who are different from one another by at least one signatory. In order to promote the efficiency of completing the transaction, each executable transaction document may be given a separate RSEE establishment period. Thus, an RSEE establishment period for a first document can be one (1) hour, a second document two (2) hours, and a third document three (3) hours. Based on these RSEE establishment periods, the RSEEV process can execute to determine whether RSEE factors are satisfied and an RSEE can be established. In this serial manner, the RSEEM can manage RSEE prohibition and promote the efficient management of transaction documents and provide support for the real-time, simultaneous execution of transaction documents.

An RSEE PET process can be based on and/or include a user initiated (manual) RSEE prohibition request. This can enable any user or signatory to request the prohibition of the establishment of an RSEE by the HESS System. The authority of this request can be established based on a designation provided a user for performance of a transaction hosted by the HESS System. Therefore, a user or signatory may be enabled to unilaterally determine and effect the prohibition of the establishment of an RSEE for any one or multiple transaction documents. Alternatively, the user initiated RSEE prohibition request may require an indication of consent be provided by another user, party or signatory to the transaction and/or transaction document(s) for which an RSEE can be established. The manner in which this indication of consent can be provided may be similar to any of the manners for which a signature block can be provided by the current invention. It is further contemplated that such indications of consent may be required from all other users and/or required signatories to a transaction document.

In an exemplary aspect of the RSEE PET package an established RSEE can be expired. This expiration package can provide RSEEV processes that can be executed during an established RSEE. Execution of these verification processes can be initiated manually or automatically initiated by the current invention at any point during an established RSEE.

As described herein, the determination whether an established RSEE shall expire can be based on the determinations made during the performance of RSEEV processes configured for an RSEE maintenance package or otherwise configured. It is further contemplated that the expiration determination can be reached based on the satisfaction determination of additional RSEE factors that can include, without limitation, the following: (i) full or complete execution of the transaction document for which it was established; (ii) system administration authority provided; (iii) full or complete execution of multiple transaction documents for which it was established; and/or (iv) such other RSEE factors as may be contemplated and configured for the RSEE PET.

The complete or full execution of an executable transaction document(s) within an RSEE can require the simultaneous obtainment of a handwritten signature from each of the required signatories to the executable transaction document(s). In embodiments, an RSEEV process for an expiration package can verify that all required signatures, and any other acts of execution, for an executable transaction document have been obtained. This verification can be seen, and generally understood, in reference to step 670 of FIG. 6 and in accord with prior description provided in this specification. This verification can occur by a determination of the completion of the required acts of execution for the HESS Blocks, and any other signature blocks, established within the executable transaction document. Then the RSEEV process determinations can be confirmed by the RSEEM and a determination of whether to expire the established RSEE can be made. Based on this determination, the RSEEM can then maintain the RSEE or close the RSEE.

An RSEEV process for an expiration package can include a user initiated RSEE expiration request process. A user interaction configured for the transaction environment can enable any user to instruct the system to initiate the expiration of a currently established RSEE. The authority of this request can be established based on a user designation assigned to a user or based on a party being a signatory for performance of a transaction within the HESS System. Therefore, a user may be enabled to unilaterally determine and effect the expiration of a currently established RSEE. Alternatively, the user initiated RSEE expiration request may require an indication of consent be provided by another user, party or signatory to the transaction document(s) for which the RSEE was established. The manner in which this indication of consent can be provided may be similar to any of the manners for which a signature block can be provided by the current invention. It is further contemplated that such indications of consent may be required from all other users and/or required signatories to a transaction document.

In an exemplary aspect of the RSEE PET package, an established RSEE can be terminated. Any processes configured for a termination package can be initiated manually or automatically initiated by the current invention at any point during an established RSEE.

The RSEEV process determinations of whether an established RSEE shall be terminated can be based on RSEE factors including, without limitation, the following: (i) user designation and/or party authority to terminate; (ii) an act of execution by other than an authorized signatory; (iii) access to RSEE by other than an authorized party; (iv) manipulation of document by unauthorized party; and/or (vi) other contemplated RSEE factors as may be configured for the current invention.

Similar to that described above for an RSEEV expiration package, an RSEEV process for a termination package can include a user initiated RSEE termination request process. A user interaction configured for the transaction environment can enable any user and/or party to the transaction to instruct the system to terminate a currently established RSEE. Such a request can be made for various reasons, for instance, a user determination that the version of the transaction document for which the RSEE has been established is not accurate. The authority of this request can be established based on a user designation assigned to a user or based on a party being a signatory for performance of a transaction within the HESS System. For instance, a user designated as "transaction manager", "system administrator" or otherwise, may be enabled to unilaterally determine and effect the termination of a currently established RSEE. Therefore, a user, party or signatory may be enabled to unilaterally determine and effect the termination of a currently established RSEE. Alternatively, the user initiated RSEE termination request may require an indication of consent be provided by another user, party or signatory to the transaction document(s) for which the RSEE was established. The manner in which this indication of consent can be provided may be similar to any of the manners for which a signature block or other manner of user interaction, such as any form of user prompt, can be provided by the current invention. It is further contemplated that such indications of consent may be required from all other users, parties and/or required signatories to a transaction document.

Multiple RSEEV processes for a termination package can be generally referred to as the "unauthorized party" RSEEV processes related to a grouping of RSEE factors. As indicated above, these RSEE factors can include, without limitation, the following: (i) an act of execution by other than an authorized signatory; (ii) access to RSEE by other than an authorized party; (iii) manipulation of document by unauthorized party.

These "unauthorized party" RSEEV processes can have certain aspects in common. For instance, they can all verify the identity of a party that is accessing or attempting to access an RSEE transaction environment. This verification can include identifying any user designations, authorities, permissions, and the like, assigned to the user, party or signatory. They can each determine what act a user and/or signatory is attempting to perform and whether they are authorized to perform it. Where the act of performance being made by the user and/or signatory is determined to be an act of execution, the process can determine whether this is an authorized act by the party and/or signatory. Where the act being made by the user and/or signatory is determined to be an attempt to access a transaction environment, including an RSEE, the RSEEV process can determine whether the party has the authority to access the transaction environment. Where the party is attempting to access an RSEE, it can be determined whether they are authorized to access an RSEE and the particular RSEE to which access is being attempted. Where the act being made by the user and/or signatory is determined to be an attempt to manipulate a document within a transaction environment, including an RSEE, the RSEEV process can further determine whether this is an authorized act by the party and/or signatory. The act of manipulation can be any attempt to edit, amend, modify or otherwise change a document that has been established within a transaction environment.

The determination made by each of these RSEEV processes can be used by the RSEEM to make the determination whether to terminate an RSEE. Where the RSEEM determines, based on the RSEEV process determination(s), that the act by the party and/or signatory is authorized then the RSEEM can allow the RSEE to continue. Where the RSEEM determines, based on the RSEEV process determination(s), that the act performed by the party and/or signatory is not authorized then the RSEEM can terminate the RSEE.

It is contemplated that a party to a transaction can authorize another person(s) to act in their behalf. This is a type of "agency" relationship can extend to allowing the performance by an "agent" of acts of execution. Any type and manner of execution by an agent can be authorized by the current invention and enabled by a signature block included in a transaction document established within a transaction environment. For example, a user designation of "agent" could be assigned a particular user and permit that user to execute documents on behalf of another. The assignment of this designation, like any other designations, can be appended to a unique URL assigned to a user or made in any other contemplated manner. However, where no such permission has been established for transaction performance within an RSEE an "unauthorized party" RSEE termination event can occur.

The form and extent of the handwritten signature that is required and can be obtained within a signature block included within a transaction document for completing document execution within the RSEE may be variously defined and capable of satisfying varying jurisdictional requirements. For instance, the handwritten signature may require a full legal name, a nickname, an alias or other personal identity indication as may be contemplated. It is also contemplated that an indication of authority to execute the document may be required, such as an indication of a position within an entity, such as a business, institution, corporation, or other organizational form.

Additional signature requirements, such as those previously indicated herein and as may be contemplated, can be required to occur in connection with the capture and application of a handwritten signature. The timing for the performance of the execution of these additional signature requirements may be established in relation to the timing of the performance of the handwritten signature. For instance, prior to or at some time after the capture and application of the handwritten signature a signatory may be required to execute a check-box providing a final verification of their authority to execute the document.

The document execution management capabilities provided by the current invention, which may be performed within any transaction environment, including an established RSEE, can include a requirement for a preliminary indication of assent or consent (first act of execution) by one or more of a plurality of signatories that are concurrently accessing the document, prior to allowing the capture and application of a handwritten signature (second act of execution) to the transaction document. For instance, each signatory may be required to complete a preliminary, "click-to-sign" signature block, which as described may include a check-box, that has the practical effect of allowing the signatories to review and verify a transaction document prior to enabling its execution by handwritten signature. The enablement of this multi-party review capability, requiring concurrent access of at least two signatories, thereby, provides a signatory verification process that can limit RSEE establishment. The presence of two or more parties can assist in decreasing the chances that one party may execute an incomplete or incorrect version of a transaction document. This signatory verification process can enable either party to prohibit the RSEE from enabling the handwritten signature capture and application capabilities provided by the current invention. Further, it is contemplated that this signatory verification process can enable a user to cancel or terminate an established RSEE and thereby prohibit the execution of a transaction document. Assignment to a user of a user designation, such as "signatory", may be required for enabling this type of RSEE termination authority.

The current invention contemplates that the number of parties and/or required signatories and their concurrent access to an executable transaction document can be greater than two, such as three, four, five or more. Therefore, the concurrent access by any number of parties and/or signatories greater than two can be used, at least in part, for the establishment and/or maintenance of the RSEE by the current invention. It is understood that the number of signatories to an executable transaction document can be a distinct requirement from the requirement that two or more signatories to an executable transaction document concurrently access the document. For instance, the plurality of signatories requirement can be configured to be satisfied by the confirmation of two signatories to a document, even where a transaction document requires three or more signatories to accomplish its full execution. Thus, as described, the current invention contemplates a partial execution RSEE environment can be established for a transaction document or multiple transaction documents where required for the completion of a transaction. Alternatively, the plurality of signatories for a transaction document can be established as the number of required signatories, therefore, where three, four, five or more are required to execute a document the plurality requirement may be established as satisfied only when all such signatories are confirmed for a document. Thus, RSEE establishment can require verification that three, four, five or more signatories are concurrently accessing the executable transaction document. As will described further below, the document management capabilities enabled for the RSEE can accommodate multiple documents, multiple signatories and multiple execution performance requirements while ensuring the integrity of the executable transaction documents.

The current invention contemplates that the RSEE can be established wherein one or more of the concurrently accessing signatories has previously executed the executable transaction document being accessed. For example, where three signatories (Party A, B and C) are required to complete the formal execution of a transaction document, the RSEE can be established first for parties A and B allowing them to complete their execution of the document. At a later time, parties A and C or parties B and C can concurrently access the same document, thereby establishing the RSEE and allowing party C to complete their execution of the document. Further, RSEE management can customize and/or restrict document access for one or more signatories. From the above example, if party A is a document administrator then establishment of the RSEE may be allowed for concurrent access being made by parties A and B and A and C, but not allowed for attempted concurrent access by parties B and C. Designating one or more parties as a "document administrator" or some other similar term is intended solely as an indicator of a particular party being given special operational designations or permissions within and implementation of the RSEE.

RSEE management can implement a particular environment customized and governed by one or more special permissions. As described above, these special permissions can apply to and impact the operational performance enabled for a particular party or multiple parties. Alternatively, the permissions can apply to the RSEE as a whole and impact the execution and performance of all the functional capabilities of the RSEE. For example, the establishment of a particular RSEE can require the concurrent access of an executable transaction document by three or more signatories. Access to and application of any of the special permissions can be included and integrated within an implementation of the HESS software and made available to a designated user employing various techniques, such as a selectable list of features and the like, and can utilize various presentation and display techniques, such as a drop-down menu and the like.

The RSEE engine can be capable of allowing the establishment of multiple, associated RSEEs and/or alternative document execution environments to enable a plurality of signatories to accomplish handwritten signature execution at different times and/or multiple acts of execution for a transaction and its associated transaction documents.

The multiple, associated RSEEs and/or document execution environments can operate in conjunction with any or all of the above conditions required for the establishment of an RSEE for a particular executable transaction document(s). Therefore, each one of the document execution environments can be an RSEE and require satisfaction of the RSEE factors prior to establishment, similar to that described above. Alternatively, the multiple, associated document execution environments may require that only one or less than all RSEEs be established in conformance with the requirements for the establishment of an RSEE and allow other document execution environments (i.e., one or more RSEE(s)) to be established without meeting the requirements for RSEE establishment and/or allow other document execution environments to be established and allow the performance of the required acts of execution.

In operation, the current invention can enable a multiple, associated document execution environment that includes the establishment of multiple RSEE environments for the capture of handwritten signatures from the plurality of signatories. For example, where document execution requires three or more signatories the establishment of a first RSEE by two of the three parties can occur and then, at a later time, a second RSEE can be established for a second "plurality" of signatories that includes the last required signatory and at least one other signatory. In this manner, the satisfaction of the real-time, simultaneous handwritten signature execution of a transaction document for a plurality of signatories can be promoted throughout transaction accomplishment.

One or more multiple execution environments can be a preliminary execution environment wherein a document is enabled to be preliminarily executed by the signatories outside an RSEE. These preliminary execution environments are transaction environments that do not require the satisfaction of required RSEE factors for establishing an RSEE. These preliminary transaction environments can enable the performance of one or more required acts of execution by the document signatories. These preliminary execution environments may or may not be restricted from enabling the obtainment (capture and application) of a handwritten signature from a signatory, but can enable signatories to perform other acts of execution as enabled by the signature block capabilities provided by the current invention.

Multiple, associated execution environments can be serially, progressively, non-serially or otherwise established to enable and link the performance and obtainment of multiple acts of execution, which can be required for one or multiple executable transaction documents. The manner of progression can vary but allows signatories to proceed with the performance of their required acts of execution. In embodiments, the associated execution environments established by the RSEE engine can restrict the establishment of the RSEE until all other acts of execution are completed, whereupon the obtainment of handwritten signatures from the plurality of signatory parties can occur within an established RSEE. The multiple execution environments can present signatories to one or more transaction documents with a first, second, third or more execution environments for each of the one or more executable transaction documents. For example, document X may establish a preliminary execution environment that requires each of the plurality of signatories to provide a first indication of assent/consent by completing the execution of a first signature block (i.e., "click-to-sign" check-box) designated for each signatory. Once each of the first signature blocks are executed by each signatory the document can be designated, uploaded and stored within a system memory. The designation can be anything as typically used in the art, such as a document version designation (e.g., v1, v2, v3 and the like) or other indicator, that allows the system and/or a user interacting with the system to identify and access the stored version of the document that includes the captured acts of execution. The establishment of a second execution environment can be an RSEE that presents the version of the executable document that was captured and stored from the first preliminary execution environment. In this example, the second execution environment is the RSEE that, once established, allows each of the signatories to complete a second signature block (e.g., the HESS Block) that allows for the obtainment of handwritten signatures from the signatories to the executable document.

It is contemplated that the current invention is not limited to a serial manner of establishing multiple execution environments. The management of multiple execution environments may enable the complete and full execution of one or more transaction documents in a manner predominantly characterized by two or more signatories completing various acts of execution for a document in no distinct order. For instance, signatories to a document may include parties A, B, C and D. Signatories A and D may establish a first preliminary execution environment and complete the required acts of execution presented therein. Then signatories A and D may establish a first RSEE, wherein they are enabled to complete their required hand-written signature execution performance, and thereby complete their execution of the document. At another time signatories B and C may establish a second preliminary execution environment and complete the required acts of execution presented therein. It is contemplated that the acts of execution required by parties B and C are similar to or distinct and different from the execution performance requirements presented for parties A and D. At a still later time parties B and C can establish a second RSEE, wherein they are enabled to complete their required hand-written signature execution performance, and thereby complete their execution of the document. Upon capture of each signatories hand-written signature the transaction document is fully executed. In this example, like that above, different versions of the document may be designated, stored and then accessed for additional processing to occur.

In reference to the above example, it is contemplated that the HESS System can enable the obtainment of handwritten signatures from required signatories B and C in transaction environments other than an RSEE. This alternative transaction environment can be established and provide full operational or functional performance, including all enabled user interaction capabilities. In this example the HESS System is enabling transaction performance that requires only partial transaction document execution within an established RSEE. Thus, it is understood that the transaction management system can establish transaction performance where only a single RSEE must be established and handwritten signatures are obtained from fewer than all required signatories. The complete or full document execution occurs in alternative transaction environments outside an RSEE. Therefore, the transaction management system can establish any transaction with transaction performance requirements that vary in the type of required transaction environments to be established and the acts of execution to be performed therein.

As seen from the above, the execution management capabilities provided by the current invention, as may be particularly configured within an RSEE engine, can allow for and accommodate different execution requirements that may be presented for distinct groups of signatories. Therefore, the current invention is able to manage multiple document versions, multiple execution requirements for each document, and accomplish the completion of a fully executed document, wherein each execution step is performed within an appropriate execution environment, whether preliminary to, alternative to or within an established RSEE, provided by the current invention. The fully executed document can be stored, retrieved and displayed/presented as a single document or multiple versions of a document that reflects all completed execution requirements that have been obtained from the signatories to the document.

Figure 8:
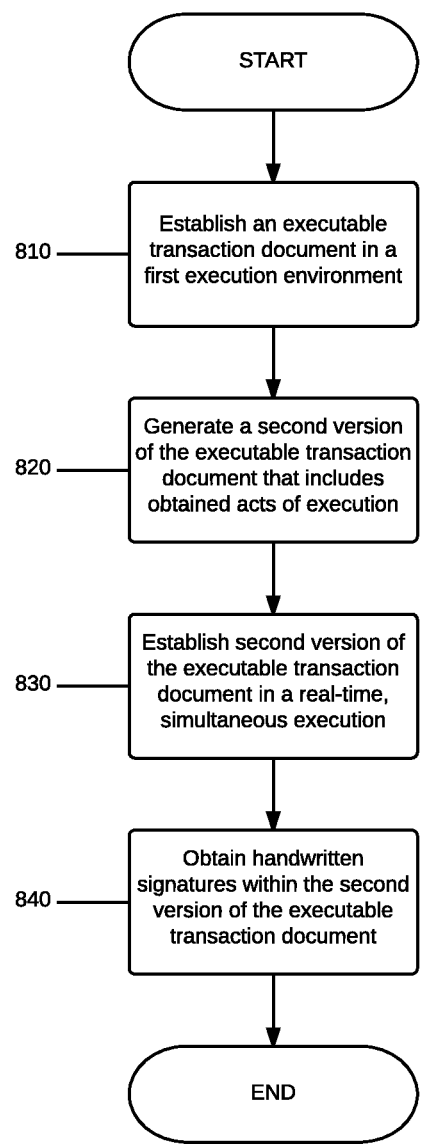
FIG. 8 is a block diagram representations showing methods for establishing an executed transaction document within multiple execution environments in accordance with exemplary embodiments of the current invention.

In still further exemplary embodiments for the current invention, a method 800, as shown in FIG. 8, for establishing an executed document can include a step 810 where an executable transaction document for a multi-party transaction is established within a first execution environment. Within this first execution environment, in step 820, acts of execution are obtained from a first group of two or more parties from a plurality of parties thereby generating a second version of the executable document. This second version of the executable transaction document is then established, in step 830, within a real-time, simultaneous execution environment for two or more of the plurality of parties, wherein it is determined that said parties are concurrently accessing the second version of the executable document in the first execution environment. In step 840 the simultaneous obtainment of handwritten signatures from the concurrently accessing parties to the second version of the executable document within the real-time, simultaneous execution environment occurs in real-time.

Figure 9:
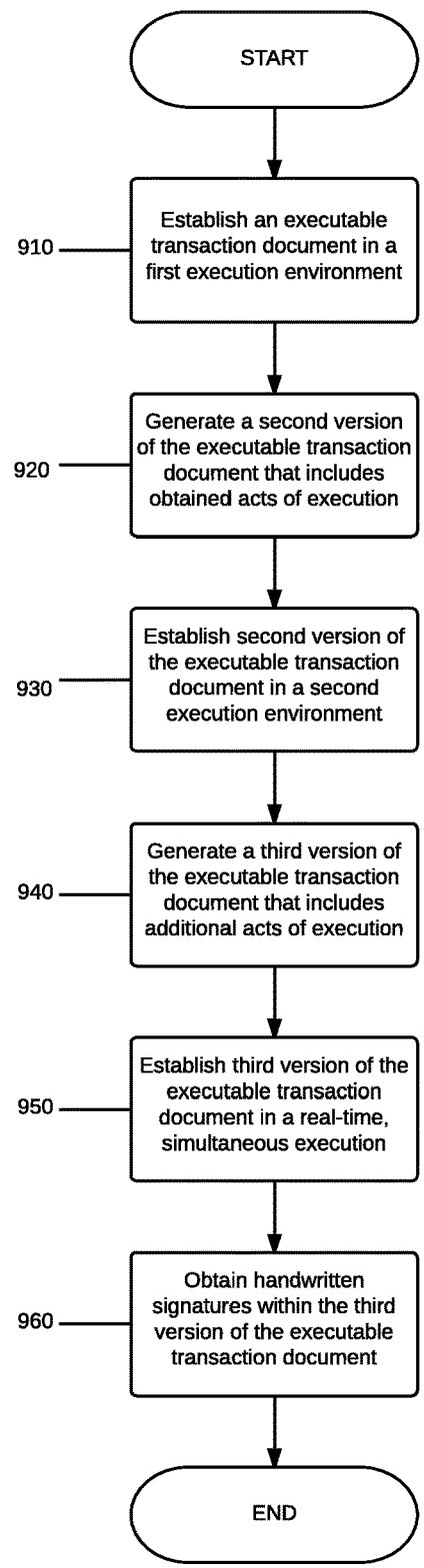
FIG. 9 is a block diagram representations showing methods for establishing an executed transaction document within multiple execution environments in accordance with exemplary embodiments of the current invention.

In method 900, as shown in FIG. 9, the current invention provides a method for establishing an executed document including a step 910 of establishing an executable document within a first execution environment for a first group of two or more parties from a plurality of parties. In step 920 acts of execution are obtained from the first group of parties and a second version of the executable document is generated. In step 930 the second version of the executable document is established within a second execution environment. In step 940 acts of execution are obtained from a second group of two or more parties from the plurality of parties and a third version of the executable document is generated. In step 950 the third version of the executable document is established within a real-time, simultaneous execution environment for a third group of two or more parties from the plurality of parties, wherein said parties of the third group are concurrently accessing the third version of the executable document. In step 960 the real-time, simultaneous obtainment of handwritten signatures occurs within the third version of the executable document from said concurrently accessing third group.

Additional features of the current invention may include electronic notarization, witnessing and/or certification of executed transaction documents. These additional functional capabilities can be configured in any manner for the HESS Software, including as part of any engine, feature or aspect of the current invention. Specifically, authentication procedures may be used to verify the presence of a notary at the execution of the document. Upon authentication, the notary may "click-to-sign" any appropriate transaction documents and may use a signature capture device to apply the notary's signature to a "third-party signature block" within the documents themselves. This type of, and other contemplated, "third-party signature block" forms can be included within the document management engine or as otherwise configured for the HESS Software and implemented by a HESS System.

The actions of the notary, including signature by the notary, can be performed with the document established in an RSEE or in an alternative transaction environment. A digital certificate retrieval tool may be used to generate or acquire a digital certificate associated with the notary. The digital certificate may be applied to documents to result in the certification of such documents in accordance with jurisdictional requirements. An additional advantage may be that the notary may choose to batch notarize multiple transaction documents with one click.

Furthermore, in embodiments, features similar to these may be used to allow for the electronic witnessing of transaction documents. As described herein, a third-party signature block can be established within a transaction document(s) and allow for the obtainment of a handwritten signature by a witness. It is further contemplated that the witness may perform various acts of execution, as have been described, in accomplishing their purpose for a transaction and the transaction documents.

It is contemplated that once all acts of execution for a transaction document or multiple transaction documents have been completed, a HESS System can perform various certification functions and/or determinations, such as saving all inputted information (electronic documents, signatures, etc.) as well as information relating to the electronic document signing process (which could include the date, time, location, and identity of the parties to the transaction), reconfirming the acceptance of all parties to the transaction, and/or such other functions as contemplated. Based upon the performance of these functions and/or determinations, such as when a confirmation is received, the system can apply a digital tamper-evident seal or other form of electronic security feature to the electronic documents. The date, time, location, and identity of all parties to the transaction can be recorded and stored together with the electronic document package to which the seal has been applied. The electronic document package may then be forwarded to the appropriate system storage location, which can include an electronic document registry, where it can be indexed. Access to these documents can be allowed but the user interaction enabled may be restricted completely or limited to a certain extent as provided by the HESS System to avoid unwanted tampering.

The current invention described above, including the associated methods for transaction management, including without limitation, creating and executing electronic transaction documents, may exhibit many advantages over prior transaction management systems. For example, employing the RSEE may promote transaction integrity, an increase in the efficiency of completing transactions and include various features that promote secured transactions.

The current invention provides all aspects of transaction management, including document management. As a result, document preparers representing different roles in a transaction may create transaction documents and enable those documents for electronic execution. The documents associated with the transaction may then be stored for access by any parties who have an interest in the transaction and have permission to access the document. Furthermore, because the functions can be integrated into a single system that is web based, consumer interfacing with the system may be performed from any remote location. As a result, all authorized parties to a transaction, including any and all signatories, may review documents prior to the performance of any act of execution, to familiarize themselves with the transaction documents. The document executors (signatory) may then use the same system to execute the documents in real-time, substantially real-time, or at a later date. As a result, a transaction closing process and/or establishment of a fully executed transaction document may be made more efficient.

Although the present invention has been described in detail, it should be understood that various changes, substitutions and alterations can be made hereto without departing from the sphere and scope of the invention as defined by the appended claims. Additionally, it is not intended that all embodiments of the invention exhibit one, some, or all of the described advantages. Furthermore, it is not intended that the listed advantages include an exhaustive list of the advantages that may be exhibited by the systems and methods described above.

The current invention has been described with reference to particular embodiments. However, it will be readily apparent to those skilled in the art that it is possible to modify the sequence of performance, order of execution, form, usage and/or details of implementation that embody the current invention in specific forms other than those of the embodiments described above without requiring the exercise of inventive faculty. The described embodiments are merely illustrative and should not be considered restrictive in any way. The scope of the invention is given by the appended claims, rather than the preceding description, and all variations and equivalents, which fall within the range of the claims are intended to be embraced therein.

To aid the Patent Office, and any readers of any patent issued on this application in interpreting the claims appended hereto, applicants wish to note that they do not intend any of the appended claims to invoke Section 6 of 35 U.S.C. § 112 as it exists on the date of filing hereof unless "means for" or "step for" are used in the particular claim.

What is claimed is:

1. A method for establishing a transaction document for a multi-party transaction within a real-time, simultaneous execution environment by a transaction system, comprising:
    establishing a first transaction environment, at a first web address, capable of being accessed by a plurality of parties to a transaction and presenting a preliminary transaction document in a first format to each of the plurality of accessing parties upon access;
    establishing an RSEE factor matrix including a plurality of required transaction RSEE factors for which compliance must be determined, the RSEE factors comprising:
        i. the preliminary transaction document in the first transaction environment requires execution by obtainment of a handwritten signature from at least two signatories among the plurality of parties;
        ii. the preliminary transaction document in the first transaction environment is being concurrently accessed by a plurality of the required at least two signatories among the plurality of parties;
        iii. at least one of the required at least two signatories among the plurality of parties is accessing the first transaction environment from a mobile computing device;
        iv. at least one of the required at least two signatories among the plurality of parties has been provided access to and is accessing the first transaction environment via a link to the first transaction environment sent by email to the at least one of the required at least two signatories;
        v. at least one of the required at least two signatories among the plurality of parties is accessing the first transaction environment from a location remote from at least one of the other required signatories;
    presenting an RSEE window in the first transaction environment, wherein the RSEE window automatically displays the RSEE factor matrix to the plurality of parties in the first transaction environment;
    automatically determining compliance with the transaction RSEE factors of the preliminary transaction document in the first transaction environment;
    tracking the compliance determinations of each RSEE factor, wherein the RSEE window displays updates to the RSEE factor compliance determinations and provides a compliance designation;
    presenting a first indication of assent to the preliminary transaction document, wherein at least one indication of assent is required from at least one of the required at least two signatories;
    determining the required indication of assent has been designated for the preliminary transaction document by at least one of the required at least two signatories; and
    upon confirmation of the satisfaction of each transaction RSEE factor determination and the first indication of assent/consent to the preliminary transaction document, establishing the preliminary transaction document as an executable transaction document in a real-time, simultaneous execution environment at a second web address for concurrent access by at least two signatories among the plurality of parties, wherein the executable transaction document includes signature blocks, in a second format, for enabling execution by the required at least two signatories and wherein the real-time, simultaneous execution environment allows real-time, simultaneous execution of the executable transaction document by the obtainment of handwritten signatures from each of the plurality of concurrently accessing signatories in the signature blocks and each of the plurality of concurrently accessing signatories is enabled access to the executable transaction document via a composite URL that includes the second web address and an identifier specific to each of the plurality of concurrently accessing signatories.

2. The method of claim 1, further comprising establishing at least one of a partially executed and fully executed transaction document upon the real-time, simultaneous obtainment of handwritten signatures from each of the plurality of concurrently accessing signatories.

3. The method of claim 1, further comprising establishing a partially executed transaction document, including any and/or all obtained acts of execution, in at least one of a computer memory location, maintained within the real-time, simultaneous execution environment and another transaction environment.

4. The method of claim 1, further comprising determining the document is established in the real-time, simultaneous execution environment within an establishment period.

5. The method of claim 1, further comprising determining at least one other party to the transaction is concurrently accessing the transaction document with the plurality of concurrently accessing signatories.

6. The method of claim 1, further comprising determining at least one other party, having a user designation, is concurrently accessing the transaction document with the plurality of concurrently accessing signatories.

7. The method of claim 1, wherein at least one of the first transaction environment and the real-time, simultaneous execution environment allows additional acts of execution to be performed by any required signatory.

8. The method of claim 1, wherein the first transaction environment allows generation of the document.

9. The method of claim 1, wherein the real-time, simultaneous execution environment is closed upon at least one of the obtainment of handwritten signatures from the at least two concurrently accessing signatories, obtainment of all required acts of execution from all required signatories, a determination by a process established for an RSEEV maintenance package, a determination by a process established for an RSEEV PET package.

10. The methods of claim 1, wherein the second web address and hosting of the executable transaction document by the second web address is provided by a secondary computing device networked within the transaction system.

11. A method for generating a fully executed transaction document being hosted within a transaction environment by a transaction system, comprising:
    establishing an executable transaction document within an execution environment hosted by the transaction system that allows the real-time, simultaneous obtainment of handwritten signatures from a plurality of concurrently accessing signatories, wherein the establishment of the document within the execution environment is based upon compliance determinations with the following RSEE factors while the executable transaction document is presented in a first format in a preliminary transaction environment at a first web address:
        i. the document in the preliminary transaction environment includes a plurality of signature blocks and requires execution by obtainment of a handwritten signature from at least two signatories among the plurality of concurrently accessing signatories;
        ii. the document in the preliminary transaction environment is being concurrently accessed by a plurality of the required at least two signatories among the plurality of concurrently accessing signatories;
        iii. at least one of the required at least two signatories among the plurality of concurrently accessing signatories is accessing the preliminary transaction environment from a mobile computing device;
        iv. at least one of the required at least two signatories among the plurality of concurrently accessing signatories has been provided access to and is accessing the preliminary transaction environment via a link to the preliminary transaction environment sent by email to the at least one of the required at least two signatories among the plurality of concurrently accessing signatories;
        v. at least one of the required at least two signatories is accessing the preliminary transaction environment from a location remote from at least one of the other required signatories among the plurality of concurrently accessing signatories;
        vi. a first indication of assent to the document is presented, wherein at least one indication of assent is required from at least one of the required at least two signatories among the plurality of concurrently accessing signatories;
    determining within the first transaction environment that the electronic transaction document is in execution ready form when the compliance determinations indicate each of the transaction RSEE factors are satisfied;
    within the execution environment at a second web address, wherein the plurality of signature blocks on the executable transaction document are presented in a second format to the plurality of concurrently accessing signatories in response to the determination that the electronic transaction document is execution ready, simultaneously obtaining the handwritten signatures within the plurality signature blocks from the plurality of concurrently accessing signatories in real-time, wherein each of the plurality of concurrently accessing signatories is enabled access to the executable transaction document via a composite URL that includes the second web address and an identifier specific to each of the plurality of concurrently accessing signatories; and
    in response to the real-time, simultaneous obtainment of the handwritten signatures within the executable transaction document from the plurality of concurrently accessing signatories, establishing a fully executed transaction document.

12. The method of claim 11, further comprising determining the document is established in the real-time, simultaneous execution environment within an establishment period.

13. The method of claim 11, wherein the fully executed transaction document is established within at least one of the execution environment, a system storage location, and an alternative transaction environment.

14. The method of claim 11, wherein establishing the fully executed transaction document requires at least one of a notarization and a document certification.

15. The method of claim 11, wherein the establishing of the fully executed transaction document requires a verification of the completion of all signature blocks included within the transaction document.

16. The method of claim 11, wherein the real-time, simultaneous execution environment is closed upon at least one of the obtainment of handwritten signatures from the at least two concurrently accessing signatories, obtainment of all required acts of execution from all required signatories, a determination by a process established for an RSEEV maintenance package, a determination by a process established for an RSEEV PET package.

17. The method of claim 11, wherein the second web address and hosting of the executable transaction document by the second web address is provided by a secondary computing device networked within the transaction system.

18. A system for facilitating transactions, comprising:
    a server computer having a processor, the server communicably coupled with two or more computing devices via the Internet, the two or more computing devices being utilized by two or more parties including at least a plurality of signatories;
    a computer readable medium encoded with a transaction management program configured, when executed by the processor, to host a web-based transaction that at least:
        provides a preliminary transaction environment at a first web address, accessible by the at least two or more parties, within which a transaction document can be presented in a first format and interacted with to arrive at an execution ready form of the transaction document;
        provides for the establishment of the execution ready form of the transaction document within a real-time, simultaneous execution environment at a second web address of the transaction in response to compliance determinations reached regarding the following RSEE factors while the transaction document is presented in the first format within the preliminary transaction environment:
  i. the document in the preliminary transaction environment requires execution by obtainment of a handwritten signature from each of at least two signatories of the plurality of signatories;
  ii. the document in the preliminary transaction environment is being concurrently accessed by a plurality of the required at least two signatories of the plurality of signatories;
  iii. at least one of the required at least two signatories of the plurality of signatories is accessing the preliminary transaction environment from a mobile computing device;
  iv. at least one of the required at least two signatories of the plurality of signatories has been provided access to and is accessing the preliminary transaction environment via a link to the preliminary transaction environment sent by email to the at least one of the required at least two signatories;
  v. at least one of the required at least two signatories of the plurality of signatories is accessing the preliminary transaction environment from a location remote from at least one of the other required signatories;
  vi. a first indication of assent to the document is presented, wherein at least one indication of assent is required from at least one of the required at least two signatories of the plurality of signatories;
determining within the first transaction environment that the electronic transaction document is in execution ready form when the compliance determinations indicate each of the transaction RSEE factors are satisfied;

wherein upon determination that the transaction document is execution ready, at least one of partially or fully executing the transaction document by hosting the transaction document in the real-time, simultaneous execution environment, and enabling each of the plurality of concurrently accessing signatories access to the executable transaction document via a composite URL that includes the second web address and an identifier specific to each of the plurality of concurrently accessing signatories and wherein handwritten signatures from each of the plurality of concurrently accessing signatories are obtained within a plurality of signature blocks of the transaction document in a second format and are required acts of execution that are obtained simultaneously and in real-time.

19. The system of claim 18, wherein upon partial execution of the transaction document a version of the transaction document including the obtained acts of execution is at least one of stored in the memory, maintained within the real-time, simultaneous execution environment and established within another transaction environment.

20. The system of claim 18, wherein the obtainment of handwritten signatures from signatories is accomplished through the establishment and interaction with at least two real-time, simultaneous execution environments.

21. The system of claim 18, wherein the real-time, simultaneous execution environment is closed upon at least one of the obtainment of handwritten signatures from the at least two concurrently accessing signatories, obtainment of all required acts of execution from all required signatories, a determination by a process established for an RSEEV maintenance package, a determination by a process established for an RSEEV PET package.

* * * * *